United States Patent
Zhang et al.

(10) Patent No.: US 12,051,905 B2
(45) Date of Patent: Jul. 30, 2024

(54) POWER SYSTEM

(71) Applicant: Huawei Digital Power Technologies Co., Ltd., Shenzhen (CN)

(72) Inventors: Yanzhong Zhang, Shanghai (CN); Yongbing Gao, Shanghai (CN); Xun Wang, Shanghai (CN); Roland Huempfner, Nuremberg (DE)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 92 days.

(21) Appl. No.: 17/966,185

(22) Filed: Oct. 14, 2022

(65) Prior Publication Data

US 2023/0046346 A1 Feb. 16, 2023

Related U.S. Application Data

(63) Continuation of application No. PCT/CN2020/087324, filed on Apr. 27, 2020.

(30) Foreign Application Priority Data

Apr. 16, 2020 (WO) ................ PCT/CN2020/085212

(51) Int. Cl.
- *H02J 3/32* (2006.01)
- *G06F 1/26* (2006.01)
- *H02J 3/38* (2006.01)
- *H02M 3/158* (2006.01)
- *H02M 5/10* (2006.01)

(52) U.S. Cl.
CPC ............. *H02J 3/38* (2013.01); *H02M 3/1582* (2013.01); *H02M 5/10* (2013.01)

(58) Field of Classification Search
CPC ........... H02J 3/38; H02M 3/1582; H02M 5/10
See application file for complete search history.

(56) References Cited

U.S. PATENT DOCUMENTS

| | | | |
|---|---|---|---|
| 8,212,408 B2 | 7/2012 | Fishman | |
| 8,642,879 B2 | 2/2014 | Gilmore et al. | |
| 9,088,178 B2 * | 7/2015 | Adest | ...................... H02J 3/381 |
| 9,118,215 B2 | 8/2015 | Fishman et al. | |
| 2010/0156188 A1 | 6/2010 | Fishman | |
| 2013/0088081 A1 * | 4/2013 | Siri | ......................... H02J 3/381 |
| | | | 700/298 |
| 2013/0147272 A1 | 6/2013 | Johnson et al. | |
| 2016/0036221 A1 | 2/2016 | Pan et al. | |

(Continued)

FOREIGN PATENT DOCUMENTS

| | | |
|---|---|---|
| CN | 102244382 A | 11/2011 |
| CN | 101779291 B | 1/2013 |

(Continued)

*Primary Examiner* — Jared Fureman
*Assistant Examiner* — Esayas G Yeshaw
(74) *Attorney, Agent, or Firm* — Slater Matsil, LLP

(57) ABSTRACT

Embodiments of this application provide a power system. An output terminal of a power supply or a DC-to-DC unit is cascaded. In addition, according to the power system provided in embodiments of this application, a quantity of cables from the power supply or the DC-to-DC unit to the DC-to-AC unit may be further reduced by cascading an output terminal of the power supply or the DC-to-DC unit and cascading an input of the DC-to-AC unit.

20 Claims, 57 Drawing Sheets

(56) References Cited

U.S. PATENT DOCUMENTS

| | | | |
|---|---|---|---|
| 2017/0331295 | A1 | 11/2017 | Abeyasekera et al. |
| 2018/0102644 | A1 | 4/2018 | Perreault et al. |
| 2018/0175731 | A1* | 6/2018 | Garcia i Tormo .... H02M 3/157 |
| 2019/0157984 | A1 | 5/2019 | Aloni et al. |
| 2019/0190273 | A1 | 6/2019 | Judkins et al. |

FOREIGN PATENT DOCUMENTS

| | | | |
|---|---|---|---|
| CN | 106849167 | A | 6/2017 |
| CN | 206517369 | U | 9/2017 |
| CN | 108631357 | A | 10/2018 |
| CN | 108899937 | A | 11/2018 |
| CN | 109167390 | A | 1/2019 |
| CN | 109802426 | A | 5/2019 |
| JP | 2010177554 | A | 8/2010 |
| JP | 2011507465 | A | 3/2011 |
| JP | 2012524332 | A | 10/2012 |
| JP | 2013046503 | A | 3/2013 |
| JP | 2019033616 | A | 2/2019 |
| JP | 2020014324 | A | 1/2020 |
| WO | 2016157874 | A1 | 10/2016 |
| WO | 2017152181 | A1 | 9/2017 |
| WO | 2019130375 | A1 | 7/2019 |

\* cited by examiner

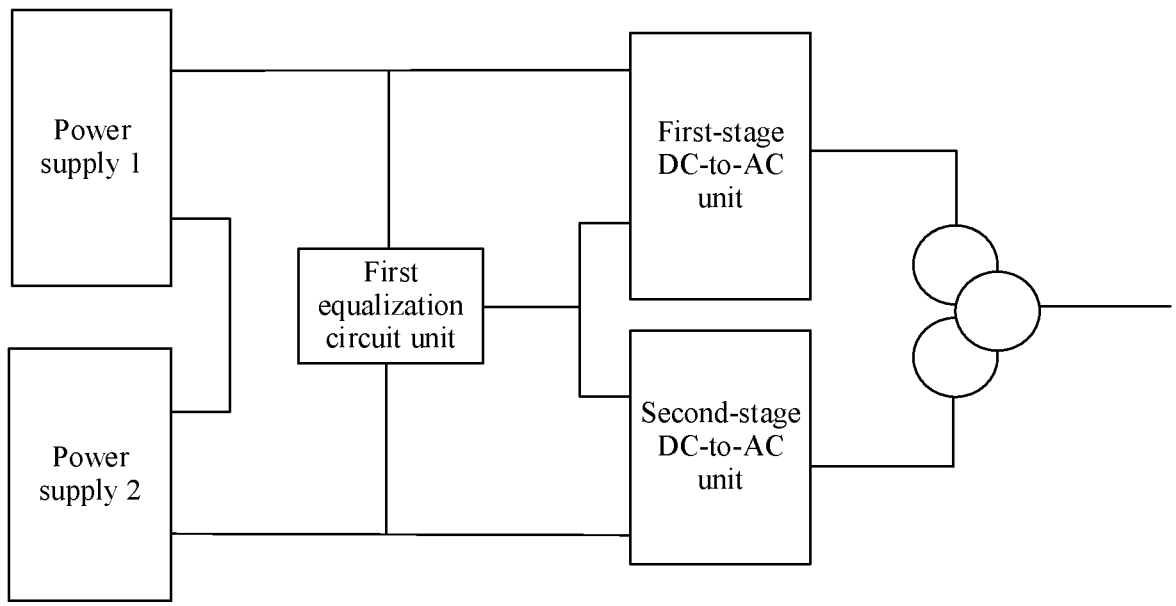
FIG. 9a
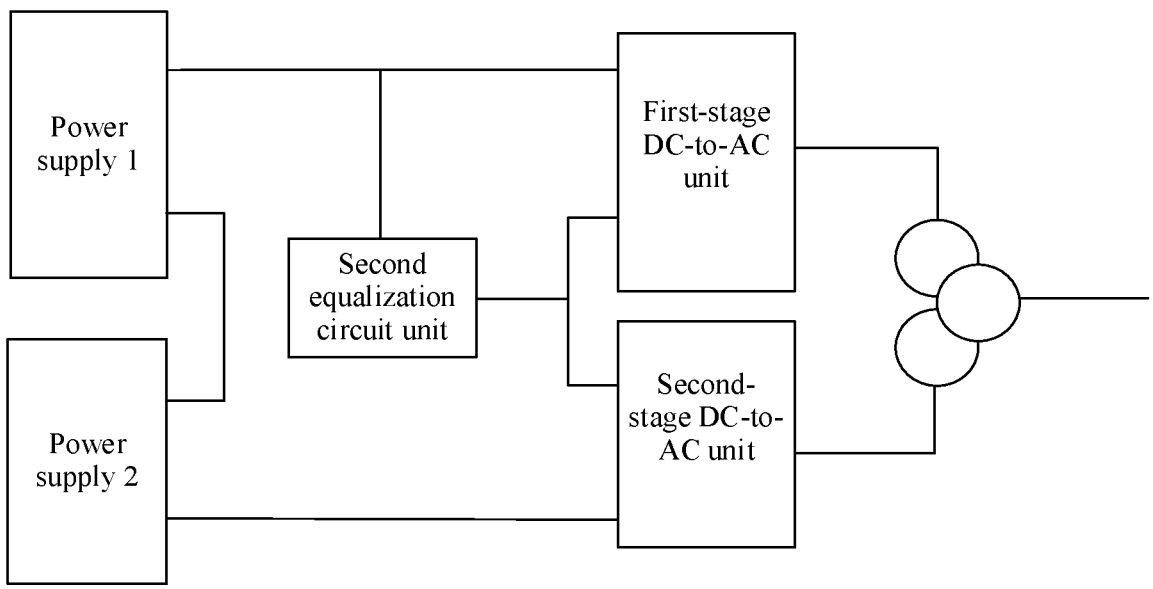
FIG. 9b1

FIG. 9b2

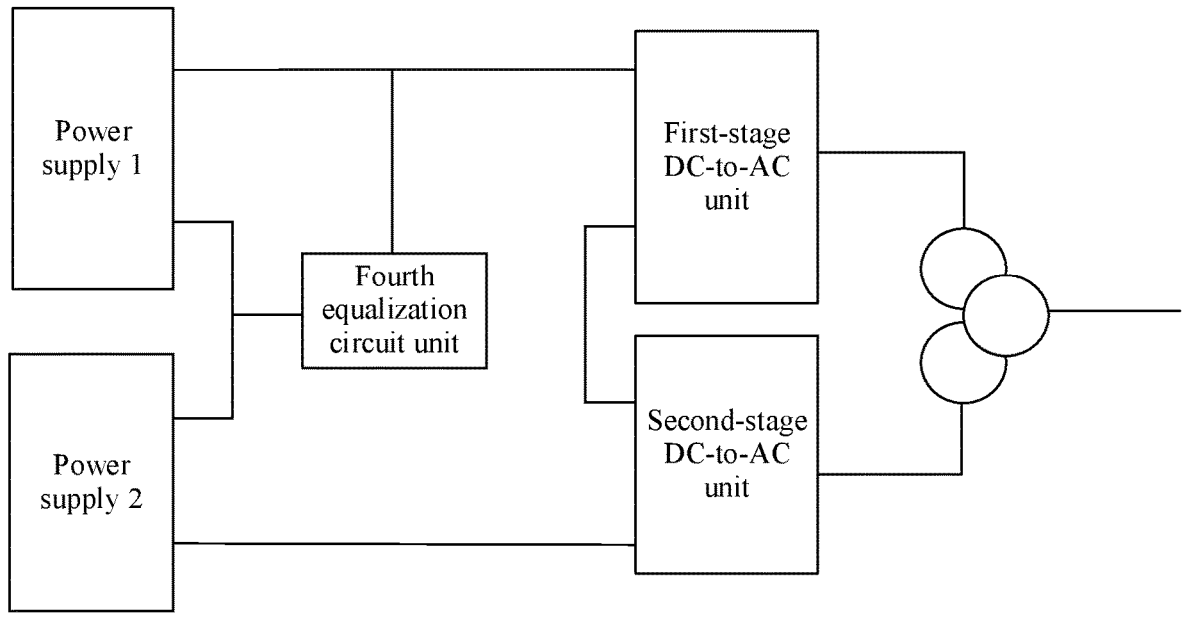
FIG. 9d1
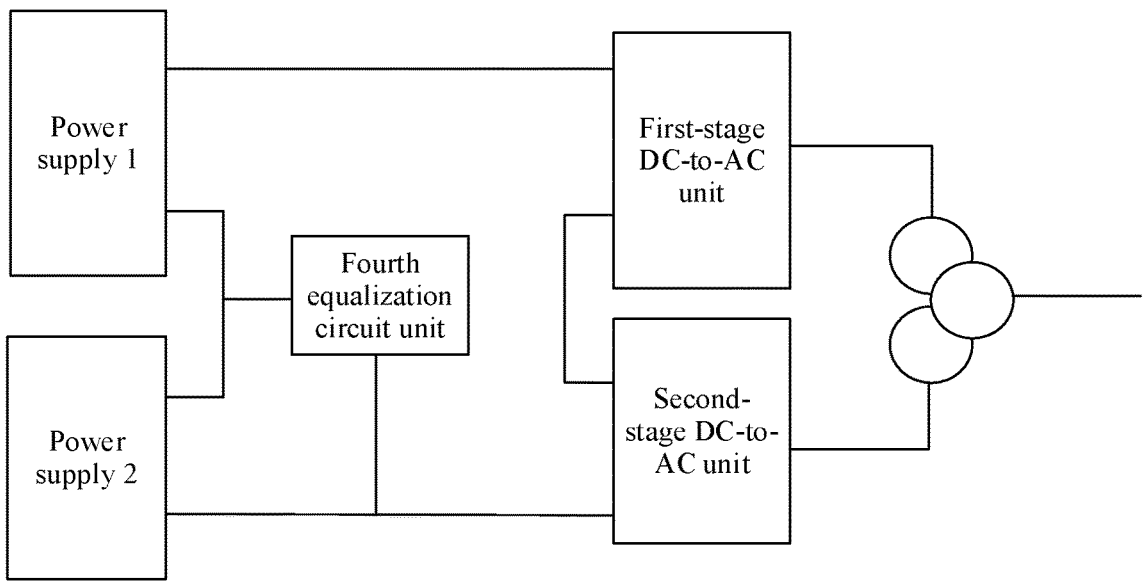
FIG. 9d2

POWER SYSTEM

CROSS-REFERENCE TO RELATED APPLICATIONS

This application is a continuation of International Application No. PCT/CN2020/087324, filed on Apr. 27, 2020, which claims priority to International Patent Application No. PCT/CN2020/085212, filed on Apr. 16, 2020. The disclosures of the aforementioned applications are hereby incorporated by reference in their entireties.

TECHNICAL FIELD

This application relates to the field of circuit technologies, and in particular, to a power system

BACKGROUND

Photovoltaic power generation is more widely used because it has less pollution than conventional fossil energy. In power generation systems, three-phase grid-connected photovoltaic inverters are mainly used during application due to mature technologies in terms of performance, reliability, management, and the like of connected photovoltaic arrays. With the adjustment of grid-connected photovoltaic power price policies, higher requirements are raised for an input-output ratio of photovoltaic power generation, and it is essential to reduce costs of photovoltaic power generation.

Currently, there are three three-phase grid-connected photovoltaic inverter architectures: a centralized architecture, a distributed architecture, and a decentralized architecture. Centralized and decentralized inverters have high conversion power, but low input and grid-connected voltages, resulting in higher input and output currents, larger diameters of DC/AC cables, increased costs, and increased losses. A distributed inverter has low conversion power. Although an input voltage can reach 1500 V and a grid-connected voltage can reach 800 V AC, as the power increases, the distributed inverter also has problems of higher input and output currents, larger diameters of DC/AC cables, increased costs, and increased losses.

SUMMARY

Embodiments of this application provide a power system, to resolve the foregoing technical problems of a high current in a cable, a high cable diameter specification, and high costs.

According to a first aspect, an embodiment of this application provides a power system, including N power modules and M DC-to-AC units. N is an integer greater than 1. M is an integer greater than 1. The power module is configured with a positive output terminal and a negative output terminal. The DC-to-AC unit is configured with a positive input terminal, a negative input terminal, and an output terminal. A positive output terminal of a first power module is coupled to a positive input terminal of a first DC-to-AC unit. A negative output terminal of an $n^{th}$ power module is coupled in series to a positive output terminal of an $(n+1)^{th}$ power module to form a first node, where n is an integer greater than 0 and less than N, for example, a negative output terminal of the first power module is coupled in series to a positive output terminal of a second power module to form a first node, a negative output terminal of the second power module is coupled in series to a positive output terminal of a third power module to form a first node, . . . , and a negative output terminal of an $N^{th}$ power module is coupled to a negative input terminal of an $M^{th}$ DC-to-AC unit. A negative input terminal of an $m^{th}$ DC-to-AC unit is coupled in series to a positive input terminal of an $(m+1)^{th}$ DC-to-AC unit to form a second node, where m is an integer greater than 0 and less than M, for example, a negative input terminal of the first DC-to-AC unit is coupled to a positive input terminal of a second DC-to-AC unit to form a second node, a negative input terminal of the second DC-to-AC unit is coupled to a negative input terminal of a third DC-to-AC unit to form a second node, . . . , and at least one first node and at least one second node are coupled. An output of an output terminal of the DC-to-AC unit is isolated.

In the power system according to the first aspect, the power module is cascaded to increase an output voltage of the power module, so as to reduce a current between the power module and the DC-to-AC unit, so that a cable with a low wire diameter specification may be used between the power module and the DC-to-AC unit, to resolve a cost problem of the cable from the power module to the DC-to-AC unit.

According to a second aspect, an embodiment of this application provides a power system, including a first power supply, a second power supply, a first-stage DC-to-AC unit, and a second-stage DC-to-AC unit. A positive output terminal of the first power supply is coupled to a positive input terminal of the first-stage DC-to-AC unit. A negative output terminal of the first power supply is coupled to a positive output terminal of the second power supply to form a first node. A negative output terminal of the second power supply is coupled to a negative input terminal of the second-stage DC-to-AC unit. A negative input terminal of the first-stage DC-to-AC unit is coupled to a positive input terminal of the second-stage DC-to-AC unit to form a second node. Outputs of output terminals of the first-stage DC-to-AC unit and the second-stage DC-to-AC unit are isolated.

In the power system according to the second aspect, the first power supply and the second power supply are cascaded to increase an output voltage of the power supply (including the first power supply and the second power supply), so as to reduce a current between the power supply and the DC-to-AC unit (including the first-stage DC-to-AC unit and the second-stage DC-to-AC unit), so that a cable with a low wire diameter specification may be used between the power supply and the DC-to-AC unit, to resolve a cost problem of the cable from the power supply to the DC-to-AC unit.

With reference to the power system according to the second aspect, in a possible implementation, the positive output terminal of the first power supply is coupled to the positive input terminal of the first-stage DC-to-AC unit by using a first conducting wire. The negative output terminal of the second power supply is coupled to the negative input terminal of the second-stage DC-to-AC unit by using a second conducting wire. The first node is coupled to the second node by using a third conducting wire. A current value of the third conducting wire is less than or equal to a current value of the first conducting wire or the second conducting wire. Because the current value of the third conducting wire is small, a cable specification of the third conducting wire may be reduced, and costs of the third conducting wire may be further reduced. In addition, when output powers/voltages of the first power supply and the second power supply are asymmetric, or when input powers/voltages of the first-stage DC-to-AC unit and the second-stage DC-to-AC unit are asymmetric, a current loop can be provided to achieve voltage equalization.

According to a third aspect, an embodiment of this application provides a power system, including N power modules, N DC-to-DC units, and M DC-to-AC units. An output terminal of the power module is coupled to an input terminal of the DC-to-DC unit. A positive output terminal of a first DC-to-DC unit is coupled to a positive input terminal of a first DC-to-AC unit. A negative output terminal of an $n^{th}$ DC-to-DC unit is coupled in series to a positive output terminal of an $(n+1)^{th}$ DC-to-DC unit to form a first node, where n is an integer greater than 0 and less than N. A negative output terminal of an $N^{th}$ DC-to-DC unit is coupled to a negative input terminal of an $M^{th}$ DC-to-AC unit. A negative input terminal of an $m^{th}$ DC-to-AC unit is coupled in series to a positive input terminal of an $(m+1)^{th}$ DC-to-AC unit to form a second node, where m is an integer greater than 0 and less than M. At least one first node and at least one second node are coupled. An output of an output terminal of the DC-to-AC unit is isolated.

In the power system according to the third aspect, the DC-to-DC unit is cascaded to increase an output voltage of the DC-to-DC unit, so as to reduce a current between the DC-to-DC unit and the DC-to-AC unit, so that a cable with a low wire diameter specification may be used between the DC-to-DC unit and the DC-to-AC unit, to resolve a cost problem of the cable from the DC-to-DC unit to the DC-to-AC unit.

According to a fourth aspect, an embodiment of this application provides a power system, including a first power supply, a second power supply, a first-stage DC-to-DC unit, a second-stage DC-to-DC unit, a first-stage DC-to-AC unit, and a second-stage DC-to-AC unit. An output terminal of the first power supply is coupled to an input terminal of the first-stage DC-to-DC unit. An output terminal of the second power supply is coupled to an input terminal of the second-stage DC-to-DC unit. A positive output terminal of the first-stage DC-to-DC unit is coupled to a positive input terminal of the first-stage DC-to-AC unit. A negative output terminal of the first-stage DC-to-DC unit is coupled to a positive output terminal of the second-stage DC-to-DC unit to form a first node. A negative output terminal of the second-stage DC-to-DC unit is coupled to a negative output terminal of the second-stage DC-to-AC unit. A negative input terminal of the first-stage DC-to-AC unit is coupled to a positive input terminal of the second-stage DC-to-AC unit to form a second node. Outputs of output terminals of the first-stage DC-to-AC unit and the second-stage DC-to-AC unit are isolated.

In the power system according to the fourth aspect, the DC-to-DC unit (the first-stage DC-to-DC unit and the second-stage DC-to-DC unit) is cascaded to increase an output voltage of the DC-to-DC unit, so as to reduce a current between the DC-to-DC unit and the DC-to-AC unit (the first-stage DC-to-AC unit and the second-stage DC-to-AC unit), so that a cable with a low wire diameter specification may be used between the DC-to-DC unit and the DC-to-AC unit, to resolve a cost problem of the cable from the DC-to-DC unit to the DC-to-AC unit.

With reference to the power system according to the fourth aspect, in a possible implementation, the positive output terminal of the first DC-to-DC unit is coupled to the positive input terminal of the first-stage DC-to-AC unit by using a first conducting wire. The negative output terminal of the second DC-to-DC unit is coupled to the negative output terminal of the second-stage DC-to-AC unit by using a second conducting wire. The first node is coupled to the second node by using a third conducting wire. A current value of the third conducting wire is less than or equal to a current value of the first conducting wire or the second conducting wire. Because the current value of the third conducting wire is small, a cable specification of the third conducting wire may be reduced, and costs of the third conducting wire may be further reduced. In addition, when output powers/voltages of the first-stage DC-to-DC unit and the second-stage DC-to-DC unit are asymmetric, or when input powers/voltages of the first-stage DC-to-AC unit and the second-stage DC-to-AC unit are asymmetric, a current loop can be provided to achieve voltage equalization.

According to a fifth aspect, an embodiment of this application provides a power system, including a power supply, a DC-to-DC unit, and N DC-to-AC units. An output terminal of the power supply is coupled to an input terminal of the DC-to-DC unit. A positive output terminal of the DC-to-DC unit is coupled to a positive input terminal of a first DC-to-AC unit. A negative output terminal of the DC-to-DC unit is coupled to a negative input terminal of an $N^{th}$ DC-to-AC unit. A negative input terminal of an $n^{th}$ DC-to-AC unit is coupled in series to a positive input terminal of an $(n+1)^{th}$ DC-to-AC unit to form a first node, where n is an integer greater than 0 and less than N. An output terminal of the DC-to-AC unit is isolated.

In the power system according to the fifth aspect, the DC-to-AC unit is cascaded to increase an input voltage of the DC-to-AC unit, so as to reduce a current between the DC-to-DC unit and the DC-to-AC unit, so that a cable with a low wire diameter specification may be used between the DC-to-DC unit and the DC-to-AC unit, to resolve a cost problem of the cable from the DC-to-DC unit to the DC-to-AC unit. When the DC-to-DC unit is connected to a plurality of power supplies, the DC-to-DC unit may be used to increase an output voltage, to reduce the current between the DC-to-DC unit and the DC-to-AC unit, and resolve cost and loss problems of the cable from the DC-to-DC unit to the DC-to-AC unit.

According to a sixth aspect, an embodiment of this application provides a power system, including a power supply, a DC-to-DC unit, a first-stage DC-to-AC unit, and a second-stage DC-to-AC unit. An output terminal of the power supply is coupled to an input terminal of the DC-to-DC unit. A positive output terminal of the DC-to-DC unit is coupled to a positive input terminal of the first-stage DC-to-AC unit. A negative output terminal of the DC-to-DC unit is coupled to a negative input terminal of the second-stage DC-to-AC unit. A negative input terminal of the first-stage DC-to-AC unit is coupled to a positive input terminal of the second-stage DC-to-AC unit. Outputs of output terminals of the first-stage DC-to-AC unit and the second-stage DC-to-AC unit are isolated.

In the power system according to the sixth aspect, input terminals of the DC-to-AC units are cascaded, to reduce a current between the DC-to-DC unit and the DC-to-AC unit, and resolve cost and loss problems of a cable from the DC-to-DC unit to the DC-to-AC unit. When the DC-to-DC unit is connected to a plurality of power supplies, the DC-to-DC unit may be used to increase an output voltage, to reduce the current between the DC-to-DC unit and the DC-to-AC unit, and resolve cost and loss problems of the cable from the DC-to-DC unit to the DC-to-AC unit.

With reference to the power system according to the sixth aspect, in a possible implementation, a middle point of an output terminal potential of the DC-to-DC unit is a first node. The negative input terminal of the first-stage DC-to-AC unit is coupled to the positive input terminal of the second-stage DC-to-AC unit to form a second node. The positive output terminal of the DC-to-DC unit is coupled to the positive input terminal of the first-stage DC-to-AC unit by using a first conducting wire. The negative output terminal of the DC-to-DC unit is coupled to the negative output terminal of the second-stage DC-to-AC unit by using a second conducting wire. The first node is coupled to the second node by using a third conducting wire. A current value of the third conducting wire is less than or equal to a current value of the first conducting wire or the second conducting wire. Because the current value of the third conducting wire is small, a cable specification of the third conducting wire may be reduced, and costs of the third conducting wire may be further reduced. In addition, when output power/voltage of the DC-to-DC unit is asymmetric, or when input powers/voltages of the first-stage DC-to-AC unit and the second-stage DC-to-AC unit are asymmetric, a current loop can be provided to achieve voltage equalization.

According to a seventh aspect, an embodiment of this application provides a power system, including N first power supplies, M second power supplies, N DC-to-DC units, and S DC-to-AC units. An output terminal of the first power supply is coupled to an input terminal of the DC-to-DC unit. A positive terminal formed by serially connecting output terminals of the N DC-to-DC units and output terminals of the M second power supplies is coupled to a positive terminal formed by serially connecting input terminals of the S DC-to-AC units. A negative terminal formed by serially connecting output terminals of the N DC-to-DC units and output terminals of the M second power supplies is coupled to a negative terminal formed by serially connecting input terminals of the S DC-to-AC units. The output terminals of the N DC-to-DC units and the output terminals of the M second power supplies are coupled in series, and series coupling points form a first node. The input terminals of the S DC-to-AC units are coupled in series, and series coupling points form a second node. At least one first node and at least one second node are coupled by using at least one cable. An output terminal of the DC-to-AC unit is isolated.

In the power system according to the seventh aspect, the DC-to-DC unit and the second power supply are cascaded to increase output voltages of the DC-to-DC unit and the second power supply, so as to reduce a current between the DC-to-DC unit or the second power supply and the DC-to-AC unit, so that a cable with a low wire diameter specification may be used between the DC-to-DC unit or the second power supply and the DC-to-AC unit, to resolve a cost problem of the cable from the DC-to-DC unit or the second power supply to the DC-to-AC unit.

According to an eighth aspect, an embodiment of this application provides a power system, including a first power supply, a DC-to-DC unit, a second power supply, a first-stage DC-to-AC unit, and a second-stage DC-to-AC unit. An output terminal of the first power supply is coupled to an input terminal of the DC-to-DC unit. The DC-to-DC unit is coupled in series to an output terminal of the second power supply, and a coupling point is a first node. A negative input terminal of the first-stage DC-to-AC unit is coupled to a positive input terminal of the second-stage DC-to-AC unit, and a coupling point is a second node. A positive output terminal formed after the DC-to-DC unit is coupled in series to the output terminal of the second power supply is a first port, and the first port is coupled to a positive input terminal of the first-stage DC-to-AC unit. A negative output terminal formed after the DC-to-DC unit is coupled in series to the output terminal of the second power supply is a second port, and the second port is coupled to a negative input terminal of the second-stage DC-to-AC unit. Outputs of output terminals of the first-stage DC-to-AC unit and the second-stage DC-to-AC unit are isolated.

In the power system according to the eighth aspect, the DC-to-DC unit and the second power supply are cascaded to increase output voltages of the DC-to-DC unit and the second power supply, so as to reduce a current between the DC-to-DC unit or the second power supply and the DC-to-AC unit (the first-stage DC-to-AC unit and the second-stage DC-to-AC unit), so that a cable with a low wire diameter specification may be used between the DC-to-DC unit or the second power supply and the DC-to-AC unit, to resolve a cost problem of the cable from the DC-to-DC unit or the second power supply to the DC-to-AC unit.

With reference to the eighth aspect, in a possible implementation, the first port is coupled to the positive input terminal of the first-stage DC-to-AC unit by using a first conducting wire. The second port is coupled to the negative input terminal of the second-stage DC-to-AC unit by using a second conducting wire. The first node is coupled to the second node by using a third conducting wire. A current value of the third conducting wire is less than or equal to a current value of the first conducting wire or the second conducting wire. Because the current value of the third conducting wire is small, a cable specification of the third conducting wire may be reduced, and costs of the third conducting wire may be further reduced. In addition, when output powers/voltages of the DC-to-DC unit and the second power supply are asymmetric, or when input powers/voltages of the first-stage DC-to-AC unit and the second-stage DC-to-AC unit are asymmetric, a current loop can be provided to achieve voltage equalization.

BRIEF DESCRIPTION OF THE DRAWINGS

FIG. 9a is a schematic diagram of a power system that includes a first equalization circuit unit;

FIG. 9b1 is a schematic diagram 1 of a power system that includes a second equalization circuit unit;

FIG. 9b2 is a schematic diagram 2 of a power system that includes a second equalization circuit unit;

FIG. 9d1 is a schematic diagram 1 of a power system that includes a fourth equalization circuit unit;

FIG. 9d2 is a schematic diagram 2 of a power system that includes a fourth equalization circuit unit;

DETAILED DESCRIPTION OF ILLUSTRATIVE EMBODIMENTS

The following describes in detail technical solutions in embodiments of this application with reference to the accompanying drawings in embodiments of this application.

To resolve a problem of high cost and loss of a photovoltaic power generation system, an embodiment of this application provides a power system. An output terminal of a power supply or a direct current-to-direct current (DC-to-DC) unit is cascaded to increase an output voltage, to reduce a current between the power supply or the DC-to-DC unit and a direct current-to-alternating current (AC-to-DC) unit, and resolve cost and loss problems of a cable from the power supply or the DC-to-DC unit to the DC-to-AC unit. In addition, according to the power system provided in embodiments of this application, a quantity of cables from the power supply or the DC-to-DC unit to the DC-to-AC unit may be further reduced by cascading the output terminal of the power supply or the DC-to-DC unit and cascading an input of the DC-to-AC unit, to reduce system costs. In addition, in the power system provided in embodiments of this application, the cascaded input and isolated output of the DC-to-AC unit can reduce a specification of a power conversion device. Therefore, problems of insufficient specifications and high costs of power conversion devices in the current industry are resolved. In addition, a 1500 V circuit breaker may be used to reduce costs. In some embodiments, when an output of the DC-to-DC unit is cascaded, in this embodiment of this application, a problem of potential induced degradation (PID) caused by a negative voltage of a photovoltaic cell panel to ground during operation of the system may be resolved by designing a system at a DC-to-DC unit level.

The following describes in detail the foregoing solutions by using embodiments. The following embodiments are described by using a photovoltaic array as an example. Another similar power system has a same principle as the photovoltaic array. For implementation of the another similar power system, refer to the following embodiments of the photovoltaic array. Details are not described in this embodiment of this application.

Embodiment 1

Figure 1:
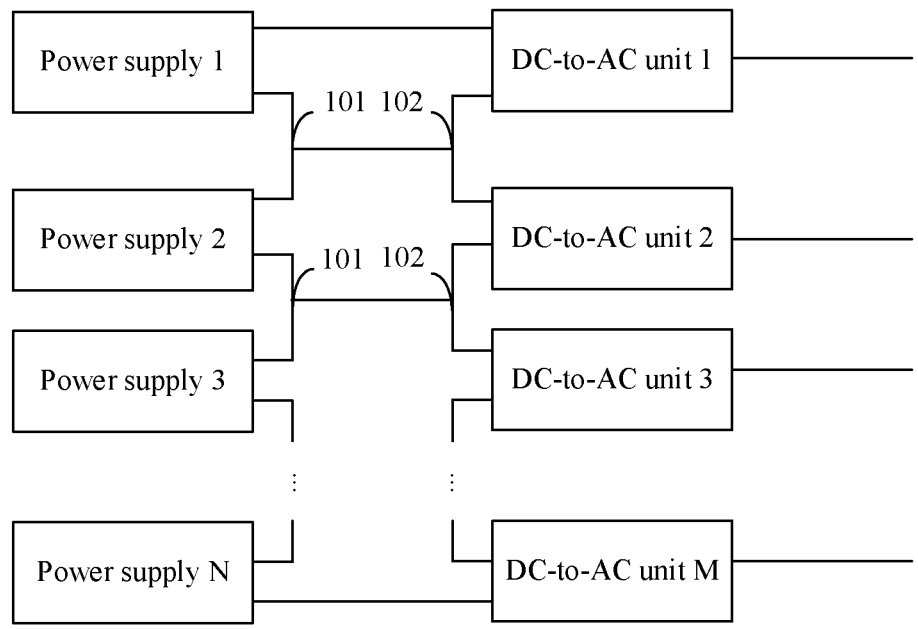
FIG. 1 is a schematic diagram of Embodiment 1 of a power system according to an embodiment of this application.

FIG. 1 is a schematic diagram of Embodiment 1 of a power system according to an embodiment of this application. The power system includes N power supplies and M DC-to-AC units. N is an integer greater than 1. M is an integer greater than 1. It may be understood that N has no value relationship with M, that is, N may be equal to M, N may be greater than M, or N may be less than M. This is not limited in this embodiment of this application.

Figure 2:
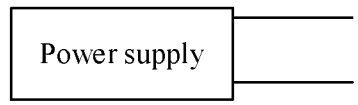
FIG. 2 is a schematic diagram of a power supply according to an embodiment of this application.

Among the N power supplies, each power supply is configured with a positive output terminal and a negative output terminal, as shown in FIG. 2. FIG. 2 is a schematic diagram of a power supply according to an embodiment of this application. In this embodiment of this application, for ease of description, unless otherwise specified or marked, an output terminal in the upper right part of the power supply is generally referred to as a positive output terminal, and an output terminal in the lower right part of the power supply is generally referred to as a negative output terminal. The power supply in this embodiment of this application may be a photovoltaic array, an energy storage power supply, or a wind power generation direct current source. In actual application, the power supply may alternatively be another type of power supply. This is not limited in this embodiment of this application. In this embodiment of this application, the N power supplies may be of a same type, for example, all of the N power supplies are photovoltaic arrays. Alternatively, the N power supplies may not be of a same type, for example, a power supply 1 is a photovoltaic array, a power supply 2 is an energy storage power supply, and so on. This is not limited in this embodiment of this application.

Figure 3A:
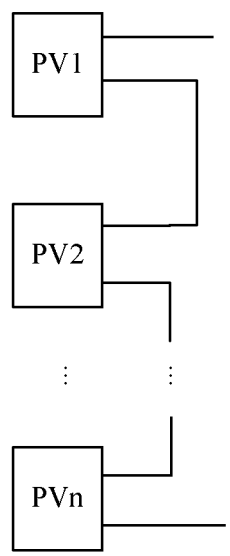
FIG. 3a is a schematic diagram of a photovoltaic array according to an embodiment of this application.
Figure 3B:
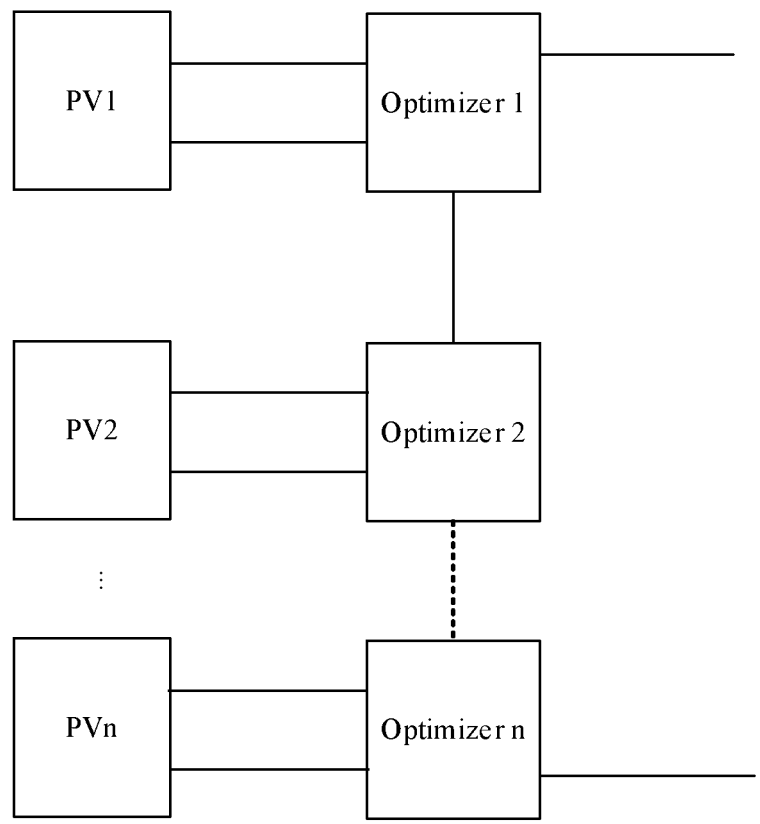
FIG. 3b is a schematic diagram of another photovoltaic array according to an embodiment of this application.

The photovoltaic (PV) array may be formed by connecting photovoltaic cell panels in series or in parallel combinations, as shown in FIG. 3*a*. FIG. 3*a* is a schematic diagram of a photovoltaic array according to an embodiment of this application. Photovoltaic PV cell panels may be first connected in series and then connected in parallel to form the photovoltaic array, may be first connected in parallel and then connected in series to form the photovoltaic array, may be directly connected in series to form the photovoltaic array, or may be directly connected in parallel to form the photovoltaic array. This is not limited in this embodiment of this application. Alternatively, the photovoltaic array may be formed by connecting an output of the photovoltaic cell panel to an optimizer or a shutdown device, and then connecting in series or in parallel combinations, as shown in FIG. 3*b*. FIG. 3*b* is a schematic diagram of another photovoltaic array according to an embodiment of this application. An output of each photovoltaic cell panel may be connected to an optimizer or a shutdown device, and then an output of the optimizer or the shutdown device is combined in series/parallel to form the photovoltaic array. In a possible case, some photovoltaic cell panels are connected to the optimizer or the shutdown device, and some other photovoltaic cell panels are not connected to the optimizer or the shutdown device, and then these photovoltaic cell panels are combined in series/parallel to form the photovoltaic array. The optimizer or the shutdown device is a device that can implement a fast shutdown function. After receiving a shutdown instruction, the optimizer or the shutdown device can cut off a corresponding line to disconnect the line. In actual application, the optimizer or the shutdown device may alternatively be replaced by another apparatus having a similar function. This is not limited in this embodiment of this application.

Figure 4:
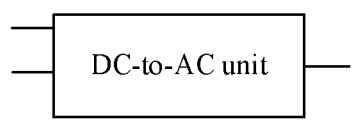
FIG. 4 is a schematic diagram of a DC-to-AC unit according to an embodiment of this application.

Among the M DC-to-AC units, each DC-to-AC unit is configured with a positive input terminal, a negative input terminal, and an output terminal, as shown in FIG. 4. FIG. 4 is a schematic diagram of a DC-to-AC unit according to an embodiment of this application. In this embodiment of this application, for ease of description, unless otherwise specified or marked, an input terminal in the upper left part of the DC-to-AC unit is generally referred to as a positive input terminal, an input terminal in the lower left part of the DC-to-AC unit is generally referred to as a negative input terminal, and an output terminal is arranged at a right side of the DC-to-AC unit. The DC-to-AC unit in this embodiment of this application is an apparatus that can convert a direct current into an alternating current, for example, an inverter. This is not limited in this embodiment of this application. An output of the DC-to-AC unit in this embodiment of this application may be a three-phase voltage or a single-phase voltage. The following embodiments are described by using an example in which a three-phase voltage is at an output terminal. For implementation of another case, for example, a single-phase voltage, refer to this embodiment of this application. Details are not described in this application.

It may be understood that, in this embodiment of this application, the output terminal may include a positive output terminal and a negative output terminal. For example, an output terminal of a power supply 1 includes a positive output terminal and a negative output terminal of the power supply 1. The input terminal may also include a positive input terminal and a negative input terminal. For example, an input terminal of a DC-to-AC unit 1 includes a positive input terminal and a negative input terminal.

It can be seen from FIG. 1 that, in the power system, the positive output terminal of the power supply 1 is coupled to the positive input terminal of the DC-to-AC unit 1, and a negative output terminal of a power supply N is coupled to a negative input terminal of a DC-to-AC unit M. The negative output terminal of the power supply 1 is coupled to a positive output terminal of a power supply 2, a negative output terminal of the power supply 2 is coupled to a positive output terminal of a power supply 3, . . . , and so on. In addition, in this embodiment of this application, nodes such as a coupling node between the negative output terminal of the power supply 1 and the positive output terminal of the power supply 2, and a coupling node between the negative output terminal of the power supply 2 and the positive output terminal of the power supply 3 each may be referred to as a first node 101. The negative input terminal of the DC-to-AC unit 1 is coupled to a positive input terminal of a DC-to-AC unit 2, a negative input terminal of the DC-to-AC unit 2 is coupled to a positive output terminal of a DC-to-AC unit 3, . . . , and so on. In addition, in this embodiment of this application, nodes such as a coupling node between the negative input terminal of the DC-to-AC unit 1 and the positive input terminal of the DC-to-AC unit 2, and a coupling node between the negative input terminal of the DC-to-AC unit 2 and the positive output terminal of the DC-to-AC unit 3 each may be referred to as a second node 102. In this embodiment of this application, outputs of the power supply 1 and the power supply 2 are cascaded, outputs of the power supply 2 and the power supply 3 are cascaded, and so on. In this embodiment of this application, output terminals of the power supplies are cascaded, to increase an output voltage, reduce a current between the power supply and the DC-to-AC unit, and resolve cost and loss problems of a cable from the power supply to the DC-to-AC unit. For example, a maximum output voltage of each power supply is X volts, and a maximum output voltage after the N power supplies are cascaded is NX volts. In a case of a same power, when a voltage increases, an output current decreases, a wire diameter specification of a used cable decreases, and costs decrease.

At least one first node 101 and at least one second node 102 are coupled. For example, in some embodiments, one first node 101 is coupled to one second node 102, and another first node 101 is not coupled to another second node 102. In some other embodiments, two first nodes 101 are respectively coupled to two second nodes 102, and another first node 101 is not coupled to another second node 102. In some other embodiments, a quantity of first nodes 101 is equal to a quantity of second nodes 102, and each first node 101 is coupled to a corresponding second node 102. In some other embodiments, a quantity of first nodes 101 is different from a quantity of second nodes 102, each first node 101 is coupled to a corresponding second node 102, and a remaining first node 101 or a remaining second node 102 is not coupled. In actual application, another coupling manner may alternatively be used. This is not limited in this embodiment of this application. In this embodiment of this application, a quantity of cables connected between the power supply and the DC-to-AC unit is reduced in a manner of the first node 101 and the second node 102, to reduce costs of the power system.

In this embodiment of this application, outputs of output terminals of the DC-to-AC units are isolated. For example, an output terminal of the DC-to-AC unit 1 is isolated from an output terminal of the DC-to-AC unit 2, and an output terminal of the DC-to-AC unit 2 is isolated from an output terminal of the DC-to-AC unit 3. In actual application, the output terminal of each DC-to-AC unit is coupled to different windings, and each winding may output a three-phase voltage or a single-phase voltage. This is not limited in this embodiment of this application. In this embodiment of this application, the cascaded input and isolated output of the DC-to-AC unit reduce a specification of a power conversion device. Therefore, problems of insufficient specifications (generally up to 1700 V for an insulated gate bipolar transistor (IGBT)) and high costs of power conversion devices in the current industry are resolved. In addition, a circuit breaker with a low specification may be used to reduce costs.

It may be understood that, in this embodiment of this application, coupling may also be referred to as a coupling connection, and may include but is not limited to a connection implemented by using any combination of a switching device, a current-limiting device, a protection device, a direct cable connection, or the like.

Figure 5A:
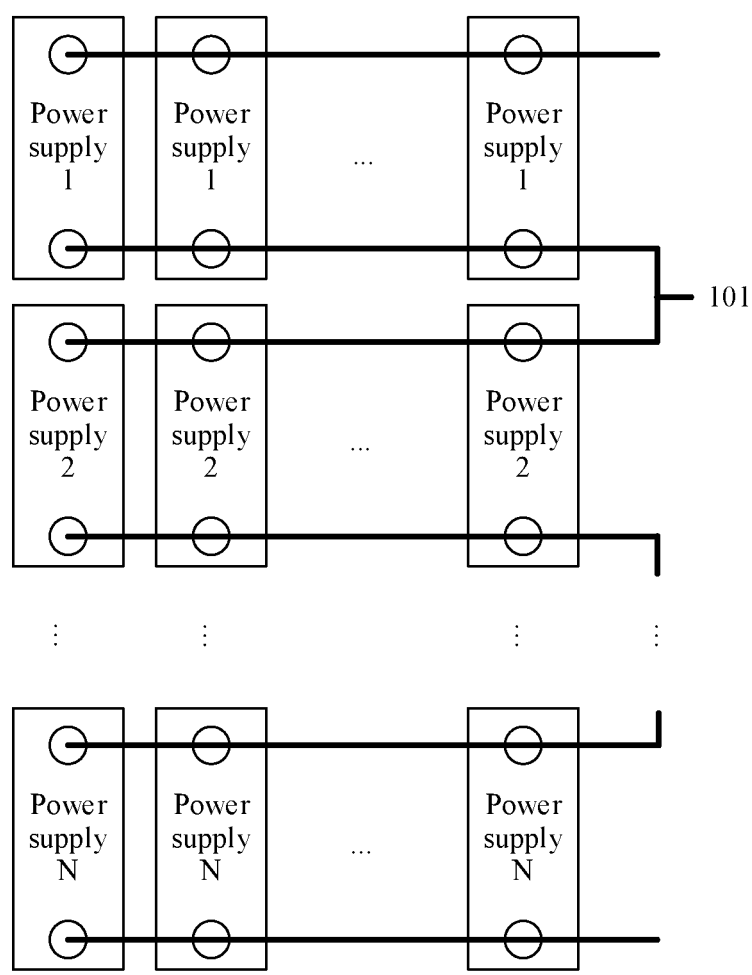
FIG. 5a is a schematic diagram of a plurality of combinations of power supplies connected in parallel according to an embodiment of this application.
Figure 5B:
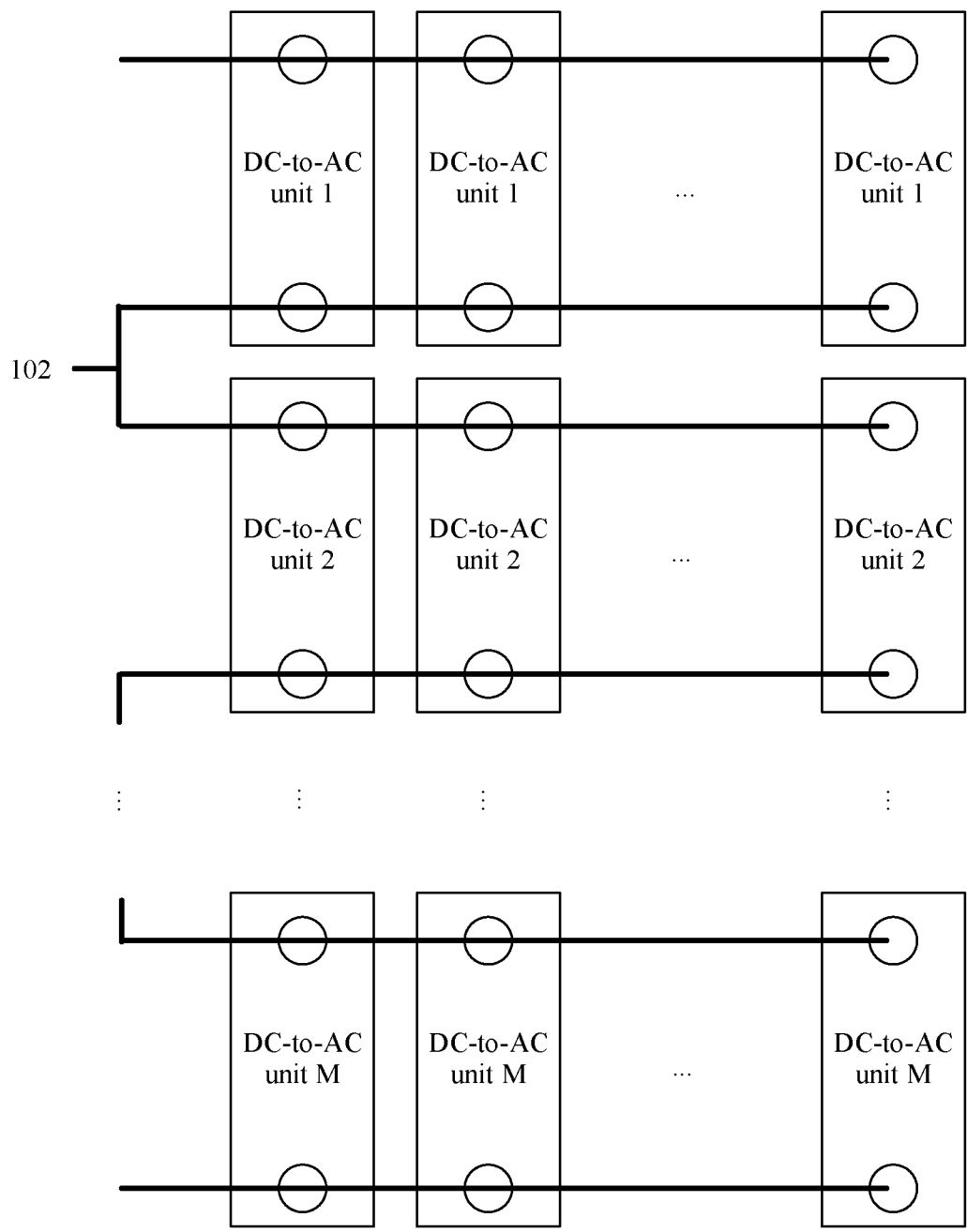
FIG. 5b is a schematic diagram of a plurality of combinations of DC-to-AC units connected in parallel according to an embodiment of this application.

In some embodiments, the power supply 1, the power supply 2, . . . , and the power supply N in FIG. 1 may be considered as one combination of power supplies, and the DC-to-AC unit 1, the DC-to-AC unit 2, . . . , and the DC-to-AC unit M may be considered as one combination of DC-to-AC units. When there are at least two combinations of power supplies and/or at least two combinations of DC-to-AC units, same-type output terminals of at least two combinations of power supplies are connected in parallel, and same-type input terminals of at least two combinations of DC-to-AC units are connected in parallel. There is at least one cable coupled between the parallel-connected same-type output terminals and the parallel-connected same-type input terminals. FIG. 5a is a schematic diagram of a plurality of combinations of power supplies connected in parallel according to an embodiment of this application. In FIG. 5a, each vertical row is one combination of power supplies, and each combination of power supplies includes a power supply 1, a power supply unit 2, . . . , and a power supply N. In this case, a positive output terminal of a power supply 1 in a first combination of power supplies is coupled in parallel with a positive output terminal of a power supply 1 in a second combination of power supplies (that is, same-type output terminals are coupled in parallel), a negative output terminal of the power supply 1 in the first combination of power supplies is coupled in parallel to a negative output terminal of the power supply 1 in the second combination of power supplies, . . . , and so on. It may be understood that output terminals of the power supply 1, the power supply 2, . . . , and the power supply N may be cascaded to form at least one first node. FIG. 5b is a schematic diagram of a plurality of combinations of DC-to-AC units connected in parallel according to an embodiment of this application. In FIG. 5b, each vertical row is one combination of DC-to-AC units, and each combination of DC-to-AC units includes a DC-to-AC unit 1, a DC-to-AC unit 2, . . . , and a DC-to-AC unit M. A positive input terminal of a DC-to-AC unit 1 in a first combination of DC-to-AC units is coupled in parallel to a positive input terminal of a DC-to-AC unit 1 in a second combination of DC-to-AC units (that is, same-type input terminals are coupled in parallel), a negative input terminal of the DC-to-AC unit 1 in the first combination of DC-to-AC units is coupled in parallel to a negative input terminal of the DC-to-AC unit 1 in the second combination of DC-to-AC units, . . . , and so on. It may be understood that input terminals of the DC-to-AC unit 1, the DC-to-AC unit 2, . . . , and the DC-to-AC unit M may be cascaded to form at least one second node. The at least one first node is coupled to the at least one second node, in other words, there is at least one cable coupled between the parallel-connected same-type output terminals and the parallel-connected same-type input terminals.

Figure 5C:
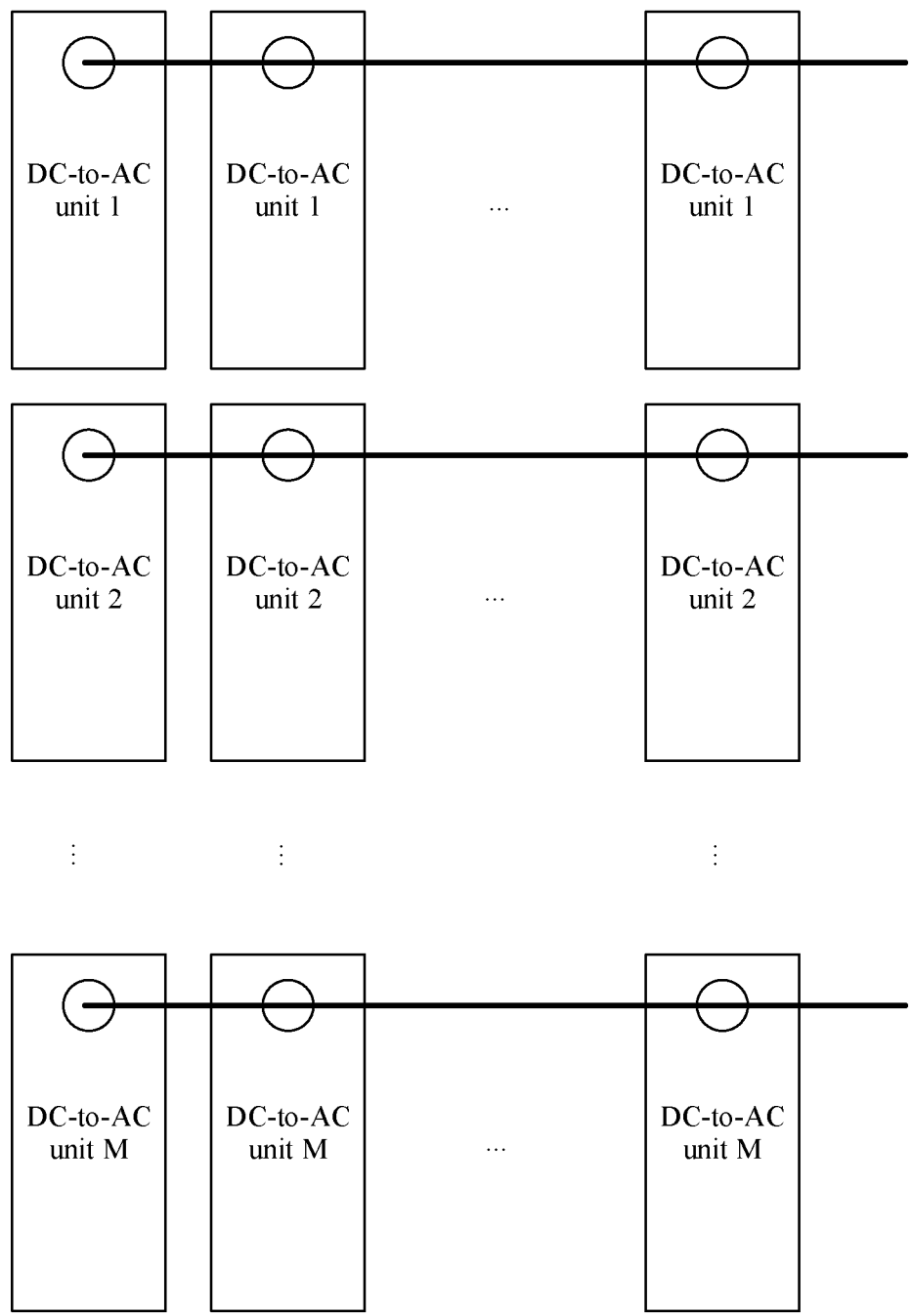
FIG. 5c is another schematic diagram of a plurality of combinations of DC-to-AC units connected in parallel according to an embodiment of this application.

FIG. 5c is another schematic diagram of the plurality of combinations of DC-to-AC units connected in parallel according to an embodiment of this application. In FIG. 5c, each vertical row is one combination of DC-to-AC units, and each combination of DC-to-AC units includes a DC-to-AC unit 1, a DC-to-AC unit 2, . . . , and a DC-to-AC unit M. In a possible case, an output terminal of the DC-to-AC unit 1 in the first combination of DC-to-AC units may be coupled in parallel to an output terminal of the DC-to-AC unit 1 in the second combination of DC-to-AC units, and then a winding is connected to implement parallel output. In another possible case, an output of an output terminal of the DC-to-AC unit 1 in the first combination of DC-to-AC units is isolated from an output of an output terminal of the DC-to-AC unit 1 in the second combination of DC-to-AC units, that is, different windings are connected to implement isolated output. The same rule is applied to another DC-to-AC unit. Details are not described in this embodiment of this application.

In this embodiment of this application, same-type output terminals mean corresponding output terminals of corresponding apparatuses in different combinations. For example, the positive output terminal of the power supply 1 in the first combination of power supplies and the positive output terminal of the power supply 1 in the second combination of power supplies are same-type output terminals; the output terminal of the DC-to-AC unit 1 in the first combination of DC-to-AC units and the output terminal of the DC-to-AC unit 1 in the second combination of DC-to-AC units are same-type output terminals; and the output terminal of the DC-to-DC unit 1 in the first combination of DC-to-DC units and the output terminal of the DC-to-DC unit 1 in the second combination of DC-to-DC units are same-type output terminals. Same-type input terminals mean corresponding input terminals of corresponding apparatuses in different combinations. For example, the positive input terminal of the DC-to-AC unit 1 in the first combination of DC-to-AC units and the positive input terminal of the DC-to-AC unit 1 in the second combination of DC-to-AC units are same-type input terminals; the positive input terminal of the DC-to-DC unit 1 in the first combination of DC-to-DC units and the positive input terminal of the DC-to-DC unit 1 in the second combination of DC-to-DC units are same-type input terminals; and so on.

In some embodiments, a communication signal is coupled to a direct current cable connected between the power supply and the DC-to-AC unit. It may be understood that the direct current cable connected between the power supply and the DC-to-AC unit may be a direct current cable for coupling the positive output terminal of the power supply 1 and the positive input terminal of the DC-to-AC unit 1, may be a direct current cable for coupling the negative output terminal of the power supply N and the negative input terminal of the DC-to-AC unit M, may be a direct current cable for coupling the first node and the second node, may be a direct current cable for cascading outputs the power supply 1, the power supply 2, . . . , and the power supply N, or may be a direct current cable for cascading inputs of the DC-to-AC unit 1, the DC-to-AC unit 2, . . . , and the DC-to-AC unit M. Preferably, the communication signal may be a power line communication (PLC) signal. This type of signal coupled to the cable loads a high frequency that carries information into a current, and then an adapter that transmits and receives the information by using the cable separates the high frequency from the current to implement information transfer. Therefore, if the power supply and the DC-to-AC unit are devices that can recognize a communication signal, the power supply may communicate with the DC-to-AC unit by using a communication signal coupled to a direct current cable. In actual application, the communication signal may alternatively be a signal that can implement communication other than the PLC signal. This is not limited in this embodiment of this application. In actual application, the power system may use a power supply and a DC-to-AC unit that can recognize a communication signal, or may modify a power supply and a DC-to-AC unit so that the power supply and the DC-to-AC unit can recognize a communication signal. This is not limited in this embodiment of this application.

In some embodiments, the power supply is the photovoltaic array formed by connecting the output of the photovoltaic cell panel to the optimizer or the shutdown device, and then connecting in series or in parallel combinations. When the communication signal is coupled to the direct current cable connected between the power supply and the DC-to-AC unit, the communication signal also passes through the optimizer or the shutdown device, and the power supply or the DC-to-AC unit may control, by using the communication signal, shutdown of the optimizer or the shutdown device, to implement fast shutdown. That is, the power supply or the DC-to-AC unit may send a communication signal that carries a shutdown instruction to the optimizer or the shutdown device. After receiving the communication signal that carries the shutdown instruction, the optimizer or the shutdown device executes the shutdown instruction, to implement fast shutdown. A situation of the communication signal is similar to the description of the communication signal in the foregoing embodiment, and details are not described herein again.

In some embodiments, the power system further includes at least one energy storage unit. The energy storage unit is coupled in parallel to at least two direct current cables connected between the power supply and the DC-to-AC unit. In this embodiment of this application, the direct current cable connected between the power supply and the DC-to-AC unit may be a direct current cable connected between the power supply and the DC-to-AC unit, may be a direct current cable for coupling the positive output terminal of the power supply 1 and the positive input terminal of the DC-to-AC unit 1, may be a direct current cable for coupling the negative output terminal of the power supply N and the negative input terminal of the DC-to-AC unit M, or may be a direct current cable for coupling the first node and the second node. For example, the energy storage unit is coupled in parallel between the direct current cable for coupling the positive output terminal of the power supply 1 and the positive input terminal of the DC-to-AC unit 1 and the direct current cable for coupling the negative output terminal of the power supply N and the negative input terminal of the DC-to-AC unit M. Alternatively, the energy storage unit is coupled in parallel among three direct current cables for coupling the first node and the second node. It may be understood that a quantity of energy storage units included in one power system is not limited, that is, a plurality of energy storage units may be coupled in parallel at the same time. This is not limited in this embodiment of this application. In this embodiment of this application, the energy storage unit may be an energy storage device, or may include a direct current conversion unit and the energy storage device, or may be another apparatus capable of storing energy. This is not limited in this embodiment of this application. The energy storage device may include but is not limited to a supercapacitor, a battery, and the like. The direct current conversion unit may be a DC-to-DC unit or the like. This is not limited in this embodiment of this application.

In some embodiments, when the power system is configured with the energy storage unit, a communication signal is coupled to a direct current cable connected between the energy storage unit and the power supply, and the energy storage unit may communicate with the power supply. A situation of the communication signal and a principle for implementing communication are similar to the description of the communication signal in the foregoing embodiment, and details are not described herein again. In some other embodiments, when the power system is configured with the energy storage unit, a communication signal is coupled to a direct current cable connected between the energy storage unit and the DC-to-AC unit, and the energy storage unit may communicate with the DC-to-AC unit. A situation of communication is similar to the foregoing situation of communication implemented between the energy storage unit and the power supply. Details are not described herein again.

Embodiment 2

Figure 6:
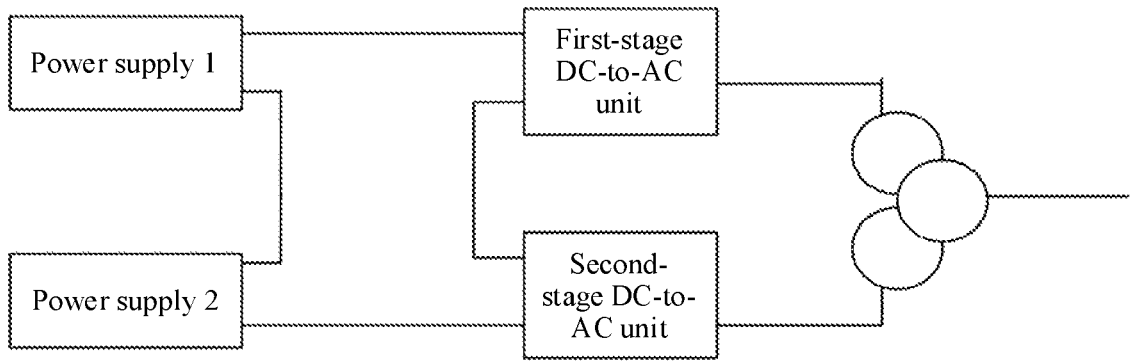
FIG. 6 is a schematic diagram of Embodiment 2 of a power system according to an embodiment of this application.

FIG. 6 is a schematic diagram of Embodiment 2 of a power system according to an embodiment of this application. The power system includes a power supply 1, a power supply 2, a first-stage DC-to-AC unit, and a second-stage DC-to-AC unit. The power supply 1 and the power supply 2 may be a photovoltaic array, energy storage power supplies, or wind power generation direct current sources, which are similar to those in Embodiment 1, and details are not described herein again. The first-stage DC-to-AC unit and the second-stage DC-to-AC unit may be apparatuses that can convert a direct current into an alternating current, for example, an inverter. This is not limited in this embodiment of this application.

In this embodiment of this application, a positive output terminal of the power supply 1 is coupled to a positive input terminal of the first-stage DC-to-AC unit, a negative output terminal of the power supply 2 is coupled to a negative input terminal of the second-stage DC-to-AC unit, a negative output terminal of the power supply 1 is coupled to a positive output terminal of the power supply 2, and a negative input terminal of the first-stage DC-to-AC unit is coupled to a positive input terminal of the second-stage DC-to-AC unit. Therefore, outputs of the power supply 1 and the power supply 2 are cascaded, and inputs of the first-stage DC-to-AC unit and the second-stage DC-to-AC unit are cascaded. In this embodiment of this application, output terminals of power supplies are cascaded to increase an output voltage, reduce a current between the power supply and the DC-to-AC unit, and resolve cost and loss problems of a cable from the power supply to the DC-to-AC unit. For example, a maximum output voltage of each of the power supply 1 and the power supply 2 is 1500 V, and after the outputs of the power supply 1 and the power supply 2 are cascaded, a maximum output voltage is 3 kV. In a case of a same power, when a voltage increases, an output current decreases, a wire diameter specification of a used cable decreases, and costs decrease.

Outputs of output terminals of the first-stage DC-to-AC unit and the second-stage DC-to-AC unit are isolated, and are connected to different windings. This is similar to the case in which the output of the DC-to-AC unit is isolated in Embodiment 1, and details are not described herein again. In this embodiment of this application, the cascaded input and isolated output of the DC-to-AC unit reduce a specification of a power conversion device. Specifications of power conversion devices in the current industry are insufficient (generally up to 1700 V for an IGBT). However, a 1500 V circuit breaker may be used in the power system provided in this embodiment of this application to reduce costs. The first technical problem of insufficient specifications of the power conversion devices in the current industry is resolved.

A node for coupling the negative output terminal of the power supply 1 and the positive output terminal of the power supply 2 is referred to as a first node. A node for coupling the negative input terminal of the first-stage DC-to-AC unit and the positive input terminal of the second-stage DC-to-AC unit is referred to as a second node.

Figure 7:
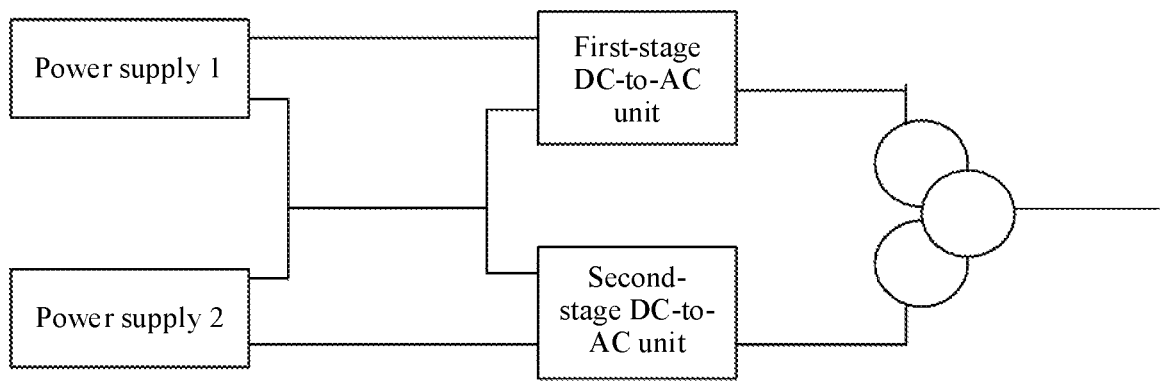
FIG. 7 is a schematic diagram of an embodiment of a power system according to an embodiment of this application.

FIG. 7 is a schematic diagram of an embodiment of the power system according to an embodiment of this application. As shown in FIG. 7, in some embodiments, the positive output terminal of the power supply 1 is coupled to the positive input terminal of the first-stage DC-to-AC unit by using a first conducting wire. The negative output terminal of the power supply 2 is coupled to the negative input terminal of the second-stage DC-to-AC unit by using a second conducting wire. The first node and the second node are coupled by using a third conducting wire. It may be understood that, in this embodiment of this application, the first conducting wire, the second conducting wire, and the third conducting wire are all direct current cables connected between the power supply (the power supply 1 and the power supply 2) and the DC-to-AC unit (the first-stage DC-to-AC unit and the second-stage DC-to-AC unit). A material and a wire diameter specification of the cable may be configured based on an actual situation. This is not limited in this embodiment of this application. It may be understood that, in the conventional technology, the power supply 1 and the power supply 2 may have four output terminals in total, and therefore, four cables are connected. However, in this embodiment of this application, the power supply 1 and the power supply 2 are cascaded, and the first node and the second node are coupled by using one cable, so that the existing technical solution of using four cables is modified into a solution that requires only three cables. Therefore, this can reduce costs of one cable and construction costs.

In some embodiments, because the first node is a middle point of cascading the power supply 1 and the power supply 2, and the second node is a middle point of cascading the first-stage DC-to-AC unit and the second-stage DC-to-AC unit, a current value of the third conducting wire may be less than or equal to a current value of the first conducting wire. When the current value of the third conducting wire is less than or equal to the current value of the first conducting wire, a wire diameter specification of the third conducting wire may be reduced, to reduce costs of the third conducting wire. In some other embodiments, similarly, the current value of the third conducting wire is less than or equal to a current value of the second conducting wire. Therefore, when the current value of the third conducting wire is less than or equal to the current value of the second conducting wire, a wire diameter specification of the third conducting wire may be reduced, to reduce cable costs of the third conducting wire. Certainly, the current value of the third conducting wire may alternatively be less than the current value of the first conducting wire and less than the current value of the second conducting wire. This may also reduce the wire diameter specification of the third conducting wire, and reduce the cable costs of the third conducting wire.

In some embodiments, the first conducting wire, the second conducting wire, and the third conducting wire form a distributed double (DC) bus. The first conducting wire and the second conducting wire form a positive bus. The second conducting wire and the third conducting wire form a negative bus. The third conducting wire is a neutral wire (Middle Cable) of the distributed double bus. The first conducting wire, the second conducting wire, and the third conducting wire are direct current conducting wires. In a 3D technology (three directCable), a direct current bus is constructed by using three cables, a positive bus is constructed by using the first conducting wire and the second conducting wire, and a negative bus is constructed by using the second conducting wire and the third conducting wire.

Figure 8:
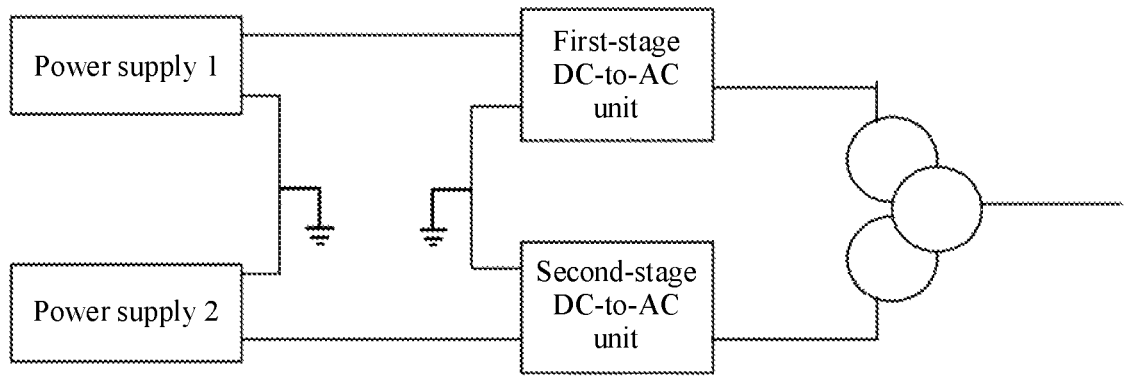
FIG. 8 is a schematic diagram of an embodiment of a power system according to an embodiment of this application.

FIG. 8 is a schematic diagram of an embodiment of the power system according to an embodiment of this application. As shown in FIG. 8, in some embodiments, both the first node and the second node are coupled to ground. In this embodiment of this application, both the first node and the second node are coupled to ground, so that when output powers or output voltages of the power supply 1 and the power supply 2 are asymmetric, or input powers or input voltages of the first-stage DC-to-AC unit and the second DC-to-AC unit are asymmetric, a current loop is provided to achieve voltage equalization, thereby ensuring normal operation of the system. In addition, no cable connection is required between the first node and the second node, and therefore costs of one cable and construction costs can be reduced.

In some embodiments, when the first node and the second node are coupled, when an output voltage and/or an output current and/or an output power of one of the power supply 1 and the power supply 2 are/is less than a preset value, the corresponding power supply stops working. In this case, at least one of the DC-to-AC unit 1 and the DC-to-AC unit 2 works. In an example, when the output voltage of the power supply 1 is less than the preset value, the power supply 1 stops working, and when the output voltage of the power supply 2 is greater than the preset value, the power supply 2 continues to work. In another example, when the output voltage of the power supply 2 is less than the preset value, the power supply 2 stops working. In this embodiment of this application, the power supply whose output is less than the preset value may be stopped from working. This avoids unnecessary waste, and improves conversion efficiency and utilization. In addition, it is ensured that at least one DC-to-AC unit works, and therefore, normal operation of the system can be ensured in real time.

When the first node and the second node are not coupled, impact of power supply inconsistency is considered. For example, due to different illuminations, in a photovoltaic power generation system, the output voltage of the power supply 1 may be greater than the output voltage of the power supply 2, that is, voltages and/or powers output by the power supply 1 and the power supply 2 may be asymmetric, resulting in a cask effect in the output powers. Therefore, when the first node and the second node are not coupled, the power system may be provided with an equalization circuit to prevent asymmetry of the voltages and/or powers output by the power supply 1 and the power supply 2. The following provides four equalization circuits. In actual application, another equalization circuit may alternatively exist. This is not limited in this embodiment of this application.

In some embodiments, the power system further includes a first equalization circuit unit. FIG. 9a is a schematic diagram of the power system that includes the first equalization circuit unit. The first equalization circuit unit is configured with a first interface, a second interface, and a third interface. The first interface is coupled to the second node. The second interface is coupled to the positive input terminal of the first-stage DC-to-AC unit. The third interface is coupled to the negative input terminal of the second-stage DC-to-AC unit. The first equalization circuit unit may balance the input voltages and/or powers and/or currents of the first-stage DC-to-AC unit and the second-stage DC-to-AC unit. A working principle of the first equalization circuit unit is as follows: The first equalization circuit unit obtains energy from an input terminal of the first-stage DC-to-AC unit through the first interface and the second interface, and compensates the energy to the second-stage DC-to-AC unit through the first interface and the third interface. Alternatively, the first equalization circuit unit obtains energy from an input terminal of the second-stage DC-to-AC unit through the first interface and the third interface, and compensates the energy to the first-stage DC-to-AC unit through the first interface and the second interface.

In some embodiments, the power system further includes a second equalization circuit unit. FIG. 9b1 is a schematic diagram 1 of the power system that includes the second equalization circuit unit. FIG. 9b2 is a schematic diagram 2 of the power system that includes the second equalization circuit unit. The second equalization circuit unit is configured with a fourth interface and a fifth interface. The fourth interface is coupled to the second node. The fifth interface is coupled to the positive input terminal of the first-stage DC-to-AC unit or coupled to the negative input terminal of the second-stage DC-to-AC unit. A working principle of the second equalization circuit unit is similar to the working principle of the first equalization circuit unit. Specifically, the second equalization circuit unit may compensate energy of the first-stage DC-to-AC unit to the second-stage DC-to-AC unit, or compensate energy of the second-stage DC-to-AC unit to the first-stage DC-to-AC unit. Therefore, the second equalization circuit unit may be configured to balance the input voltages and/or powers and/or currents of the first-stage DC-to-AC unit and the second-stage DC-to-AC unit.

Figure 9C:
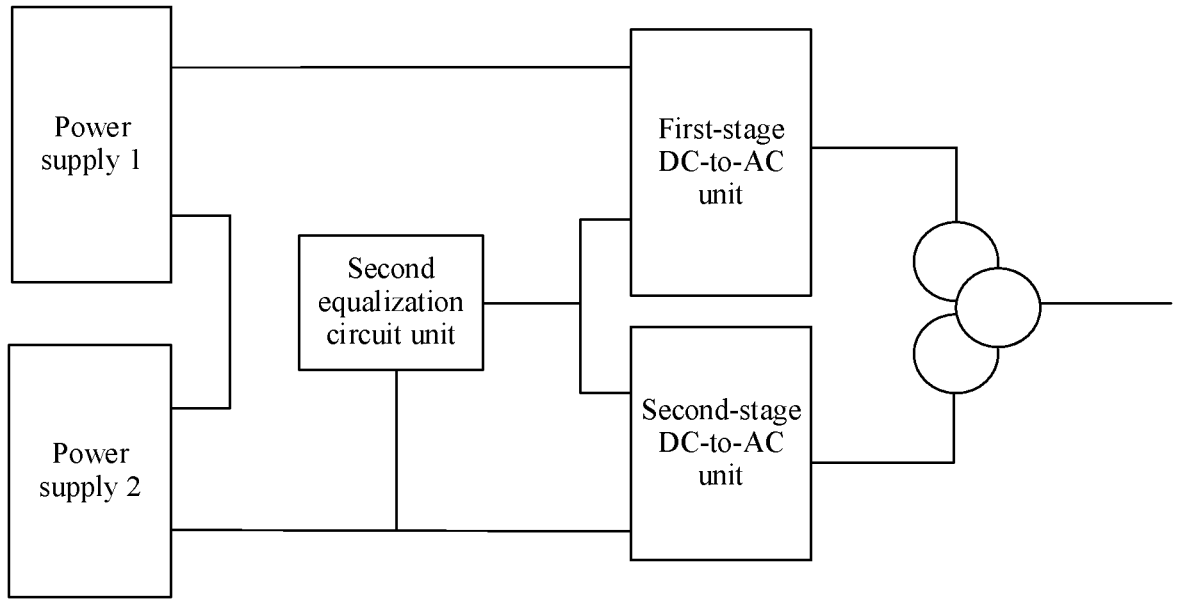
FIG. 9c is a schematic diagram of a power system that includes a third equalization circuit unit.
Figure 9C:
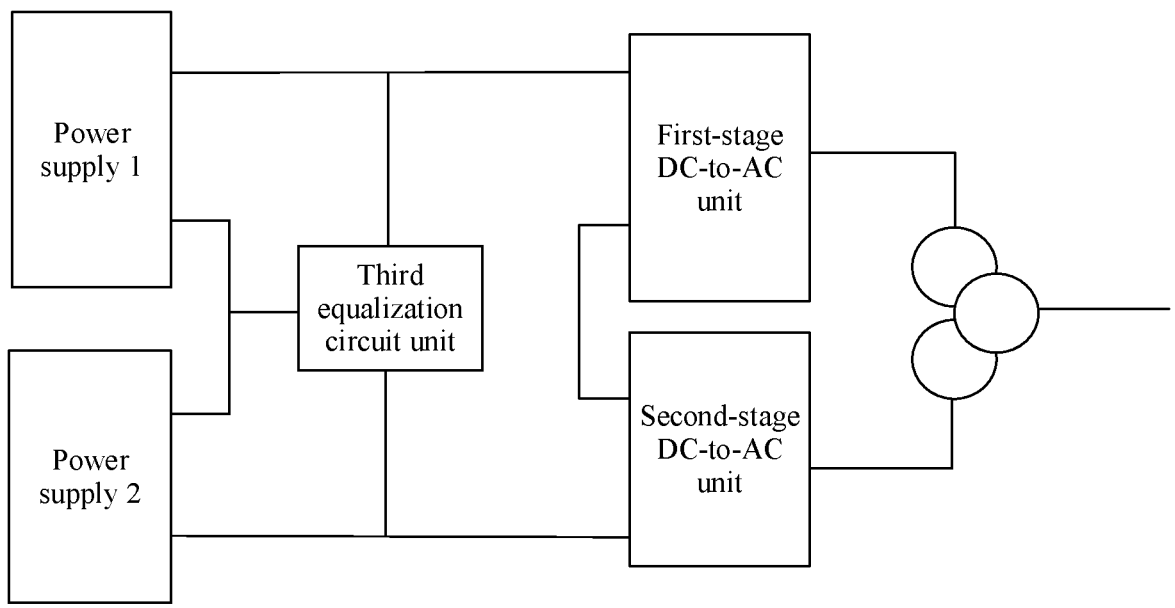

In some embodiments, the power system further includes a third equalization circuit unit. FIG. 9c is a schematic diagram of the power system that includes the third equalization circuit unit. The third equalization circuit unit is configured with a sixth interface, a seventh interface, and an eighth interface. The sixth interface is coupled to the first node. The seventh interface is coupled to the positive output terminal of the power supply 1. The eighth interface is coupled to the negative output terminal of the power supply 2. A working principle of the third equalization circuit unit is similar to the working principle of the first equalization circuit unit. Specifically, the third equalization circuit unit may compensate energy output by the power supply 1 to the power supply 2, or compensate energy output by the power supply 2 to the power supply 1. Therefore, the third equalization circuit unit may be configured to balance the output voltages and/or powers and/or currents of the power supply 1 and the power supply 2.

In some embodiments, the power system further includes a fourth equalization circuit unit. FIG. 9d1 is a schematic diagram 1 of the power system that includes the fourth equalization circuit unit. FIG. 9d2 is a schematic diagram 2 of the power system that includes the fourth equalization circuit unit. The fourth equalization circuit unit is configured with a ninth interface and a tenth interface. The ninth interface is coupled to the first node. The tenth interface is coupled to the positive output terminal of the power supply 1 or to the negative output terminal of the power supply 2. A working principle of the fourth equalization circuit unit is similar to the working principle of the first equalization circuit unit. Specifically, the fourth equalization circuit unit may compensate the energy output by the power supply 1 to the power supply 2, or compensate the energy output by the power supply 2 to the power supply 1. Therefore, the fourth equalization circuit unit may be configured to balance the output voltages and/or powers and/or currents of the power supply 1 and the power supply 2.

In some embodiments, the output terminals of the first-stage DC-to-AC unit and the second-stage DC-to-AC unit are respectively coupled to different transformers. Alternatively, the output terminals of the first-stage DC-to-AC unit and the second-stage DC-to-AC unit are respectively coupled to different windings of a same transformer, to implement isolated output.

Figure 10A:
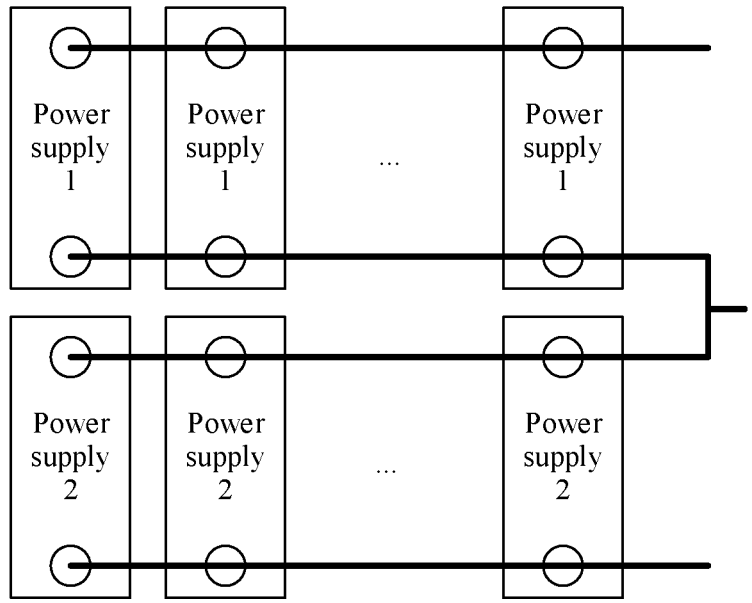
FIG. 10a is a schematic diagram of a plurality of combinations of power supplies connected in parallel according to an embodiment of this application.
Figure 10B:
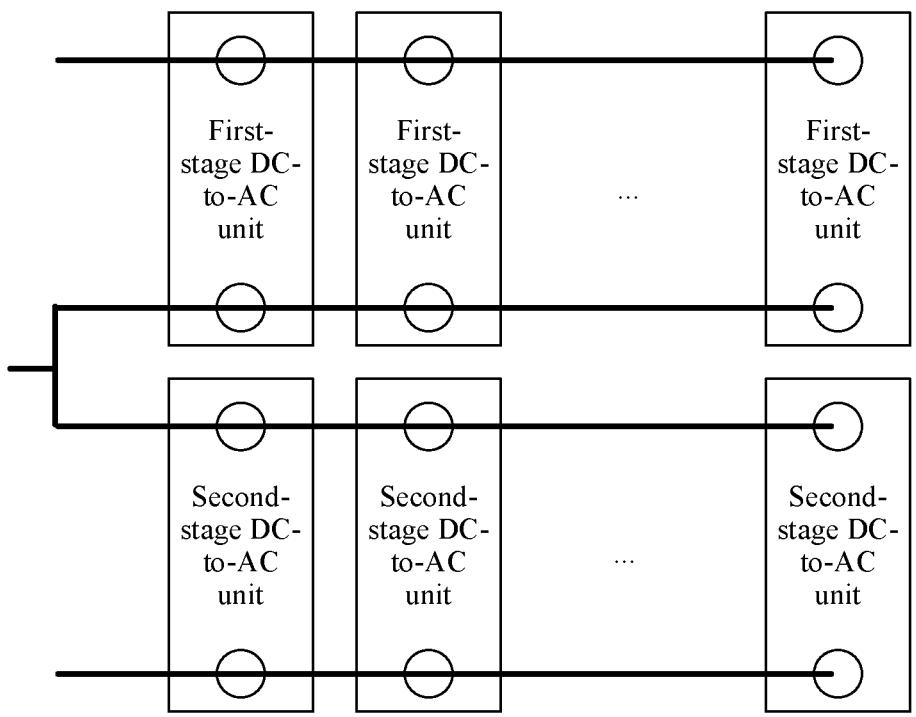
FIG. 10b is a schematic diagram of a plurality of combinations of DC-to-AC units connected in parallel according to an embodiment of this application.
Figure 10C:
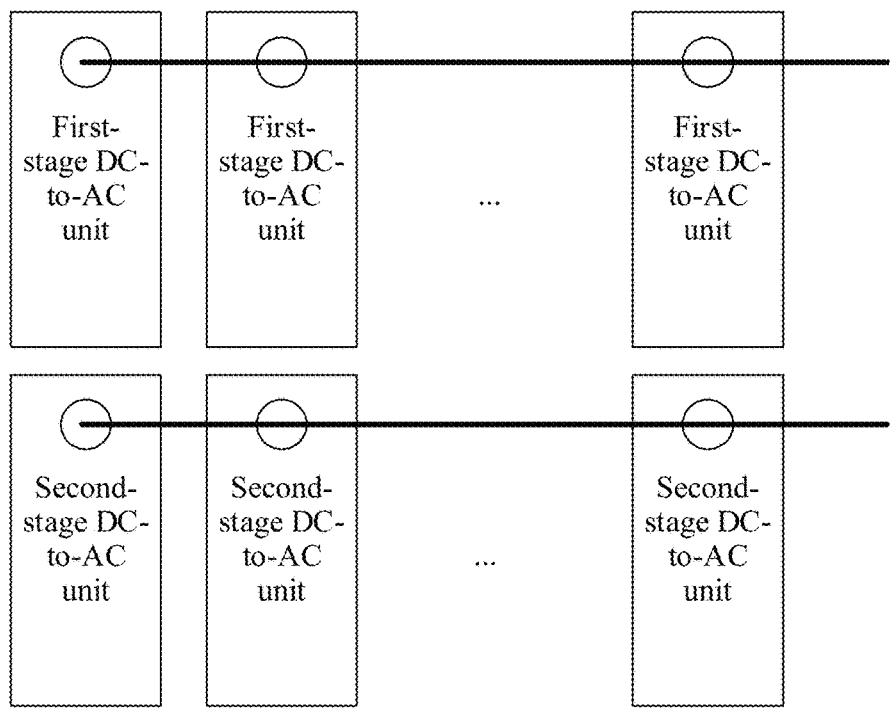
FIG. 10c is another schematic diagram of a plurality of combinations of DC-to-AC units connected in parallel according to an embodiment of this application.

In some embodiments, the power supply 1 and the power supply 2 are considered as one combination of power supplies. The first-stage DC-to-AC unit and the second-stage DC-to-AC unit are considered as one combination of DC-to-AC units. FIG. 10a is a schematic diagram of a plurality of combinations of power supplies connected in parallel according to an embodiment of this application. As shown in FIG. 10a, when at least two combinations of power supplies are coupled, an output terminal corresponding to a power supply 1 in a first combination of power supplies is coupled in parallel to an output terminal corresponding to a power supply 1 in a second combination of power supplies. This is similar to the description of the combination of power supplies in Embodiment 1, and details are not described herein again. FIG. 10b is a schematic diagram of a plurality of combinations of DC-to-AC units connected in parallel according to an embodiment of this application. When at least two combinations of DC-to-AC units are connected in parallel, an input terminal of a first-stage DC-to-AC unit in a first combination of DC-to-AC units is connected in parallel to an input terminal of a first-stage DC-to-AC unit in a second combination of DC-to-AC units. This is similar to the description of the situation of the input terminal of the combination of DC-to-AC units in Embodiment 1, and details are not described herein again. FIG. 10c is another schematic diagram of a plurality of combinations of DC-to-AC units connected in parallel according to an embodiment of this application. When at least two combinations of DC-to-AC units are connected in parallel, an output of an output terminal of a first-stage DC-to-AC unit in a first combination of DC-to-AC units and an output of an output terminal of a first-stage DC-to-AC unit in a second combination of DC-to-AC units may be connected in parallel, or may be isolated. This is similar to the situation of the output terminal of the combination of DC-to-AC units in Embodiment 1, and details are not described herein again.

In some embodiments, an insulation monitoring device (IMD) is coupled between the output terminal of the first-stage DC-to-AC unit and a ground point. In some other embodiments, an IMD is coupled between the output terminal of the second-stage DC-to-AC unit and a ground point. In some other embodiments, a first IMD is coupled between the output terminal of the first-stage DC-to-AC unit and a ground point, and a second IMD is coupled between the output terminal of the second-stage DC-to-AC unit and the ground point. The IMD can detect insulation impedance to ground of the power system. When the insulation impedance to ground is less than a preset value, preferably, in this embodiment of this application, a coupling connection between the first-stage DC-to-AC unit and/or the second-stage DC-to-AC unit and a transformer winding may be broken, so that the entire system stops working, thereby further ensuring safety of system operation.

In this embodiment of this application, a communication signal is coupled to a direct current cable connected between the power supply 1, the power supply 2, the first-stage DC-to-AC unit, and the second-stage DC-to-AC unit, to implement communication between the power supply 1, the power supply 2, the first-stage DC-to-AC unit, and the second-stage DC-to-AC unit. The communication signal is preferably a PLC signal, which is similar to the description of the communication signal in the foregoing embodiment, and details are not described herein again.

In this embodiment of this application, a communication signal is coupled to an alternating current cable connected to the output terminal of the first-stage DC-to-AC unit, and the alternating current cable may be further coupled to another device. The first-stage DC-to-AC unit may communicate with another device on the alternating current cable by using the communication signal. When a plurality of combinations of DC-to-AC units are connected in parallel, and outputs of a plurality of first-stage DC-to-AC units are connected in parallel, the parallel-connected output terminals of the plurality of first-stage DC-to-AC units may communicate, by using a communication signal on a connected alternating current cable, with another device coupled to the alternating current cable. The another device described above may be an alternating current device that uses an alternating current. Similarly, a communication situation of the output terminal of the second-stage DC-to-AC unit is similar to that of the first-stage DC-to-AC unit, and details are not described herein again. The communication signal is preferably a PLC signal, which is similar to the description of the communication signal in the foregoing embodiment, and details are not described herein again.

Figure 11:
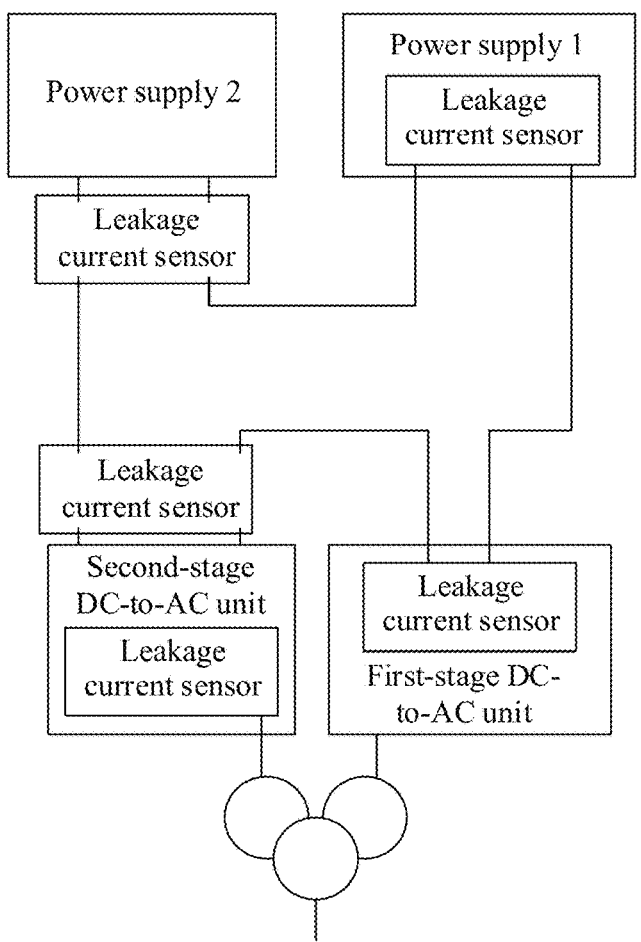
FIG. 11 is a schematic diagram of a power system with a leakage current sensor according to an embodiment of this application.

FIG. 11 is a schematic diagram of the power system with a leakage current sensor according to an embodiment of this application. As shown in FIG. 11, in some embodiments, the positive output terminal and the negative output terminal of the power supply 1 may be coupled to a leakage current sensor to detect a leakage current value of the output terminal of the power supply 1. The leakage current sensor may be embedded inside the power supply 1, or may be exposed outside the power supply 1. This is not limited in this embodiment of this application. The positive output terminal and the negative output terminal of the power supply 2 may be coupled to a leakage current sensor to detect a leakage current value of the output terminal of the power supply 2. The leakage current sensor may be embedded inside the power supply 2, or may be exposed outside the power supply 2. This is not limited in this embodiment of this application. The positive input terminal and the negative input terminal of the first-stage DC-to-AC unit may be coupled to a leakage current sensor to detect a leakage current at the input terminal of the first-stage DC-to-AC unit. The leakage current sensor may be embedded inside the first-stage DC-to-AC unit, or may be exposed outside the first-stage DC-to-AC unit. This is not limited in this embodiment of this application. An internal output phase wire of the first-stage DC-to-AC unit may be coupled to a leakage current sensor to detect a leakage current of the output terminal of the first-stage DC-to-AC unit. The leakage current sensor is usually arranged inside the first-stage DC-to-AC unit. Similarly, the input terminal and the output terminal of the second-stage DC-to-AC unit may also be provided with a leakage current sensor like the first-stage DC-to-AC unit. Details are not described herein again. When any leakage current sensor detects that a corresponding leakage current value is greater than a preset threshold, the leakage current sensor may send a signal to any one or more or all of the power supply 1, the power supply 2, the first-stage DC-to-AC unit, and the second-stage DC-to-AC unit. Then, any one or more or all of the power supply 1, the power supply 2, the first-stage DC-to-AC unit, and the second-stage DC-to-AC unit may report an alarm to a host computer connected thereto, or may send a signal to stop the power system, or may take other measures. This is not limited in this embodiment of this application.

In some embodiments, at least one switch is connected in series to an internal output phase wire connected to the output terminal of the first-stage DC-to-AC unit, to implement fast shutdown of the output of the first-stage DC-to-AC unit. The switch may be a relay, a circuit breaker, or a contactor, or may be another type of switch. This is not limited in this embodiment of this application. Similarly, a switch may also be connected in series to an internal output phase wire connected to the output terminal of the second-stage DC-to-AC unit. This is similar to the case in which a switch is connected in series to the output phase wire of the first-stage DC-to-AC unit. Details are not described herein again.

In this embodiment of this application, when the power supply 1 and the power supply 2 are a photovoltaic array, the power system may be referred to as a photovoltaic power generation system. For another type of power system, for example, a wind power generation system, an energy storage system, or a hybrid power generation system, refer to the photovoltaic power generation system for implementation. Details are not described for another type of power system in this embodiment of this application. The following describes the photovoltaic power generation system in detail.

In the photovoltaic power generation system, only one of the first node and the second node needs to be coupled to ground, that is, the first node is coupled to ground or the second node is coupled to ground. In some embodiments, both the first node and the second node may alternatively be coupled to ground. The first node and/or the second node and/is coupled to ground, so that when the output powers or output voltages of the power supply 1 and the power supply 2 are asymmetric, or the input powers or input voltages of the first-stage DC-to-AC unit and the second DC-to-AC unit are asymmetric, a current loop can be provided to achieve voltage equalization, thereby ensuring normal operation of the system, and reducing costs of one cable and construction costs.

Figure 12A:
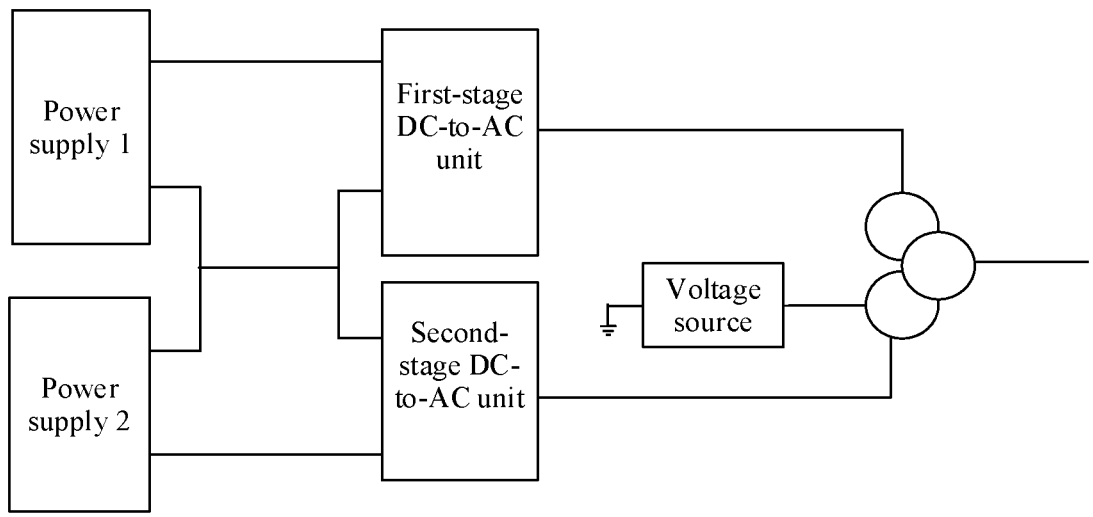
FIG. 12a is a schematic diagram 1 of a power system with a voltage source according to an embodiment of this application.

In the photovoltaic power generation system, a PID phenomenon may be eliminated by coupling a voltage source. FIG. 12a is a schematic diagram 1 of the power system with a voltage source according to an embodiment of this application. The voltage source is coupled between the ground point and a neutral point of a transformer winding corresponding to the output terminal of the second-stage DC-to-AC unit, to adjust a potential to ground of the neutral point. When the photovoltaic power generation system is normally connected to a grid for working, the voltage source is used to inject a voltage and a current between three-phase A/B/C and the ground, to ensure that voltages to ground at the negative output terminals of the power supply 1 and the power supply 2 are equal to 0, or voltages to ground at the positive output terminals of the power supply 1 and the power supply 2 are equal to 0. This prevents a cell panel in the photovoltaic array (the power supply 1 and the power supply 2) from generating a PID phenomenon. In addition, in this embodiment of this application, voltages may be adjusted so that the voltages to ground at the negative output terminals of the power supply 1 and the power supply 2 are greater than 0 (for a cell panel that generates a PID phenomenon when the voltage to ground of the negative output terminal PV− is less than 0), or the voltages to ground at the positive output terminals of the power supply 1 and the power supply 2 are less than 0 (for a cell panel that generates a PID phenomenon when the voltage to ground of the positive output terminal PV+ is greater than 0). This implements a PID repair function of the cell panel, and ensures that the voltages to ground at the positive output terminals and the negative output terminals of the power supply 1 and the power supply 2 do not exceed a maximum applied system voltage of the cell panel, to ensure system safety. The voltage may alternatively be adjusted by coupling the voltage source between the ground point and a neutral point of a transformer winding corresponding to the output terminal of the first-stage DC-to-AC unit. This is similar to the foregoing principle of coupling the voltage source between the ground point and the neutral point of the transformer winding corresponding to the output terminal of the second-stage DC-to-AC unit, and details are not described herein again.

Figure 12B:
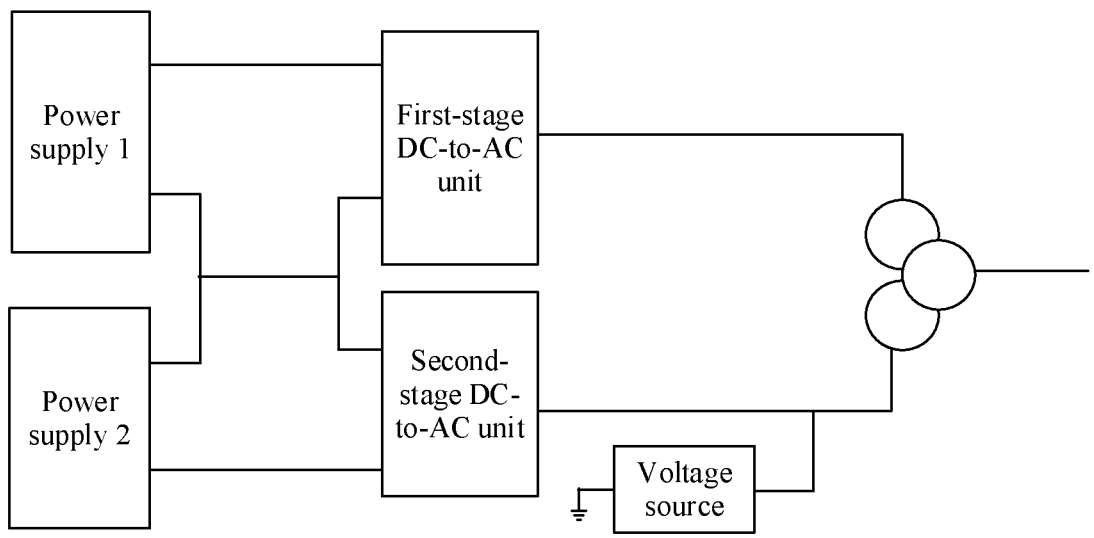
FIG. 12b is a schematic diagram 2 of a power system with a voltage source according to an embodiment of this application.

FIG. 12b is a schematic diagram 2 of the power system with a voltage source according to an embodiment of this application. In this embodiment, the voltage source is coupled between the ground point and an external phase wire at an output terminal of the second-stage DC-to-AC unit, to adjust a potential to ground of the corresponding output phase wire. For example, when the external phase wires at the output side are ABC cables, the voltage source may be separately connected to three cables, that is, ABC cables. When the photovoltaic power generation system is normally connected to a grid for working, the voltage source is used to inject a voltage and a current between three-phase A/B/C and the ground, to ensure that voltages to ground at the negative output terminals of the power supply 1 and the power supply 2 are equal to 0, or voltages to ground at the positive output terminals of the power supply 1 and the power supply 2 are equal to 0. This prevents a cell panel in the photovoltaic array (the power supply 1 and the power supply 2) from generating a PID phenomenon. This is similar to the foregoing principle of coupling the voltage source between the ground point and the neutral point of the transformer winding corresponding to the output terminal of the second-stage DC-to-AC unit, and details are not described herein again. This is also similar to the principle of coupling the voltage source between the ground point and the external phase wire at the output side of the first-stage DC-to-AC unit, and details are not described herein again.

Figure 12C:
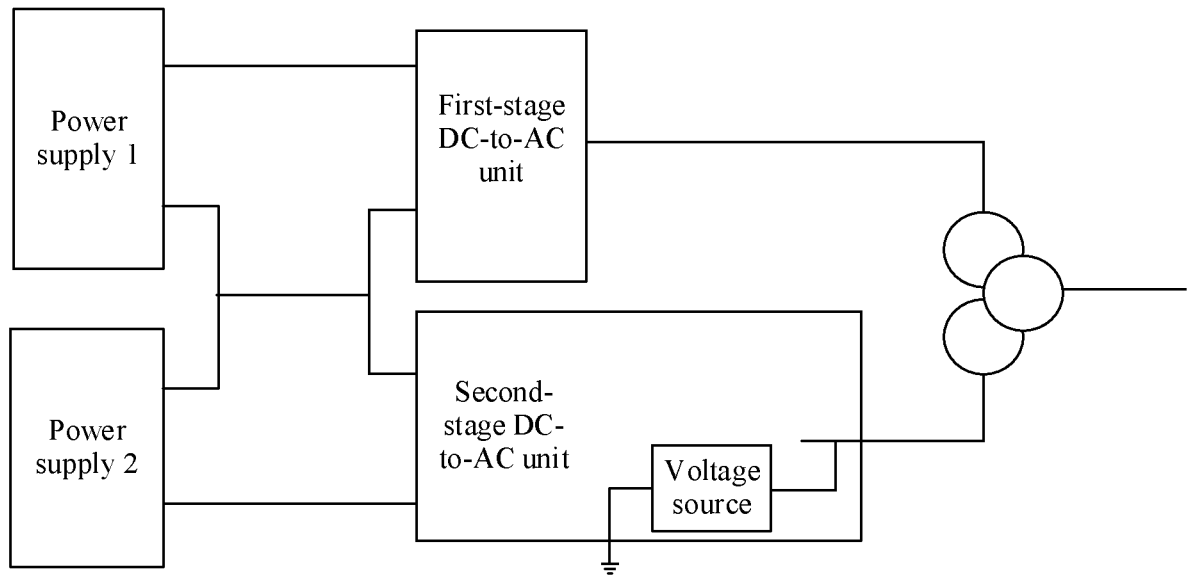
FIG. 12c is a schematic diagram 3 of a power system with a voltage source according to an embodiment of this application.

FIG. 12c is a schematic diagram 3 of the power system with a voltage source according to an embodiment of this application. In this embodiment, the voltage source is coupled between the ground point and an internal phase wire at the output terminal of the second-stage DC-to-AC unit, to adjust a potential to ground of the corresponding output phase wire. When the photovoltaic power generation system is normally connected to a grid for working, the voltage source is used to inject a voltage and a current between three-phase A/B/C and the ground, to ensure that voltages to ground at the negative output terminals of the power supply 1 and the power supply 2 are equal to 0, or voltages to ground at the positive output terminals of the power supply 1 and the power supply 2 are equal to 0. This prevents a cell panel in the photovoltaic array (the power supply 1 and the power supply 2) from generating a PID phenomenon. This is similar to the foregoing principle of coupling the voltage source between the ground point and the neutral point of the transformer winding corresponding to the output terminal of the second-stage DC-to-AC unit, and details are not described herein again. This is also similar to the principle of coupling the voltage source between the ground point and the internal phase wire at the output terminal of the first-stage DC-to-AC unit, and details are not described herein again.

In some possible embodiments, the voltage source may alternatively be replaced by a compensation power module, to implement a similar function. Details are not described herein again.

Figure 13:
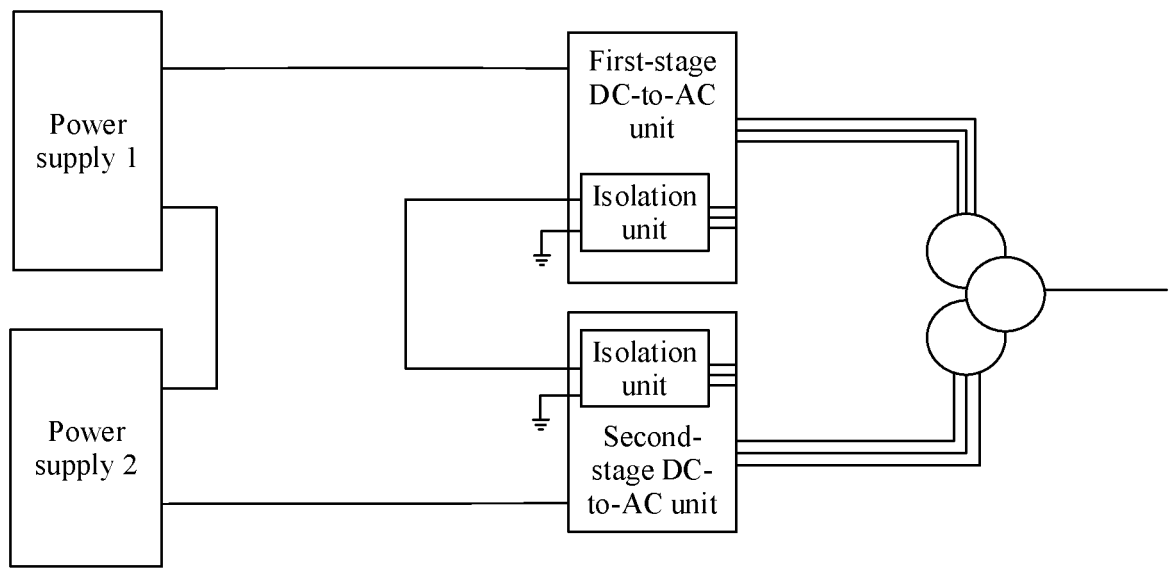
FIG. 13 is a schematic diagram of a power system with an isolation unit according to an embodiment of this application.

FIG. 13 is a schematic diagram of the power system with an isolation unit according to an embodiment of this application. In the photovoltaic power generation system, the first-stage DC-to-AC unit may further internally include an AC-to-DC isolation unit. An input terminal of the isolation unit is coupled to an internal phase wire at the output terminal of the first-stage DC-to-AC unit. A first output terminal of the isolation unit is coupled to ground, and a second output terminal of the isolation unit is coupled to the positive input terminal and/or the negative input terminal of the first-stage DC-to-AC unit. The isolation unit may be configured to adjust an output voltage to ground of the first power supply and/or the second power supply. Similarly, the second-stage DC-to-AC unit may also internally include an AC-to-DC isolation unit. An input terminal of the isolation unit may be coupled to an internal phase wire at the output terminal of the second-stage DC-to-AC unit. A first output terminal of the isolation unit is coupled to ground, and a second output terminal of the isolation unit is coupled to the positive input terminal and/or the negative input terminal of the second-stage DC-to-AC unit, to adjust an output voltage to ground of the first power supply and/or the second power supply, so as to eliminate the PID phenomenon.

In some cases, an isolation unit is arranged inside the first-stage DC-to-AC unit, and no isolation unit is arranged inside the second-stage DC-to-AC unit. In some other cases, no isolation unit is arranged inside the first-stage DC-to-AC unit, and an isolation unit is arranged inside the second-stage DC-to-AC unit. In some other cases, an isolation unit is arranged inside each of the first-stage DC-to-AC unit and the second-stage DC-to-AC unit. The isolation unit inside the first-stage DC-to-AC unit may be referred to as a first AC-to-DC isolation unit, and the isolation unit inside the second-stage DC-to-AC unit may be referred to as a second AC-to-DC isolation unit. This is not limited in this embodiment of this application.

In some embodiments, in the photovoltaic power generation system, the first power supply and the second power supply are a photovoltaic array, and may be a photovoltaic array formed by serially or parallelly connecting an output terminal of a photovoltaic cell panel to an optimizer or a shutdown device and then connecting in series or in parallel combinations, as shown in FIG. 3b. In this photovoltaic system, a communication signal may be coupled to a direct current cable connected to an output terminal of the optimizer or the shutdown device, and the first-stage DC-to-AC unit and/or the second-stage DC-to-AC unit may communicate with the optimizer or the shutdown device by using the communication signal, and control the optimizer or the shutdown device to implement fast shutdown of the optimizer or the shutdown device.

Figure 14A:
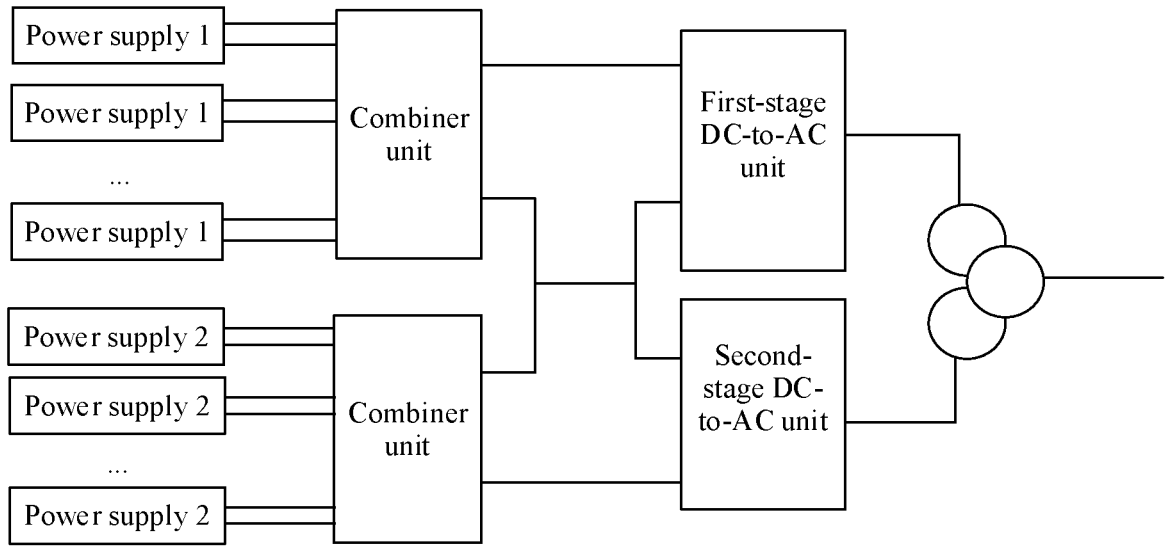
FIG. 14a is a schematic diagram 1 of a power system having a combiner unit according to an embodiment of this application.

In some embodiments, the photovoltaic power generation system may further include a combiner unit. FIG. 14a is a schematic diagram 1 of the power system having a combiner unit according to an embodiment of this application. The photovoltaic power generation system includes two combiner units, where one combiner unit is a first combiner unit, and the other combiner unit is a second combiner unit. An input terminal of the first combiner unit is coupled to an output terminal of the power supply 1. A positive output terminal of the first combiner unit is coupled to the positive input terminal of the first-stage DC-to-AC unit. A negative output terminal of the first combiner unit is coupled to a positive output terminal of the second combiner unit and then coupled to the second node. A negative output terminal of the second combiner unit is coupled to the negative input terminal of the second-stage DC-to-AC unit. In actual application, a direct current cable connected to the positive output terminal of the first combiner unit may be referred to as a positive bus, and a direct current cable connected to the negative output terminal of the first combiner unit may be referred to as a negative bus. The same rule is applied to the second combiner unit, and details are not described herein again. The photovoltaic power generation system using the combiner unit may be connected to more power supplies 1 and power supplies 2, thereby improving photovoltaic power generation efficiency.

Figure 14B:
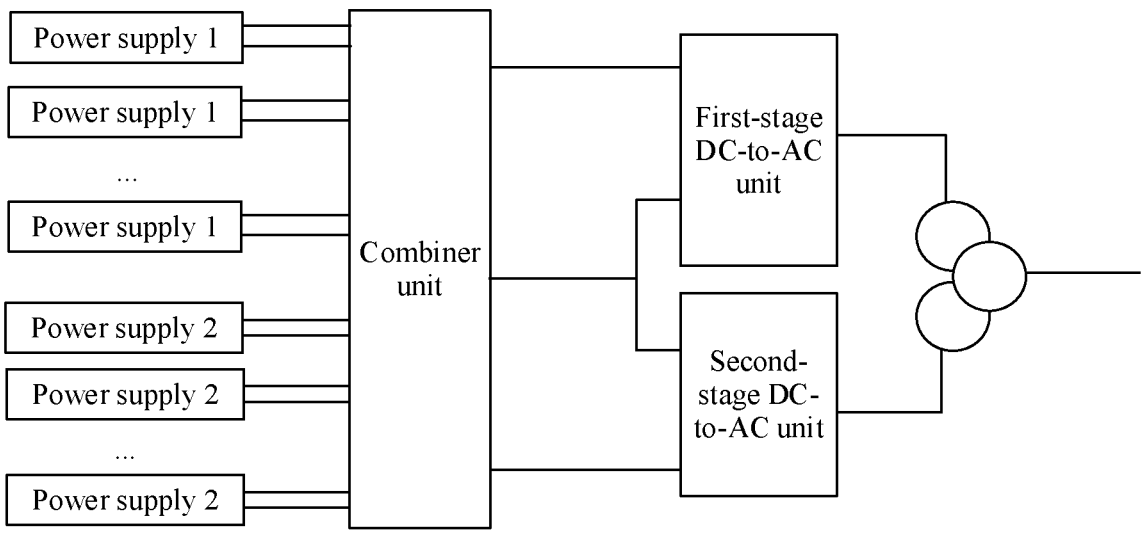
FIG. 14b is a schematic diagram 2 of a power system having a combiner unit according to an embodiment of this application.

FIG. 14b is a schematic diagram 2 of the power system having a combiner unit according to an embodiment of this application. In some embodiments, the photovoltaic power generation system may include a combiner unit. An input terminal of the combiner unit may be coupled to an output terminal of the power supply 1, or may be coupled to an output terminal of the power supply 2. The combiner unit has three output terminals. A first output terminal is coupled to the positive input terminal of the first-stage DC-to-AC unit, a second output terminal is coupled to the second node, and a third output terminal is coupled to the negative input terminal of the second-stage DC-to-AC unit. It may be understood that, the first output terminal, the second output terminal, and the third output terminal are only names in a relatively broad sense. In actual application, the output terminal may alternatively have another proper name. This is not limited in this embodiment of this application. In addition, in actual application, a direct current cable connected to the first output terminal of the combiner unit may be referred to as a positive bus, and a direct current cable connected to the third output terminal of the combiner unit may be referred to as a negative bus. The photovoltaic power generation system using the combiner unit may be connected to more power supplies 1 and power supplies 2, thereby improving photovoltaic power generation efficiency.

Figure 15A:
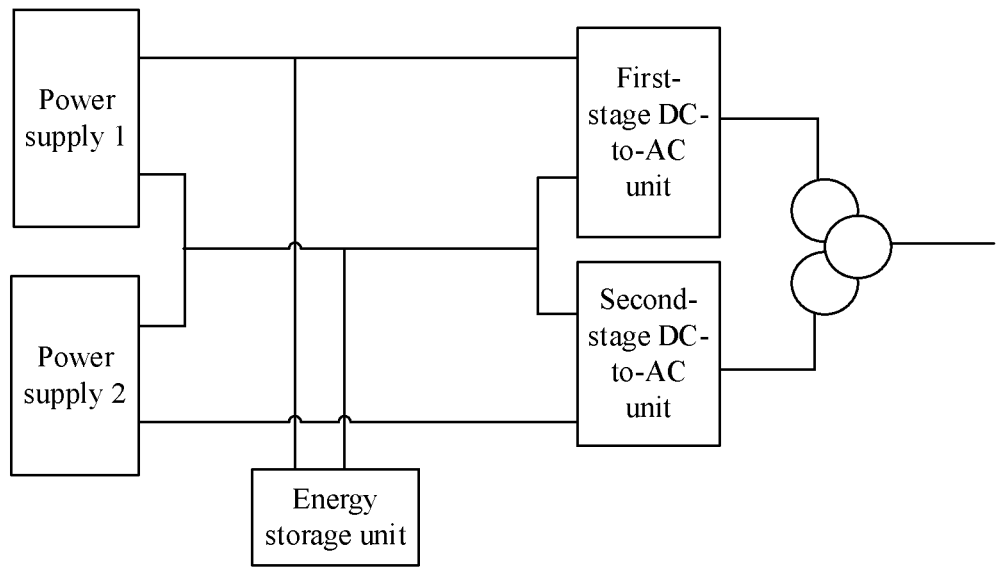
FIG. 15a is a schematic diagram 1 of a power system that includes an energy storage unit according to an embodiment of this application.
Figure 15B:
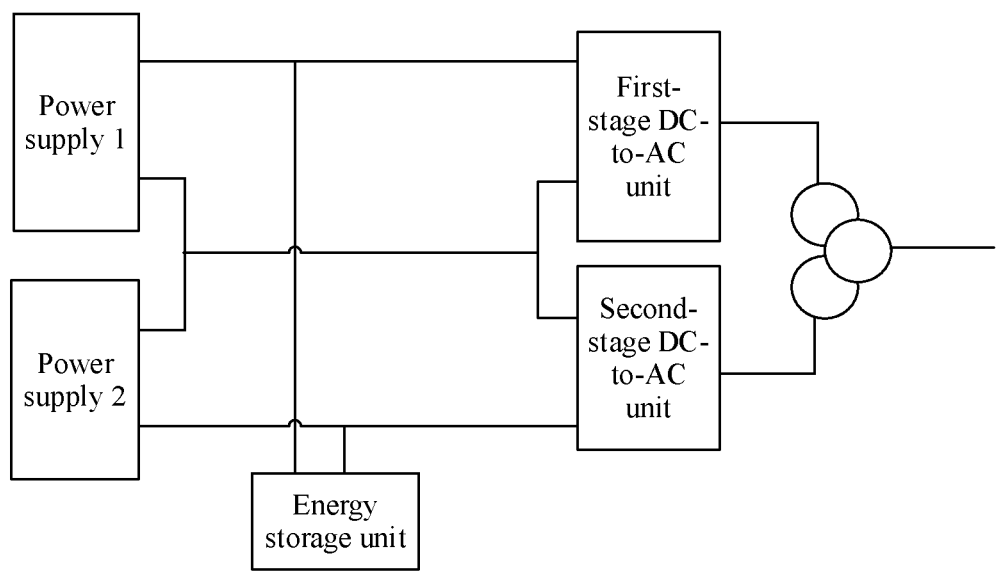
FIG. 15b is a schematic diagram 2 of a power system that includes an energy storage unit according to an embodiment of this application.
Figure 15C:
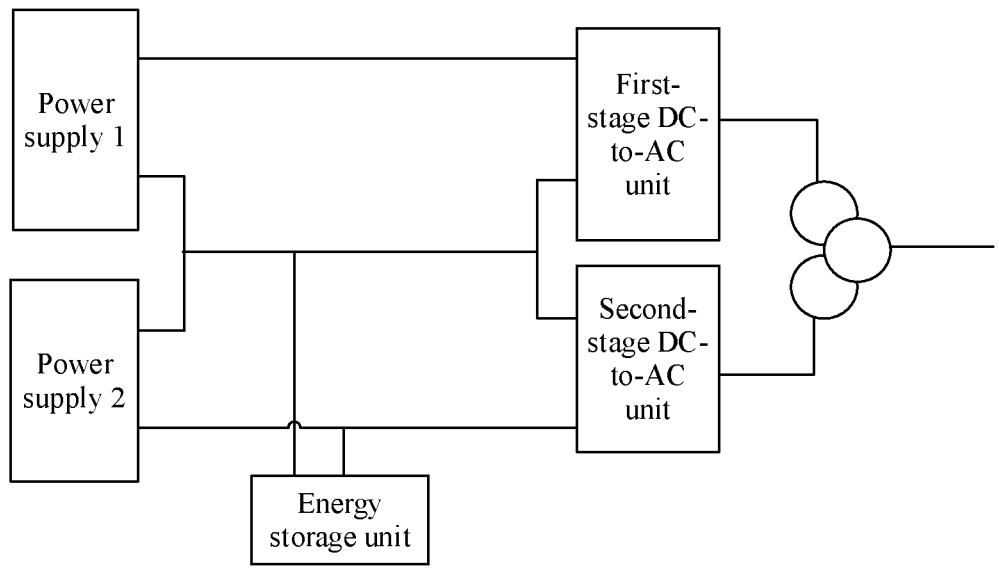
FIG. 15c is a schematic diagram 3 of a power system that includes an energy storage unit according to an embodiment of this application.
Figure 15D:
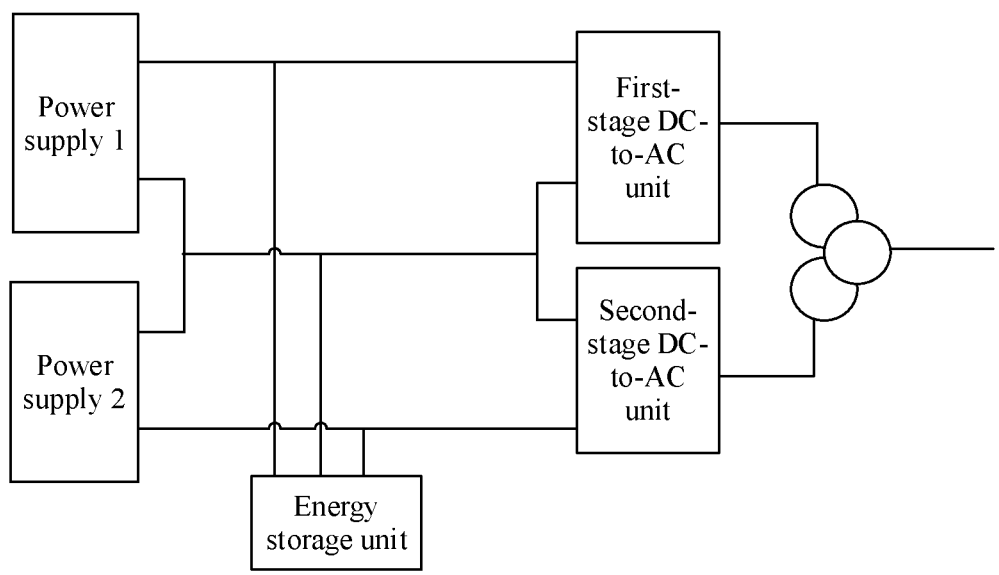
FIG. 15d is a schematic diagram 4 of a power system that includes an energy storage unit according to an embodiment of this application.

In some embodiments, the photovoltaic power generation system may further include at least one energy storage unit. At least two direct current cables connected to the power supply 1, the power supply 2, the first-stage DC-to-AC unit, and the second-stage DC-to-AC unit are coupled in parallel to the energy storage unit. FIG. 15a is a schematic diagram 1 of the power system that includes an energy storage unit according to an embodiment of this application. In this embodiment of this application, the positive output terminal of the power supply 1 is coupled to the positive input terminal of the first-stage DC-to-AC unit by using a first direct current cable. The first node is coupled to the second node by using a second direct current cable. The negative output terminal of the power supply 2 is coupled to the negative input terminal of the second-stage DC-to-AC unit by using a third direct current cable. The energy storage unit is coupled in parallel to the first direct current cable and the second direct current cable. FIG. 15b is a schematic diagram 2 of the power system that includes an energy storage unit according to an embodiment of this application. The energy storage unit is coupled in parallel to the first direct current cable and the third direct current cable. FIG. 15c is a schematic diagram 3 of the power system that includes an energy storage unit according to an embodiment of this application. The energy storage unit is coupled in parallel to the second direct current cable and the third direct current cable. FIG. 15d is a schematic diagram 4 of the power system that includes an energy storage unit according to an embodiment of this application. The energy storage unit is coupled in parallel to three direct current cables. In the photovoltaic system provided in this embodiment of this application, the energy storage unit can collect energy and provide the energy to an apparatus connected to the energy storage unit.

In this embodiment with the energy storage unit, the energy storage unit may be an energy storage device, or may include a direct current conversion unit and the energy storage device. This is similar to the description of the energy storage unit in Embodiment 1, and details are not described herein again.

In this embodiment with the energy storage unit, the energy storage unit may communicate with the power supply 1, the power supply 2, the first-stage DC-to-AC unit, and the second-stage DC-to-AC unit by using a communication signal coupled to the direct current cable. This is similar to the description of the energy storage unit in Embodiment 1, and details are not described herein again.

Embodiment 3

Figure 16:
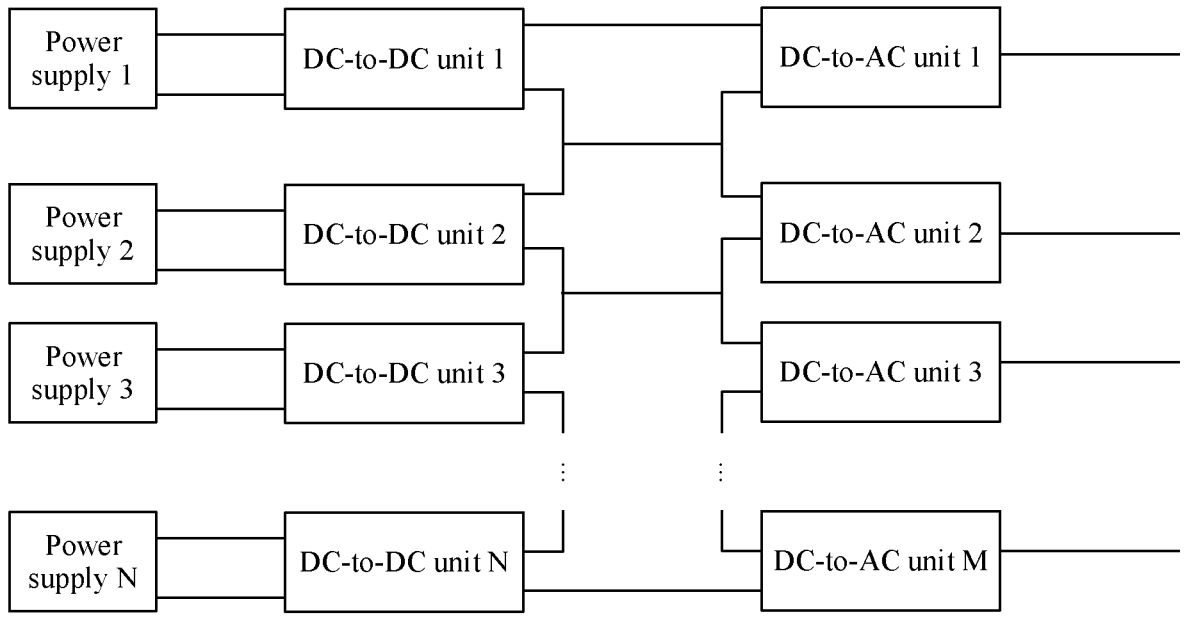
FIG. 16 is a schematic diagram of Embodiment 3 of a power system according to an embodiment of this application.

FIG. 16 is a schematic diagram of Embodiment 3 of a power system according to an embodiment of this application. The power system includes N power supplies, N DC-to-DC units, and M DC-to-AC units. The N power supplies include a power supply 1, a power supply 2, ..., and a power supply N. These power supplies may be a photovoltaic array, energy storage power supplies, wind power generation direct current sources, or the like, and are similar to those in Embodiment 1, and details are not described herein again. The M DC-to-AC units include a DC-to-AC unit 1, a DC-to-AC unit 2, ..., and a DC-to-AC unit M. These DC-to-AC units may be apparatuses that can convert a direct current into an alternating current, for example, an inverter, and are similar to those in Embodiment 1, and details are not described herein again.

Figure 17:
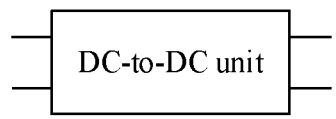
FIG. 17 is a schematic diagram of a DC-to-DC unit according to an embodiment of this application.

FIG. 17 is a schematic diagram of a DC-to-DC unit according to an embodiment of this application. In this embodiment of this application, the N DC-to-DC units include a DC-to-DC unit 1, a DC-to-DC unit 2, . . . , and a DC-to-DC unit N. As shown in FIG. 17, each DC-to-DC unit may be configured with a positive input terminal, a negative input terminal, a positive output terminal, and a negative output terminal. For ease of description, in this embodiment of this application, unless otherwise specified or marked, an input terminal in the upper left part of the DC-to-DC unit is generally referred to as a positive input terminal, an input terminal in the lower left part is generally referred to as a negative input terminal, an output terminal in the upper right part is referred to as a positive output terminal, and an output terminal in the lower right part is referred to as a negative output terminal. It may be understood that, in this embodiment of this application, the DC-to-DC unit may be an apparatus that can convert a direct current into a direct current, for example, a DC/DC converter. This is not limited in this embodiment of this application.

As shown in FIG. 16, an output terminal of the power supply 1 is coupled to an input terminal of the DC-to-DC unit 1. Specifically, a positive output terminal of the power supply 1 is coupled to a positive output terminal of the DC-to-DC unit 1, and a negative output terminal of the power supply 1 is coupled to a negative output terminal of the DC-to-DC unit 1. Coupling between another power supply and another DC-to-DC unit is similar to the coupling described herein. For example, an output terminal of the power supply 2 is coupled to an input terminal of the DC-to-DC unit 2. Details are not described herein again.

It may be understood that, a power supply number, a DC-to-DC unit number, and a DC-to-AC unit number in this embodiment of this application are used for ease of description, so that sequence numbers from 1 to N or M are used, and do not represent an actual sequence. In actual application, each power supply, each DC-to-DC unit, and each DC-to-AC unit may be numbered based on an actual situation. This is not limited in this embodiment of this application.

As shown in FIG. 16, the positive output terminal of the DC-to-DC unit 1 is coupled to a positive input terminal of the DC-to-AC unit 1, and a negative output terminal of the DC-to-DC unit N is coupled to a negative input terminal of the DC-to-AC unit M. The negative output terminal of the DC-to-DC unit 1 is coupled to a positive output terminal of the DC-to-DC unit 2, and a coupling node is referred to as a first node; a negative output terminal of the DC-to-DC unit 2 is coupled to a positive output terminal of the DC-to-DC unit 3, and a coupling node is referred to as a first node, . . . , and so on, so as to form a plurality of first nodes. A negative input terminal of the DC-to-AC unit 1 is coupled to a positive input terminal of the DC-to-AC unit 2, and a coupling node is referred to as a second node; a negative input terminal of the DC-to-AC unit 2 is coupled to a positive input terminal of the DC-to-AC unit 3, and a coupling node is referred to as a second node, . . . , and so on, so as to form a plurality of second nodes. In this embodiment of this application, output terminals of the DC-to-DC units are cascaded, and input terminals of the DC-to-AC units are cascaded. The output terminals of the DC-to-DC units are cascaded to increase an output voltage, to reduce a current between the DC-to-DC unit and the DC-to-AC unit, and resolve cost and loss problems of a cable from the DC-to-DC unit to the DC-to-AC unit. For example, a maximum output voltage of each DC-to-DC unit is X volts, and after the N DC-to-DC units are cascaded, a maximum output voltage is NX volts. In a case of a same power, when a voltage increases, an output current decreases, a wire diameter specification of a used cable decreases, and costs decrease.

In this embodiment of this application, at least one first node and at least one second node are coupled. For example, in some embodiments, one first node is coupled to one second node, and another first node is not coupled to another second node. In some other embodiments, two first nodes are respectively coupled to two second nodes, and another first node is not coupled to another second node. In some other embodiments, a quantity of first nodes is equal to a quantity of second nodes, and each first node is coupled to a corresponding second node. In some other embodiments, a quantity of first nodes is different from a quantity of second nodes, each first node is coupled to a corresponding second node, and a remaining first node or a remaining second node is not coupled. In actual application, another coupling manner may alternatively be used. This is not limited in this embodiment of this application. In this embodiment of this application, a quantity of cables connected between the DC-to-DC unit and the DC-to-AC unit is reduced in a manner of the first node and the second node, to reduce costs of the power system.

In this embodiment of this application, outputs of output terminals of DC-to-AC units are isolated. For example, an output terminal of the DC-to-AC unit 1 is isolated from an output terminal of the DC-to-AC unit 2, and an output terminal of the DC-to-AC unit 2 is isolated from an output terminal of the DC-to-AC unit 3. In actual application, an output terminal of each DC-to-AC unit is coupled to different windings, and each winding may output a three-phase voltage or a single-phase voltage. This is not limited in this embodiment of this application. In this embodiment of this application, the cascaded input and isolated output of the DC-to-AC unit reduce a specification of a power conversion device. Therefore, problems of insufficient specifications (generally up to 1700 V for an insulated gate bipolar transistor (IGBT)) and high costs of power conversion devices in the current industry are resolved. In addition, a circuit breaker with a low specification may be used to reduce costs.

In some embodiments, the power supply 1, the power supply 2, . . . , and the power supply N in FIG. 16 may be considered as one combination of power supplies. The DC-to-DC unit 1, the DC-to-DC unit 2, . . . , and the DC-to-DC unit N may be considered as one combination of DC-to-DC units. The DC-to-AC unit 1, the DC-to-AC unit 2, . . . , and the DC-to-AC unit M may be considered as one combination of DC-to-AC units. Therefore, one power system includes at least one combination of power supplies, one combination of DC-to-DC units, and one combination of DC-to-AC units. When there are a plurality of combinations of DC-to-DC units and/or a plurality of combinations of DC-to-AC units, same-type output terminals of at least two combinations of DC-to-DC units are connected in parallel, and same-type input terminals of at least two combinations of DC-to-AC units are connected in parallel. There is at least one cable coupled between the parallel-connected same-type output terminals and the parallel-connected same-type input terminals. Meanings of the same-type output terminals and same-type input terminals are similar to those described in Embodiment 1, and details are not described herein again. It may be understood that output terminals of the DC-to-DC unit 1, the DC-to-DC unit 2, . . . , and the DC-to-DC unit N may be cascaded to form at least one first node. Input terminals of the DC-to-AC unit 1, the DC-to-AC unit 2, . . . , and the DC-to-AC unit M may be cascaded to form at least one second node. The at least one first node is coupled to the at least one second node, in other words, there is at least one cable coupled between the parallel-connected same-type output terminals and the parallel-connected same-type input terminals. In this embodiment of this application, if there are a plurality of combinations of power supplies, the plurality of combinations of power supplies may be connected in series/parallel, and then be connected to a combination of DC-to-DC units. A specific coupling connection manner of these power supplies is not limited in this embodiment of this application.

In this embodiment of this application, same-type output terminals of the plurality of combinations of DC-to-AC units may be coupled in parallel, or outputs of the same-type output terminals may be isolated. This is similar to the description corresponding to FIG. 5c in the foregoing embodiment, and details are not described herein again.

In some embodiments, a communication signal is coupled to a direct current cable connected between the power supply and the DC-to-DC unit. A communication signal is also coupled to a direct current cable connected between the DC-to-DC unit and the DC-to-AC unit. Preferably, the communication signal may be a PLC signal. This is similar to the description of the communication signal in Embodiment 1, and details are not described herein again. In actual application, the power system may use a power supply, a DC-to-DC unit, and a DC-to-AC unit that can recognize a communication signal, or may modify a power supply, a DC-to-DC unit, and a DC-to-AC unit so that the power supply, the DC-to-DC unit, and the DC-to-AC unit can recognize a communication signal. This is not limited in this embodiment of this application.

In some embodiments, the power supply is a photovoltaic array formed by connecting an output of a photovoltaic cell panel to an optimizer or a shutdown device, and then connecting in series or in parallel combinations. When a communication signal is coupled to a direct current cable connected between the power supply, the DC-to-DC unit, and the DC-to-AC unit, the communication signal also passes through the optimizer or the shutdown device, and the power supply, the DC-to-DC unit, or the DC-to-AC unit may control, by using the communication signal, shutdown of the optimizer or the shutdown device, to implement fast shutdown. That is, the power supply, the DC-to-DC unit, or the DC-to-AC unit may send a communication signal that carries a shutdown instruction to the optimizer or the shutdown device. After receiving the communication signal that carries the shutdown instruction, the optimizer or the shutdown device executes the shutdown instruction, to implement fast shutdown. A situation of the communication signal is similar to the description of the communication signal in Embodiment 1, and details are not described herein again.

In some embodiments, the power system further includes at least one energy storage unit. The energy storage unit is coupled in parallel to at least two direct current cables connected between the DC-to-DC unit and the DC-to-AC unit. In this embodiment of this application, the direct current cable connected between the DC-to-DC unit and the DC-to-AC unit may be a direct current cable for coupling the positive output terminal of the DC-to-DC unit 1 and the positive input terminal of the DC-to-AC unit 1, may be a direct current cable for coupling the negative output terminal of the DC-to-DC unit N and the negative input terminal of the DC-to-AC unit M, or may be a direct current cable for coupling the first node and the second node. For example, the energy storage unit is coupled in parallel between the direct current cable for coupling the positive output terminal of the DC-to-DC unit 1 and the positive input terminal of the DC-to-AC unit 1 and the direct current cable for coupling the negative output terminal of the DC-to-DC unit N and the negative input terminal of the DC-to-AC unit N. Alternatively, the energy storage unit is coupled in parallel among three direct current cables for coupling the first node and the second node. It may be understood that a quantity of energy storage units included in one power system is not limited, that is, a plurality of energy storage units may be coupled in parallel at the same time. This is not limited in this embodiment of this application.

In the embodiment that includes the energy storage unit, the energy storage unit may be an energy storage device, or may include a direct current conversion unit and the energy storage device, or may be another apparatus capable of storing energy. This is similar to the description of the energy storage unit in Embodiment 1, and details are not described herein again. A communication signal is coupled to a direct current cable connected between the energy storage unit and the DC-to-DC unit, and the energy storage unit may communicate with the DC-to-DC unit. A communication signal is coupled to a direct current cable connected between the energy storage unit and the DC-to-AC unit, and the energy storage unit may communicate with the DC-to-AC unit. A situation of the communication signal and a principle for implementing communication are similar to the description of the communication signal in Embodiment 1, and details are not described herein again.

Embodiment 4

Figure 18:
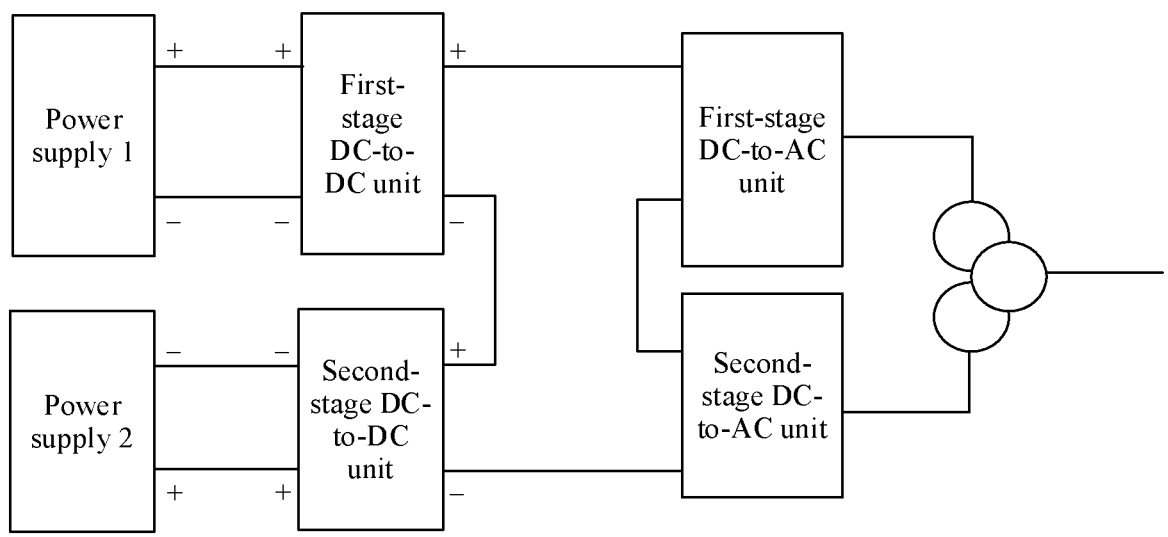
FIG. 18 is a schematic diagram of Embodiment 4 of a power system according to an embodiment of this application.

FIG. 18 is a schematic diagram of Embodiment 4 of a power system according to an embodiment of this application. The power system includes a power supply 1, a power supply 2, a first-stage DC-to-DC unit, a second-stage DC-to-DC unit, a first-stage DC-to-AC unit, and a second-stage DC-to-AC unit. The power supply 1 and the power supply 2 may be a photovoltaic array, energy storage power supplies, or wind power generation direct current sources, which are similar to the power supplies in Embodiment 1, and details are not described herein again. The first-stage DC-to-DC unit and the second-stage DC-to-DC unit are similar to the DC-to-DC units in Embodiment 3, and details are not described herein again. The first-stage DC-to-AC unit and the second-stage DC-to-AC unit may be apparatuses that can convert a direct current into an alternating current, for example, an inverter. The first-stage DC-to-AC unit and the second-stage DC-to-AC unit are similar to the DC-to-AC units in Embodiment 1, and details are not described herein again.

In this embodiment of this application, an output terminal of the power supply 1 is coupled to an input terminal of the first-stage DC-to-DC unit. For example, a positive output terminal of the power supply 1 is coupled to a positive input terminal of the first-stage DC-to-DC unit, and a negative output terminal of the power supply 1 is coupled to a negative input terminal of the first-stage DC-to-DC unit. Similarly, an output terminal of the power supply 2 is coupled to an input terminal of the second-stage DC-to-DC unit. As shown in FIG. 18, marks "+" and marks "−" are added to corresponding positions of input terminals and output terminals of the power supply 1, the power supply 2, the first-stage DC-to-DC unit, and the second-stage DC-to-DC unit. The mark "+" indicates a positive output terminal or a positive input terminal. The mark "−" indicates a negative output terminal or a negative input terminal. Meanings of the mark "+" and the mark "−" in other drawings provided in this embodiment of this application are similar. Details are not described again.

In this embodiment of this application, a positive output terminal of the first-stage DC-to-DC unit is coupled to a positive input terminal of the first-stage DC-to-AC unit. A negative output terminal of the second-stage DC-to-DC unit is coupled to a negative input terminal of the second-stage DC-to-AC unit. A negative output terminal of the first-stage DC-to-DC unit is coupled to a positive output terminal of the second-stage DC-to-DC unit. A negative input terminal of the first-stage DC-to-AC unit is coupled to a positive input terminal of the second-stage DC-to-AC unit. Therefore, outputs of the first-stage DC-to-DC unit and the second-stage DC-to-DC unit are cascaded, and inputs of the first-stage DC-to-AC unit and the second-stage DC-to-AC unit are cascaded. In this embodiment of this application, the output terminals of the DC-to-DC units are cascaded to increase an output voltage, to reduce a current between the DC-to-DC unit and the DC-to-AC unit, and resolve cost and loss problems of a cable from the DC-to-DC unit to the DC-to-AC unit. For example, a maximum output voltage of each of the first-stage DC-to-DC unit and the second-stage DC-to-DC unit is 1500 V, and after outputs of the first-stage DC-to-DC unit and the second-stage DC-to-DC unit are cascaded, the maximum output voltage is 3 kV. In a case of a same power, when a voltage increases, an output current decreases, a wire diameter specification of a used cable decreases, and costs decrease.

In this embodiment of this application, outputs of output terminals of the first-stage DC-to-AC unit and the second-stage DC-to-AC unit are isolated, and are connected to different windings. This is similar to the case in which the output of the DC-to-AC unit is isolated in Embodiment 1, and details are not described herein again. In this embodiment of this application, the cascaded input and isolated output of the DC-to-AC unit reduce a specification of a power conversion device. Specifications of power conversion devices in the current industry are insufficient (generally up to 1700 V for an IGBT). However, a 1500 V circuit breaker may be used in the power system provided in this embodiment of this application to reduce costs. The technical problem of insufficient specifications of the power conversion devices in the current industry is resolved.

A node for coupling the negative output terminal of the first-stage DC-to-DC unit and the positive output terminal of the second-stage DC-to-DC unit is referred to as a first node. A node for coupling the negative input terminal of the first-stage DC-to-AC unit and the positive input terminal of the second-stage DC-to-AC unit is referred to as a second node.

In some embodiments, the first node is coupled to the second node. When an input voltage and/or an input current and/or an input power of one of the first-stage DC-to-DC unit and the second-stage DC-to-DC unit are/is less than a preset value, the corresponding DC-to-DC unit stops working. For example, when the input voltage of the first-stage DC-to-DC unit is less than the preset value, the first-stage DC-to-DC unit stops working. In another example, when the input power of the second-stage DC-to-DC unit is less than the preset value, the second-stage DC-to-DC unit stops working. At least one of the first-stage DC-to-AC unit and the second-stage DC-to-AC unit works. In this embodiment of this application, when the input voltage and/or the input current and/or the input power of the first-stage DC-to-DC unit or the second-stage DC-to-DC unit are/is excessively low, the unit with a low voltage and/or current and/or power is stopped, and an appropriate unit is selected to work. This can avoid unnecessary waste and improve conversion efficiency and utilization of the entire system.

Figure 19:
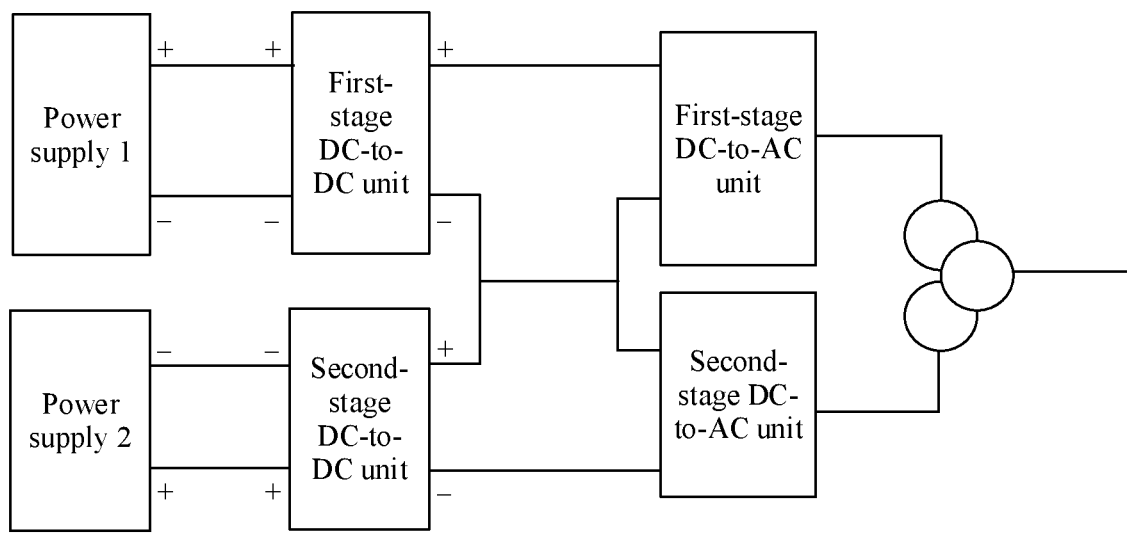
FIG. 19 is a schematic diagram of an embodiment of a power system according to an embodiment of this application.

FIG. 19 is a schematic diagram of an embodiment of the power system according to an embodiment of this application. As shown in FIG. 19, in some embodiments, the positive output terminal of the first-stage DC-to-DC unit is coupled to the positive input terminal of the first-stage DC-to-AC unit by using a first conducting wire. The negative output terminal of the second-stage DC-to-DC unit is coupled to the negative input terminal of the second-stage DC-to-AC unit by using a second conducting wire. The first node and the second node are coupled by using a third conducting wire. It may be understood that, in this embodiment of this application, the first conducting wire, the second conducting wire, and the third conducting wire are all direct current cables connected between the DC-to-DC unit (the first-stage DC-to-DC unit and the second-stage DC-to-DC unit) and the DC-to-AC unit (the first-stage DC-to-AC unit and the second-stage DC-to-AC unit). A material and a wire diameter specification of the cable may be configured based on an actual situation. This is not limited in this embodiment of this application. It may be understood that, in the conventional technology, the first-stage DC-to-DC unit and the second-stage DC-to-DC unit may have four output terminals in total, and therefore, four cables are connected. However, in this embodiment of this application, the first-stage DC-to-DC unit and the second-stage DC-to-DC unit are cascaded, and the first node and the second node are coupled by using one cable, so that the existing technical solution of four cables is modified into a solution that requires only three cables. Therefore, this can reduce costs of one cable and construction costs.

In some embodiments, the first conducting wire, the second conducting wire, and the third conducting wire form a distributed double (DC) bus. The first conducting wire and the second conducting wire form a positive bus. The second conducting wire and the third conducting wire form a negative bus. The third conducting wire is a neutral wire (Middle Cable) of the distributed double bus. The first conducting wire, the second conducting wire, and the third conducting wire are direct current conducting wires. In a 3D technology (three direct-Cable), a direct current bus is constructed by using three cables, a positive bus is constructed by using the first conducting wire and the second conducting wire, and a negative bus is constructed by using the second conducting wire and the third conducting wire.

In addition, because the first node is a middle point of cascading the first-stage DC-to-DC unit and the second-stage DC-to-DC unit, and the second node is a middle point of cascading the first-stage DC-to-AC unit and the second-stage DC-to-AC unit, a current value of the third conducting wire may be less than or equal to a current value of the first conducting wire. When the current value of the third conducting wire is less than or equal to the current value of the first conducting wire, a wire diameter specification of the third conducting wire may be reduced, to reduce costs of the third conducting wire. In another possible case, similarly, a current value of the third conducting wire is less than or equal to a current value of the second conducting wire. Therefore, when the current value of the third conducting wire is less than or equal to the current value of the second conducting wire, a wire diameter specification of the third conducting wire may be reduced, to reduce cable costs of the third conducting wire. Certainly, the current value of the third conducting wire may alternatively be less than the current value of the first conducting wire and less than the current value of the second conducting wire. This may also reduce the wire diameter specification of the third conducting wire, and reduce the cable costs of the third conducting wire.

Figure 20:
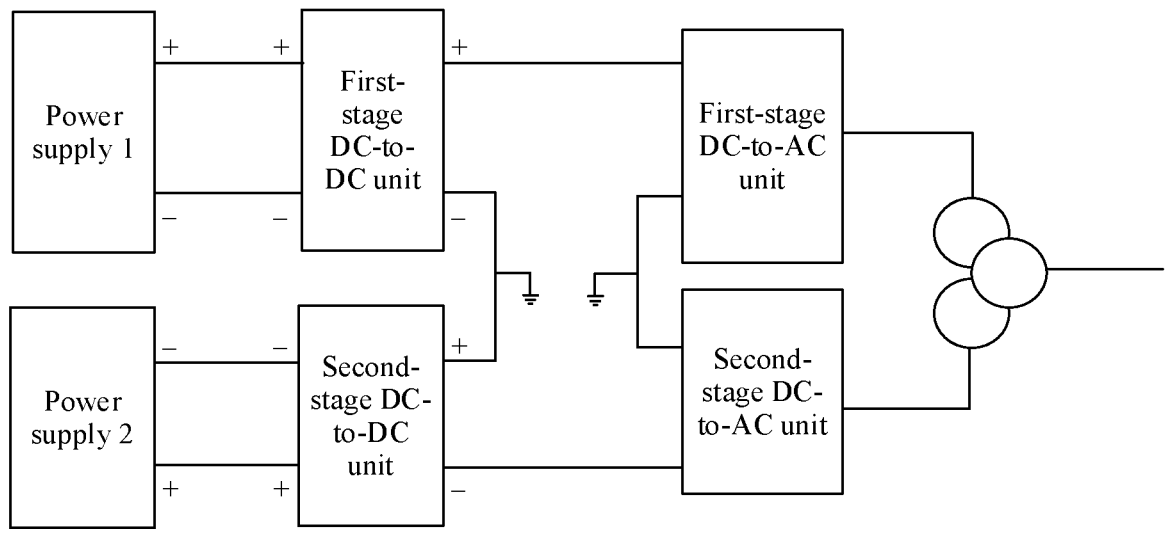
FIG. 20 is a schematic diagram of another embodiment of a power system according to an embodiment of this application.

FIG. 20 is a schematic diagram of another embodiment of the power system according to an embodiment of this application. As shown in FIG. 20, in some embodiments, both the first node and the second node are coupled to ground. In this embodiment of this application, both the first node and the second node are coupled to ground, so that when output powers or output voltages of the first-stage DC-to-DC unit and the second-stage DC-to-DC unit are asymmetric, or input powers or input voltages of the first-stage DC-to-AC unit and the second DC-to-AC unit are asymmetric, a current loop is provided to achieve voltage equalization, thereby ensuring normal operation of the system. In addition, no cable connection is required between the first node and the second node, and therefore costs of one cable and construction costs can be reduced.

Figure 21A:
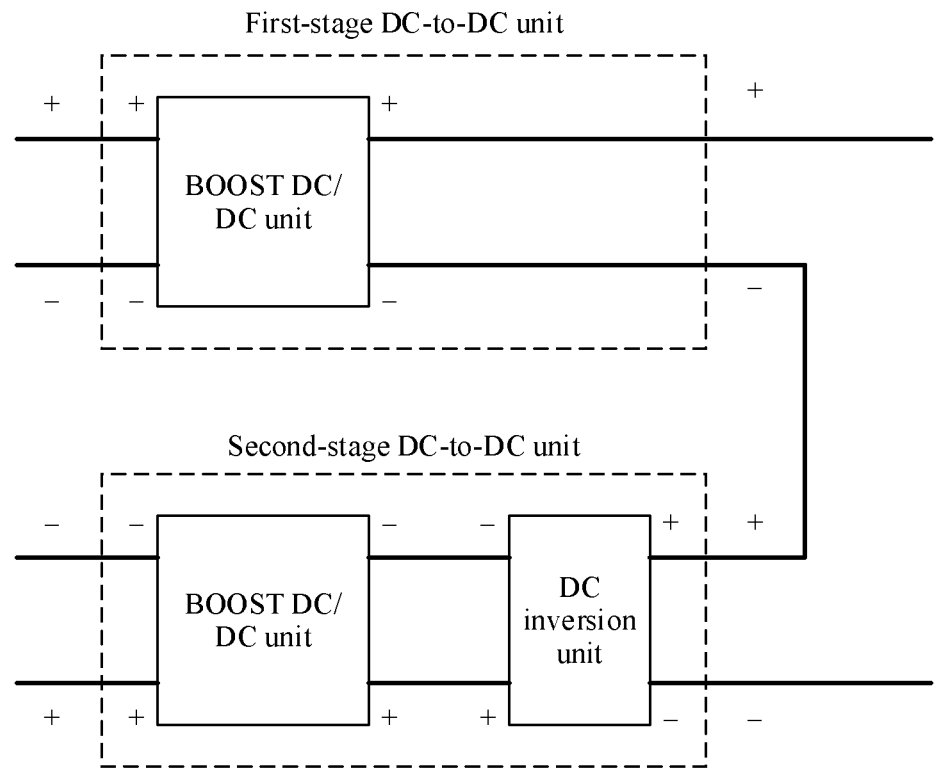
FIG. 21a is a schematic diagram of another embodiment of a power system according to an embodiment of this application.

FIG. 21a is a schematic diagram of another embodiment of the power system according to an embodiment of this application, corresponding to FIG. 18 to FIG. 20. As shown in FIG. 21a, in some embodiments, the first-stage DC-to-DC unit is specifically a BOOST DC/DC unit, the second-stage DC-to-DC unit is specifically a BOOST DC/DC unit which is cascaded to the DC flip unit. In this embodiment of this application, a negative input electrode and a negative output electrode of the BOOST DC/DC unit are directly connected. A negative input electrode and a positive output electrode of the DC flip unit are directly connected. In some embodiments, the photovoltaic power generation system includes a plurality of first-stage DC-to-DC units and a plurality of second-stage DC-to-DC units. Negative output terminals of all first-stage DC-to-DC units are connected to positive output terminals of all second-stage DC-to-DC units.

When the first node and the second node are not coupled, impact of power supply inconsistency is considered. For example, due to different illuminations, in a photovoltaic power generation system, an output voltage of the power supply 1 may be greater than an output voltage of the power supply 2, and output voltages of the first-stage DC-to-DC unit and the second-stage DC-to-DC unit are also different. That is, voltages and/or powers output by the first-stage DC-to-DC unit and the second-stage DC-to-DC unit may be asymmetric, resulting in a cask effect in the output powers. Therefore, when the first node and the second node are not coupled, the power system may be provided with an equalization circuit to prevent asymmetry of the voltages and/or powers output by the first-stage DC-to-DC unit and the second-stage DC-to-DC unit. The following provides a plurality of equalization circuits. In actual application, another equalization circuit may alternatively exist. This is not limited in this embodiment of this application.

Figure 21B:
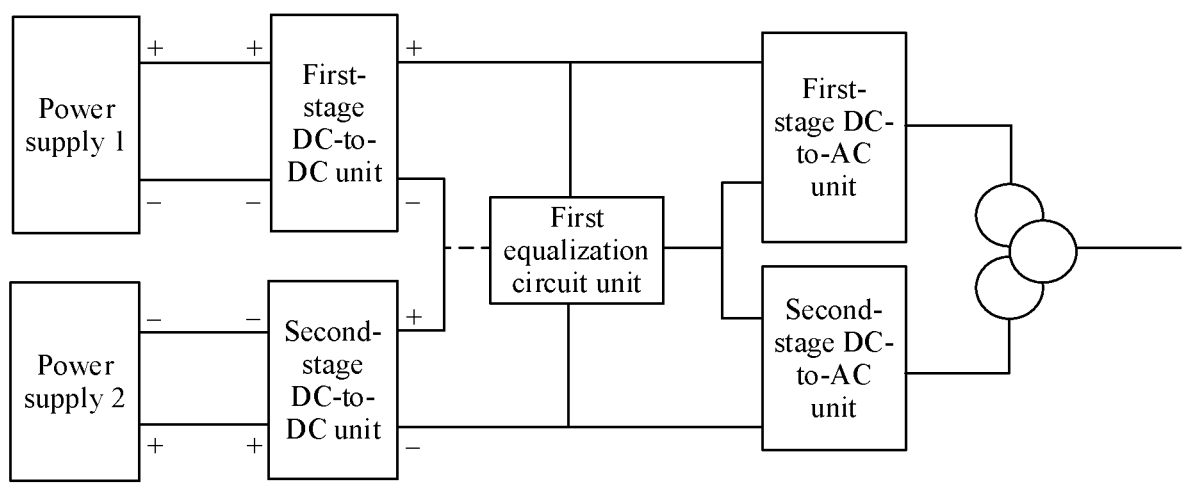
FIG. 21b is a schematic diagram of a power system that includes a first equalization circuit unit according to an embodiment of this application.

FIG. 21b is a schematic diagram of the power system that includes a first equalization circuit unit according to an embodiment of this application. In some embodiments, the power system further includes the first equalization circuit unit. The first equalization circuit unit is configured with a first interface, a second interface, and a third interface. The first interface is coupled to the second node. The second interface is coupled to the positive input terminal of the first-stage DC-to-AC unit. The third interface is coupled to the negative input terminal of the second-stage DC-to-AC unit. The first equalization circuit unit may balance the input voltages and/or powers and/or currents of the first-stage DC-to-AC unit and the second-stage DC-to-AC unit. A working principle of the first equalization circuit unit is as follows: The first equalization circuit unit obtains energy from an input terminal of the first-stage DC-to-AC unit through the first interface and the second interface, and compensates the energy to the second-stage DC-to-AC unit through the first interface and the third interface. Alternatively, the first equalization circuit unit obtains energy from an input terminal of the second-stage DC-to-AC unit through the first interface and the third interface, and compensates the energy to the first-stage DC-to-AC unit through the first interface and the second interface.

In a possible embodiment, the first equalization circuit unit may include four interfaces, that is, the first equalization circuit unit is further configured with a fourth interface. The fourth interface is coupled to the first node. As shown in FIG. 21b, a dashed line indicates that in a possible embodiment, the fourth interface is coupled to the first node. When energy compensation is performed by using the first equalization circuit that includes four interfaces, the first equalization circuit may further compensate energy of the first-stage DC-to-DC unit and the second-stage DC-to-DC unit, that is, balance and adjust corresponding voltages and/or powers and/or currents.

Figure 22A:
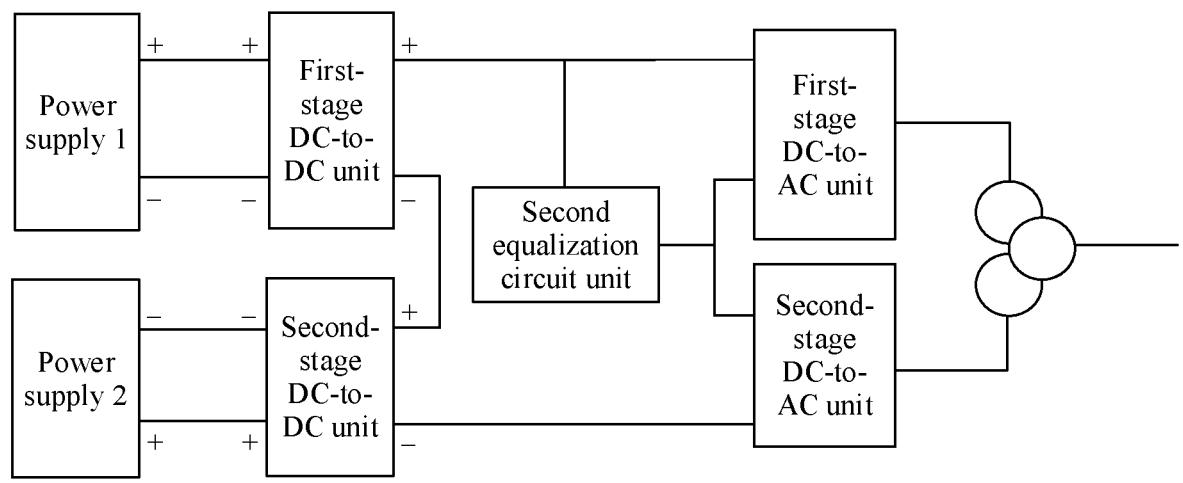
FIG. 22a is a schematic diagram 1 of a power system that includes a second equalization circuit unit according to an embodiment of this application.
Figure 22B:
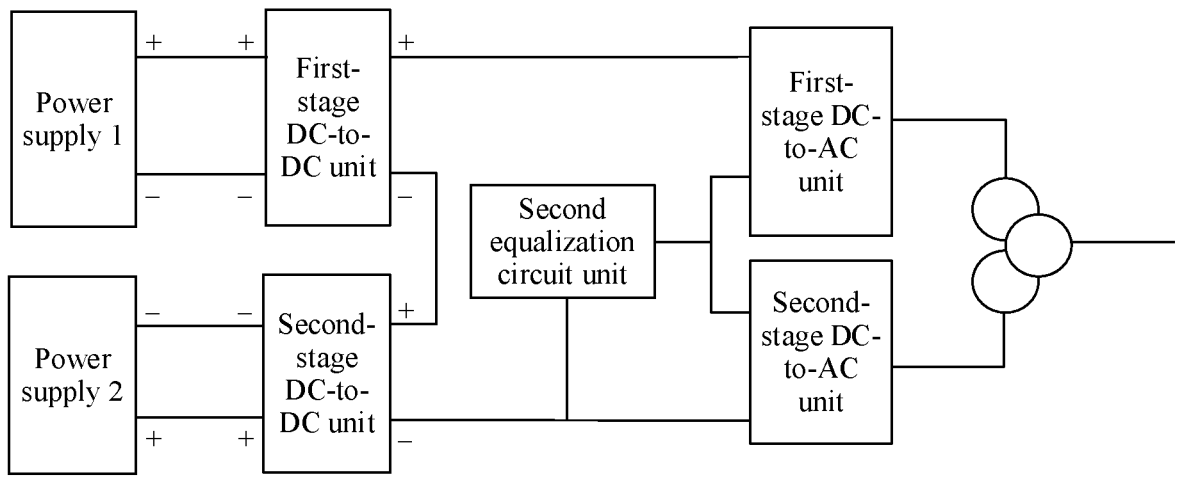
FIG. 22b is a schematic diagram 2 of a power system that includes a second equalization circuit unit according to an embodiment of this application.

FIG. 22a is a schematic diagram 1 of the power system that includes a second equalization circuit unit according to an embodiment of this application. In a case, the second equalization circuit unit is configured with a fifth interface and a sixth interface. The fifth interface is coupled to the second node. The sixth interface is coupled to the positive input terminal of the first-stage DC-to-AC unit. A working principle of the second equalization circuit unit is similar to the working principle of the first equalization circuit unit. Specifically, the second equalization circuit unit may compensate energy of the first-stage DC-to-AC unit to the second-stage DC-to-AC unit, or compensate energy of the second-stage DC-to-AC unit to the first-stage DC-to-AC unit. Therefore, the second equalization circuit unit may be configured to balance the input voltages and/or powers and/or currents of the first-stage DC-to-AC unit and the second-stage DC-to-AC unit. FIG. 22b is a schematic diagram 2 of the power system that includes a second equalization circuit unit according to an embodiment of this application. In another case, the second equalization circuit unit is configured with a fifth interface and a sixth interface. The fifth interface is coupled to the second node. The sixth interface is coupled to the negative input terminal of the second-stage DC-to-AC unit. The second equalization circuit unit may be configured to balance the input voltages and/or powers and/or currents of the first-stage DC-to-AC unit and the second-stage DC-to-AC unit. This is similar to the second equalization circuit unit corresponding to FIG. 22a, and details are not described herein again.

Figure 23:
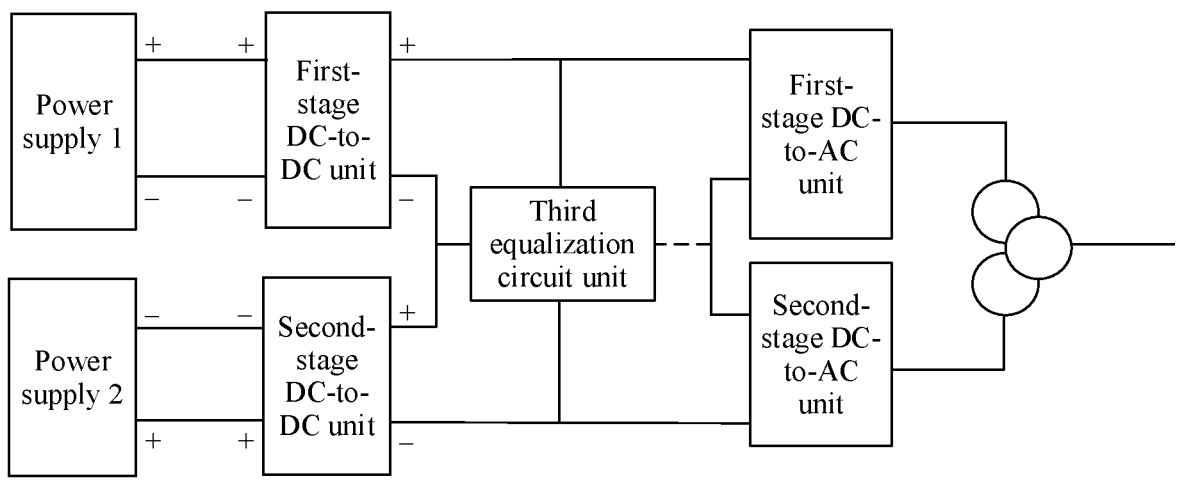
FIG. 23 is a schematic diagram of a power system that includes a third equalization circuit unit according to an embodiment of this application.

FIG. 23 is a schematic diagram of the power system that includes a third equalization circuit unit according to an embodiment of this application. The third equalization circuit unit is configured with a seventh interface, an eighth interface, and a ninth interface. The seventh interface is coupled to the first node. The eighth interface is coupled to the positive output terminal of the first-stage DC-to-DC unit. The ninth interface is coupled to the negative output terminal of the second-stage DC-to-DC unit. A working principle of the third equalization circuit unit is similar to the working principle of the first equalization circuit unit. Specifically, the third equalization circuit unit may compensate energy output by the first-stage DC-to-DC unit to the second-stage DC-to-DC unit, or compensate energy output by the second-stage DC-to-DC unit to the first-stage DC-to-DC unit. Therefore, the third equalization circuit unit may be configured to balance the output voltages and/or powers and/or currents of the first-stage DC-to-DC unit and the second-stage DC-to-DC unit.

In a possible embodiment, the third equalization circuit unit may include four interfaces, that is, the third equalization circuit unit is further configured with a tenth interface. The tenth interface is coupled to the second node. As shown in FIG. 21b, a dashed line indicates that in a possible embodiment, the tenth interface is coupled to the second node. When energy compensation is performed by using the third equalization circuit that includes four interfaces, the third equalization circuit unit may further compensate energy of the first-stage DC-to-AC unit and the second-stage DC-to-AC unit, that is, balance and adjust corresponding voltages and/or powers and/or currents.

Figure 24A:
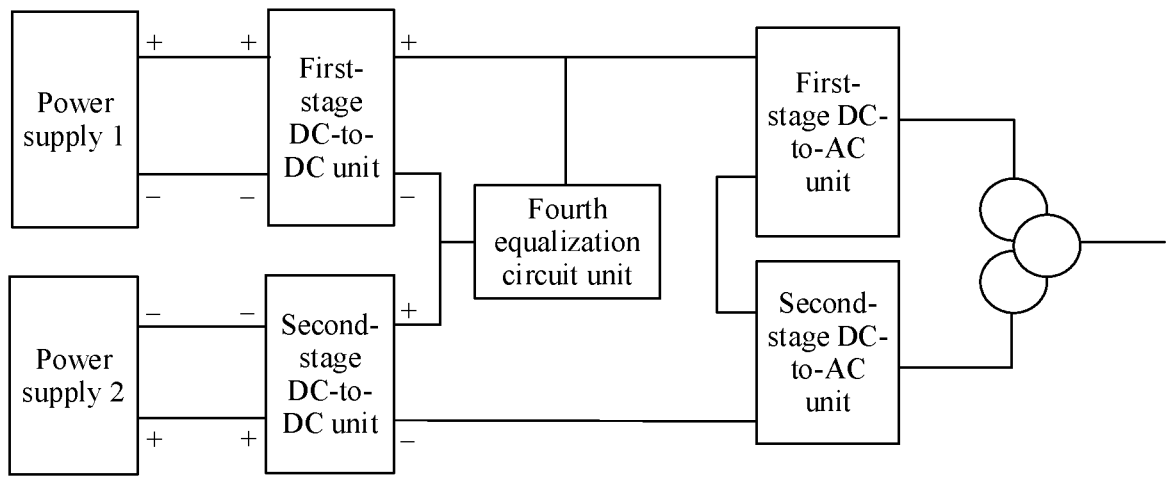
FIG. 24a is a schematic diagram 1 of a power system that includes a fourth equalization circuit unit according to an embodiment of this application.
Figure 24B:
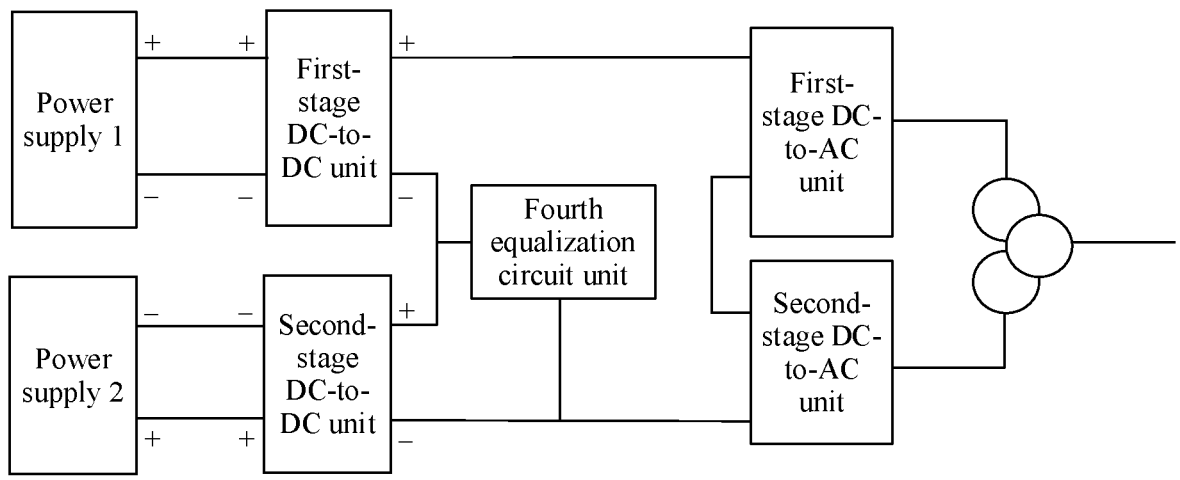
FIG. 24b is a schematic diagram 2 of a power system that includes a fourth equalization circuit unit according to an embodiment of this application.

FIG. 24a is a schematic diagram 1 of a power system that includes a fourth equalization circuit unit according to an embodiment of this application. In a case, the fourth equalization circuit unit is configured with an eleventh interface and a twelfth interface. The eleventh interface is coupled to the first node. The twelfth interface is coupled to the positive input terminal of the first-stage DC-to-DC unit. A working principle of the fourth equalization circuit unit is similar to the working principle of the second equalization circuit unit. Specifically, the fourth equalization circuit unit may compensate energy of the first-stage DC-to-DC unit to the second-stage DC-to-DC unit, or compensate energy of the second-stage DC-to-DC unit to the first-stage DC-to-DC unit. Therefore, the fourth equalization circuit unit may be configured to balance the input voltages and/or powers and/or currents of the first-stage DC-to-DC unit and the second-stage DC-to-DC unit. FIG. 24b is a schematic diagram 2 of the power system that includes a fourth equalization circuit unit according to an embodiment of this application. In another case, the fourth equalization circuit unit is configured with an eleventh interface and a twelfth interface. The eleventh interface is coupled to the first node. The twelfth interface is coupled to the negative input terminal of the second-stage DC-to-DC unit. The second equalization circuit unit may be configured to balance the input voltages and/or powers and/or currents of the first-stage DC-to-DC unit and the second-stage DC-to-DC unit. This is similar to the fourth equalization circuit unit corresponding to FIG. 24a, and details are not described herein again.

In some embodiments, the output terminals of the first-stage DC-to-AC unit and the second-stage DC-to-AC unit are respectively coupled to different transformers. Alternatively, the output terminals of the first-stage DC-to-AC unit and the second-stage DC-to-AC unit are respectively coupled to different windings of a same transformer, to implement isolated output.

Figure 25:
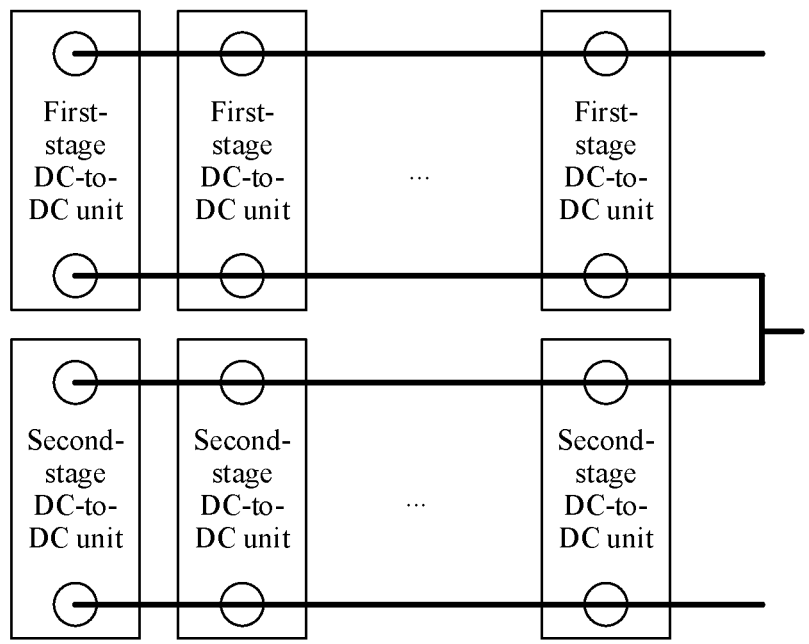
FIG. 25 is a schematic diagram of a plurality of combinations of DC-to-DC units connected in parallel according to an embodiment of this application.

In some embodiments, the first-stage DC-to-DC unit and the second-stage DC-to-DC unit are considered as one combination of DC-to-DC units. FIG. 25 is a schematic diagram of a plurality of combinations of DC-to-DC units connected in parallel according to an embodiment of this application. As shown in FIG. 25, when a plurality of combinations of DC-to-DC units are connected in parallel, same-type output terminals corresponding to different combinations of DC-to-DC units are connected in parallel. For example, a positive output terminal of a first-stage DC-to-DC unit in a first combination of DC-to-DC units is coupled to a positive output terminal of a first-stage DC-to-DC unit in a second combination of DC-to-DC units. Meanings of the same-type output terminals are similar to those described in Embodiment 2, and details are not described herein again. Parallel connection of a plurality of combinations of DC-to-AC units is similar to the description in Embodiment 2, and details are not described herein again. It may be understood that, outputs of same-type output terminals of the plurality of combinations of DC-to-AC units may be coupled in parallel, or may be isolated. This is similar to the description in Embodiment 2, and details are not described herein again.

Figure 26:
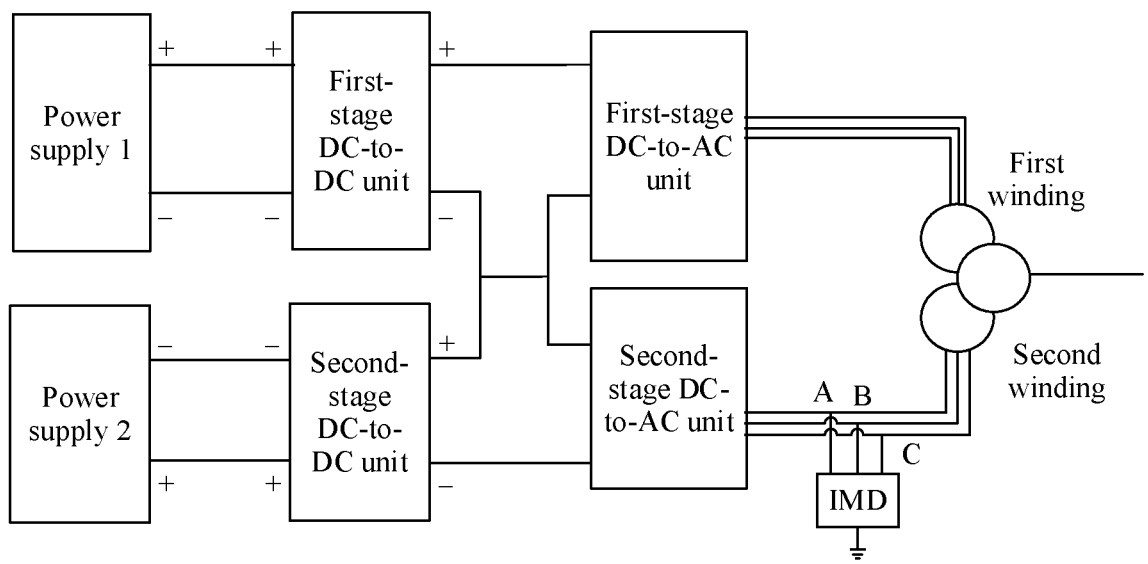
FIG. 26 is a schematic diagram of a power system that is provided with an IMD according to an embodiment of this application.

In some embodiments, an insulation monitoring device (IMD) is coupled between an output terminal of the first-stage DC-to-AC unit and a ground point. FIG. 26 is a schematic diagram of the power system that is provided with an IMD according to an embodiment of this application. In some other embodiments, an IMD is coupled between an output terminal of the second-stage DC-to-AC unit and a ground point. In some other embodiments, a first IMD is coupled between an output terminal of the first-stage DC-to-AC unit and a ground point, and a second IMD is coupled between an output terminal of the second-stage DC-to-AC unit and a ground point. The IMD can detect insulation impedance to ground of the power system. When the insulation impedance to ground is less than a preset value, preferably, in this embodiment of this application, a coupling connection between the first-stage DC-to-AC unit and/or the second-stage DC-to-AC unit and a transformer winding may be broken, so that the entire system stops working, thereby further ensuring safety of system operation.

In this embodiment of this application, a communication signal is coupled to a direct current cable connected between the power supply 1, the power supply 2, the first-stage DC-to-DC unit, the second-stage DC-to-DC unit, the first-stage DC-to-AC unit, and the second-stage DC-to-AC unit, to implement communication between the power supply 1, the power supply 2, the first-stage DC-to-DC unit, the second-stage DC-to-DC unit, the first-stage DC-to-AC unit, and the second-stage DC-to-AC unit. The communication signal is preferably a PLC signal, which is similar to the description of the communication signal in the foregoing embodiment, and details are not described herein again.

In this embodiment of this application, a communication signal is coupled to an alternating current cable connected to the output terminal of the first-stage DC-to-AC unit, and the alternating current cable may be further coupled to another device. The first-stage DC-to-AC unit may communicate with the another device on the alternating current cable by using the communication signal. When a plurality of combinations of DC-to-AC units are connected in parallel, and outputs of a plurality of first-stage DC-to-AC units are connected in parallel, the parallel-connected output terminals of the plurality of first-stage DC-to-AC units may communicate, by using a communication signal on a connected alternating current cable, with another device coupled to the alternating current cable. The another device described above may be an alternating current device that uses an alternating current. Similarly, a communication situation of the output terminal of the second-stage DC-to-AC unit is similar to that of the first-stage DC-to-AC unit, and details are not described herein again. The communication signal is preferably a PLC signal, which is similar to the description of the communication signal in the foregoing embodiment, and details are not described herein again.

Figure 27:
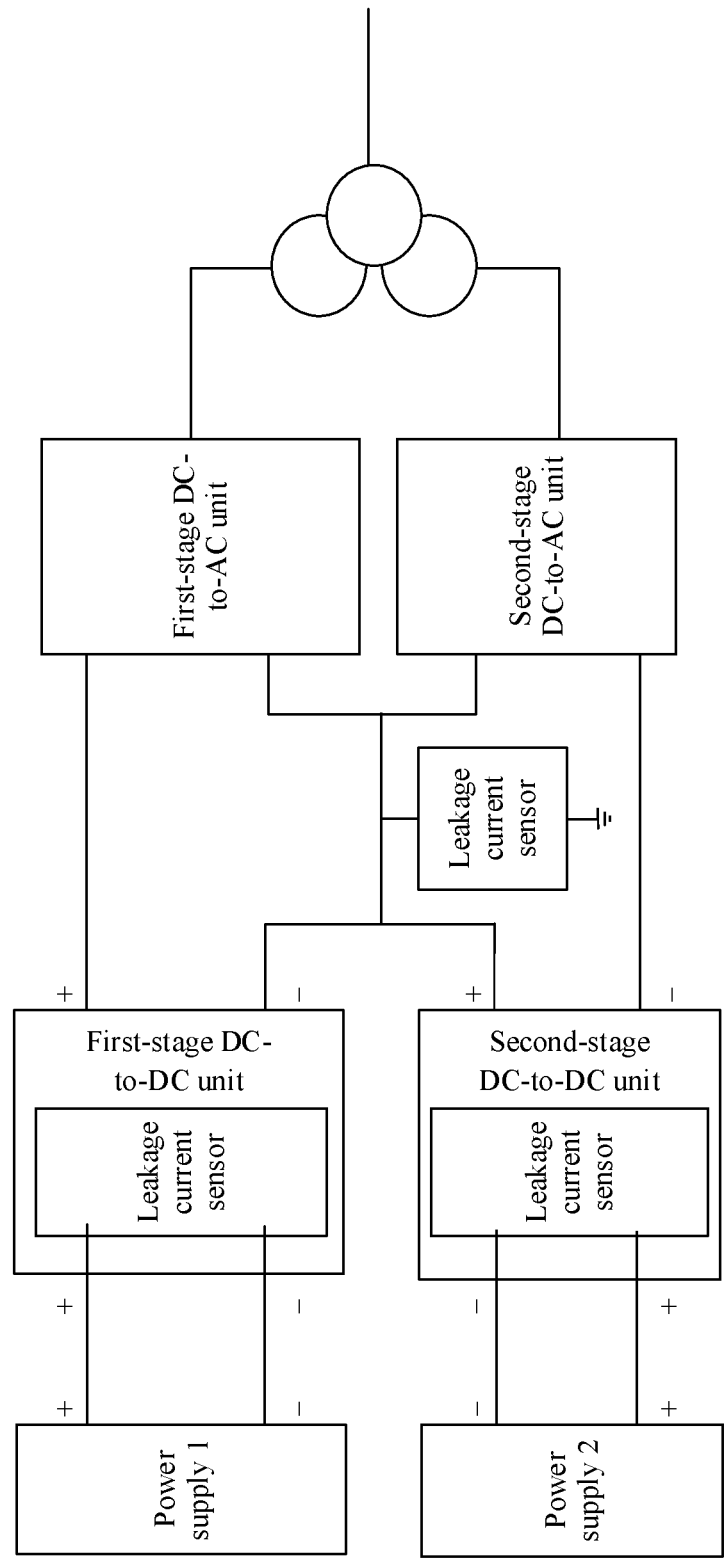
FIG. 27 is a schematic diagram of a power system that is configured with a leakage current sensor according to an embodiment of this application.

In some embodiments, the power system provided in this embodiment of this application may be further configured with a leakage current sensor. The leakage current sensor may be arranged at the output terminal of the power supply 1, the output terminal of the power supply 2, the input terminal and the output terminal of the first-stage DC-to-DC unit, the input terminal and the output terminal of the second-stage DC-to-DC unit, the input terminal and the output terminal of the first-stage DC-to-AC unit, and the input terminal and the output terminal of the second-stage DC-to-AC unit. A case in which the leakage current sensor is arranged at the output terminal of the power supply 1, the output terminal of the power supply 2, the input terminal and the output terminal of the first-stage DC-to-AC unit, and the input terminal and the output terminal of the second-stage DC-to-AC unit is similar to the embodiment corresponding to FIG. 11, and details are not described herein again. A case in which the leakage current sensor is arranged at the input terminal and the output terminal of the first-stage DC-to-DC unit and the input terminal and the output terminal of the second-stage DC-to-DC unit is shown in FIG. 27. FIG. 27 is a schematic diagram of the power system that is configured with the leakage current sensor according to an embodiment of this application. It can be learned that the leakage current sensor may be arranged at the input terminal and the output terminal of the first-stage DC-to-DC unit and the input terminal and the output terminal of the second-stage DC-to-DC unit. It should be noted that, when the leakage current sensor is configured at the output terminal of the first-stage DC-to-DC unit and the output terminal of the second-stage DC-to-DC unit, the leakage current sensor may be coupled to a direct current cable corresponding to the first node. When the first node and the second node are coupled to ground, the leakage current sensor may be connected to a ground cable, to implement a leakage current detection function. In actual application, three leakage current sensors may be configured, as shown in FIG. 27, or one or more of the leakage current sensors may be selected for configuration. This is not limited in this embodiment of this application. When any leakage current sensor detects that a corresponding leakage current value is greater than a preset threshold, the leakage current sensor may send a signal to any one or more or all of the power supply 1, the power supply 2, the first-stage DC-to-DC unit, the second-stage DC-to-DC unit, the first-stage DC-to-AC unit, and the second-stage DC-to-AC unit. Then, any one or more or all of the power supply 1, the power supply 2, the first-stage DC-to-DC unit, the second-stage DC-to-DC unit, the first-stage DC-to-AC unit, and the second-stage DC-to-AC unit may report an alarm to a host computer connected thereto, or may send a signal to stop the power system, or may take other measures. This is not limited in this embodiment of this application.

In some embodiments, at least one switch is connected in series to an internal output phase wire connected to the output terminal of the first-stage DC-to-AC unit, to implement fast shutdown of an output of the first-stage DC-to-AC unit. The switch may be a relay, a circuit breaker, or a contactor, or may be another type of switch. This is not limited in this embodiment of this application. Similarly, a switch may also be connected in series to an internal output phase wire connected to the output terminal of the second-stage DC-to-AC unit. This is similar to the case in which a switch is connected in series to the output phase wire of the first-stage DC-to-AC unit. Details are not described herein again.

In this embodiment of this application, when the power supply 1 and the power supply 2 are a photovoltaic array, the power system may be referred to as a photovoltaic power generation system. In this embodiment of this application, the power supply 1 may be referred to as a first photovoltaic array, and the power supply 2 may be referred to as a second photovoltaic array. In actual application, another name may be used. This is not limited in this embodiment of this application. For another type of power system, for example, a wind power generation system, an energy storage system, or a hybrid power generation system, refer to the photovoltaic power generation system for implementation. Details are not described for another type of power system in this embodiment of this application. The following describes the photovoltaic power generation system in detail.

In the photovoltaic power generation system, only one of the first node and the second node needs to be coupled to ground, that is, the first node is coupled to ground or the second node is coupled to ground. In some embodiments, both the first node and the second node may alternatively be coupled to ground. The first node and/or the second node and/is coupled to ground, so that when the output powers or output voltages of the first-stage DC-to-DC unit and the second DC-to-DC unit are asymmetric, or the input powers or input voltages of the first-stage DC-to-AC unit and the second DC-to-AC unit are asymmetric, a current loop can be provided to achieve voltage equalization, thereby ensuring normal operation of the system, and reducing costs of one cable and construction costs.

In the photovoltaic power generation system, as shown in FIG. 18, preferably, the negative input terminal and the negative output terminal of the first-stage DC-to-DC unit are directly coupled, or connected with only a small voltage drop. The connection with only a small voltage drop means that a voltage drop at two connected terminals is small. The voltage drop may be caused by coupling of a fuse, or may be caused by another case. This is not limited in this embodiment of this application. Similarly, the negative input terminal and the positive output terminal of the second-stage DC-to-DC unit are directly coupled, or connected with only a small voltage drop. In the embodiment corresponding to FIG. 18, negative output electrodes of the first photovoltaic array (the power supply 1) and the second photovoltaic array (the power supply 2) are equipotential. Normally, impedance to ground of the entire system is symmetrically distributed. When the system is normally connected to a grid for working, the first node, the second node, and the ground are equipotential. In this case, voltages to ground at PV− of cell panels of the first photovoltaic array and the second photovoltaic array are near 0 V. This eliminates a negative bias voltage to ground at PV− of the cell panel, and avoids a PID phenomenon of the cell panel (for a cell panel that has a negative voltage to ground at PV− and generates a PID phenomenon).

Figure 28:
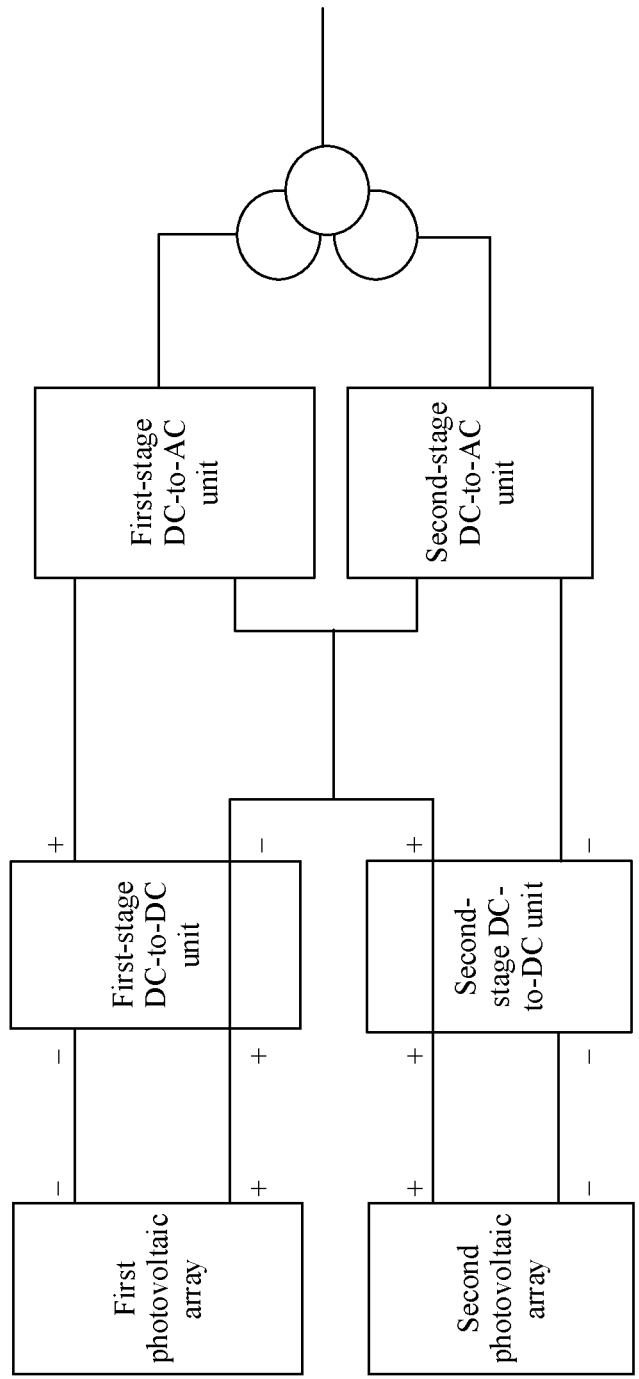
FIG. 28 is a schematic diagram of a photovoltaic power generation system according to an embodiment of this application.

FIG. 28 is a schematic diagram of the photovoltaic power generation system according to an embodiment of this application. Preferably, the positive input terminal and the negative output terminal of the first-stage DC-to-DC unit are directly coupled, or connected with only a small voltage drop. The positive input terminal and the positive output terminal of the second-stage DC-to-DC unit are directly coupled, or connected with only a small voltage drop. The connection with only a small voltage drop means that a voltage drop at two connected terminals is small. This is similar to the description of the embodiment corresponding to FIG. 18, and details are not described herein again. In this embodiment of this application, different manners of direct connection or connection with only a small voltage drop may be used to ensure that a positive output electrode of the second photovoltaic array and a positive output electrode of the first photovoltaic array are equipotential. Normally, impedance to ground of the entire system is symmetrically distributed. When the system is normally connected to a grid for working, the first node, the second node, and the ground are equipotential. In this case, output voltages to ground at PV+ of cell panels of the first photovoltaic array and the second photovoltaic array are near 0 V. This eliminates a positive bias voltage to ground at PV+ of the cell panel, and avoids a PID phenomenon of the cell panel (for a cell panel that has a positive voltage to ground at PV+ and generates a PID phenomenon). Similarly, when outputs of the first photovoltaic array and the second photovoltaic array share a negative terminal, a same effect can also be achieved.

In this embodiment of this application, in the photovoltaic power generation system, the PID phenomenon may alternatively be eliminated by coupling a voltage source. In some embodiments, a voltage source is coupled between the ground point and a neutral point of a transformer winding corresponding to the output terminal of the second-stage DC-to-AC unit, to adjust a potential to ground of the neutral point. When the photovoltaic power generation system is normally connected to the grid for working, the voltage source is used to inject a voltage and a current between three-phase A/B/C and the ground, to ensure that voltages to ground at negative output terminals of the first photovoltaic array and the second photovoltaic array are equal to 0, or voltages to ground at positive output terminals of the first photovoltaic array and the second photovoltaic array are equal to 0. This prevents the cell panel in the photovoltaic array (the first photovoltaic array and the second photovoltaic array) from generating a PID phenomenon. In addition, in this embodiment of this application, voltages may be adjusted so that voltages to ground at the negative output terminals of the first photovoltaic array and the second photovoltaic array are greater than 0 (for a cell panel that has a negative voltage to ground at the negative output terminal PV− and generates a PID phenomenon), or voltages to ground at the positive output terminals of the first photovoltaic array and the second photovoltaic array are less than 0 (for a cell panel that has a positive voltage to ground at the positive output terminal PV+ and generates a PID phenomenon). This implements a PID repair function of the cell panel, and ensures that the voltages to ground at the positive output terminals and the negative output terminals of the first photovoltaic array and the second photovoltaic array do not exceed a maximum applied system voltage of the cell panel, to ensure system safety. The voltage may alternatively be adjusted by coupling a voltage source between the ground point and a neutral point of a transformer winding corresponding to the output terminal of the first-stage DC-to-AC unit. This is similar to the foregoing principle of coupling the voltage source between the ground point and the neutral point of the transformer winding corresponding to the output terminal of the second-stage DC-to-AC unit, and details are not described herein again.

In some embodiments, in the photovoltaic power generation system, a voltage source may be coupled between the ground point and an external phase wire at an output side of the first-stage DC-to-AC unit and/or the second-stage DC-to-AC unit, to adjust a potential to ground of the corresponding output phase wire and eliminate a PID phenomenon. This is similar to the principle in the embodiment corresponding to FIG. 12b, and details are not described herein again.

In some embodiments, in the photovoltaic power generation system, a voltage source may be coupled between the ground point and an internal phase wire at the output terminal of the first-stage DC-to-AC unit and/or the second-stage DC-to-AC unit, to adjust a potential to ground of the corresponding output phase wire and eliminate a PID phenomenon. This is similar to the principle in the embodiment corresponding to FIG. 12c, and details are not described herein again.

Figure 29A:
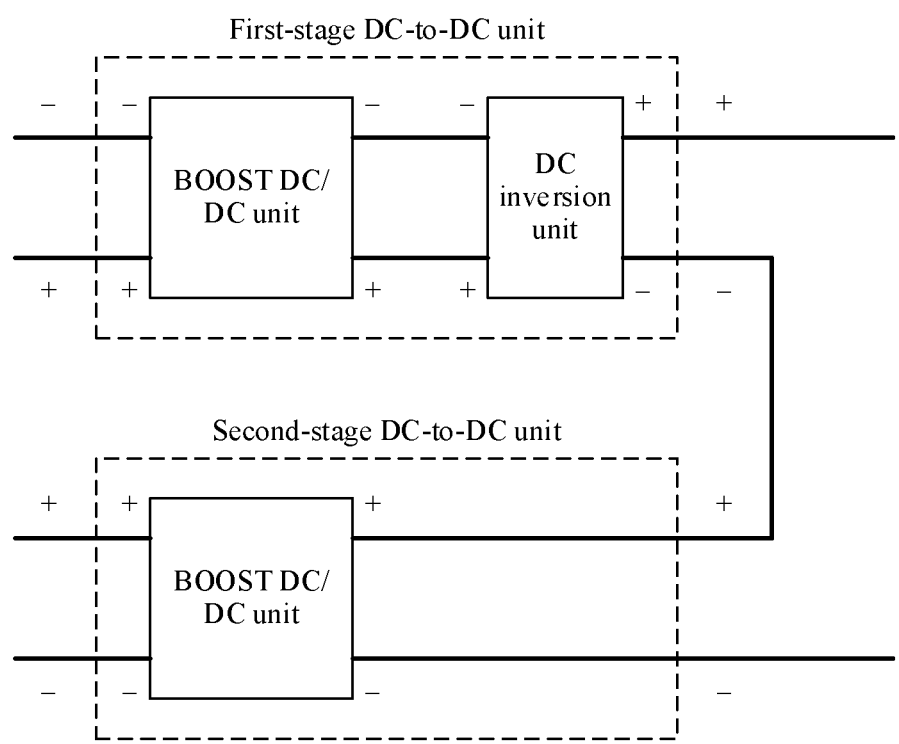
FIG. 29a is a schematic diagram of another embodiment of a power system according to an embodiment of this application.

FIG. 29a is a schematic diagram of another embodiment of the power system according to an embodiment of this application, corresponding to FIG. 27 and FIG. 28. As shown in FIG. 29a, in some embodiments, the first-stage DC-to-DC unit is specifically a BOOST DC/DC unit which is cascaded to the DC flip unit, the second-stage DC-to-DC unit is specifically a BOOST DC/DC unit. In this embodiment of this application, a negative input electrode and a negative output electrode of the BOOST DC/DC unit are directly connected. A negative input electrode and a positive output electrode of the DC flip unit are directly connected. In some embodiments, the photovoltaic power generation system includes a plurality of first-stage DC-to-DC units and a plurality of second-stage DC-to-DC units. Negative output terminals of all first-stage DC-to-DC units are connected to positive output terminals of all second-stage DC-to-DC units.

Figure 29B:
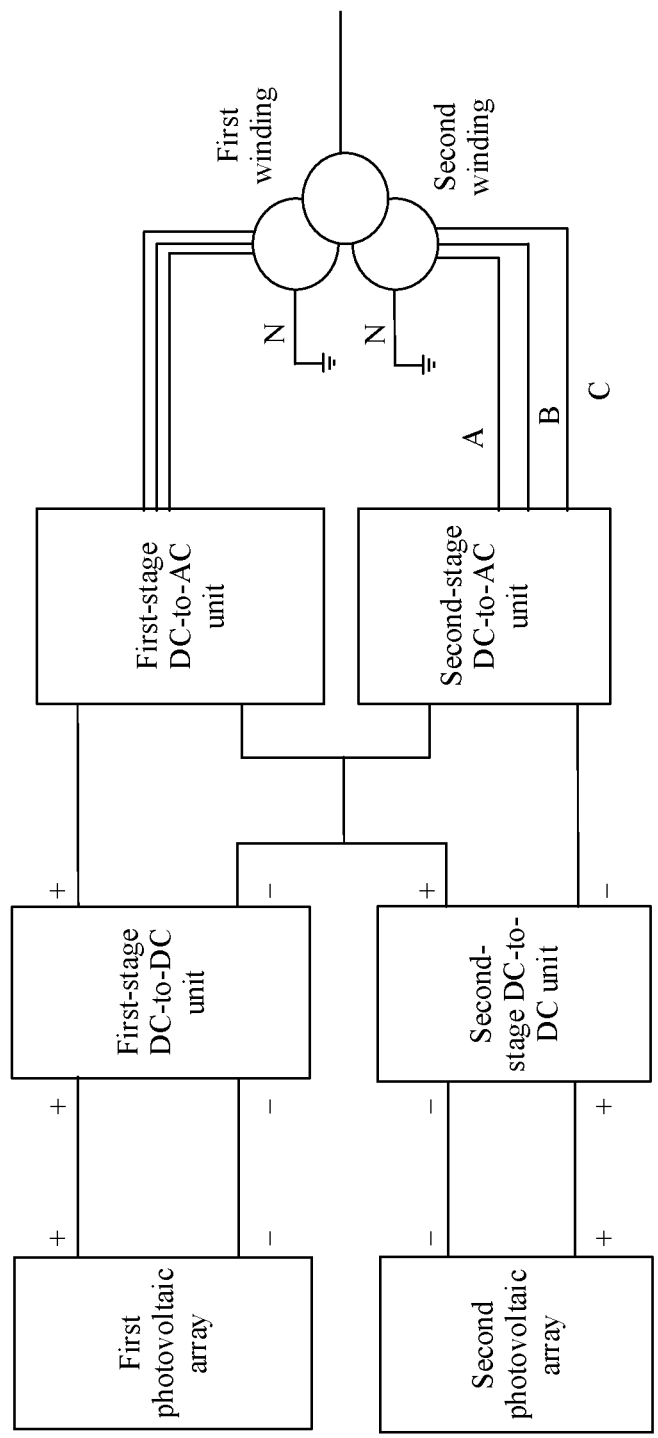
FIG. 29b is another schematic diagram of a photovoltaic power generation system according to an embodiment of this application.

FIG. 29b is another schematic diagram of the photovoltaic power generation system according to an embodiment of this application. In some embodiments, in the photovoltaic power generation system, a neutral point of a transformer winding corresponding to the output terminal of the first-stage DC-to-AC unit or the second-stage DC-to-AC unit is coupled to ground, or coupled to ground by using a current-limiting device, so that a voltage to ground of the neutral point is close to or equal to 0 V, to eliminate a PID phenomenon. As shown in FIG. 29b, the transformer winding corresponding to the output terminal of the second-stage DC-to-AC unit is a second winding, and the second winding is a three-phase four-wire (ABCN) double-split transformer. Generally, an N wire is connected to a neutral point of a transformer, and grounded. The N wire of the second winding is coupled to ground, or coupled to ground by using the current-limiting device. When the system is connected to the grid and normally works, a potential of a positive input electrode (the second node) of the second-stage DC-to-AC unit is higher than a ground potential, so that voltages to ground of the negative output electrode of the second photovoltaic array and the negative output terminal of the first photovoltaic array are greater than or equal to 0 V. A PID suppression and repair function of the cell panel is implemented. Similarly, in an application in which the positive output terminals of the first photovoltaic array and the second photovoltaic array are coupled together in FIG. 28, an N wire of the transformer winding (the first winding) corresponding to the output terminal of the first-stage DC-to-AC unit is coupled to ground, or coupled to ground by using a current-limiting device, so that a potential of the negative input terminal of the first-stage DC-to-AC unit is lower than the ground potential. In this case, potentials of the positive output terminals of the first photovoltaic array and the second photovoltaic array are equal to a potential of the second node, and less than the ground potential, that is, ≤ 0 V. This eliminates a positive bias voltage to ground at PV+ of the cell panel, and avoids the PID phenomenon of the cell panel (for a cell panel that has a positive voltage to ground at PV+ and generates a PID phenomenon). In another aspect, in this embodiment of this application, an input voltage of the photovoltaic array may be controlled by using a maximum power point tracking (MPPT) function of the DC-to-DC unit, so that a sum of the input voltage and a voltage to ground of the negative electrode of the photovoltaic array does not exceed a maximum applied system voltage of the cell panel, to ensure safety of system operation.

Figure 30:
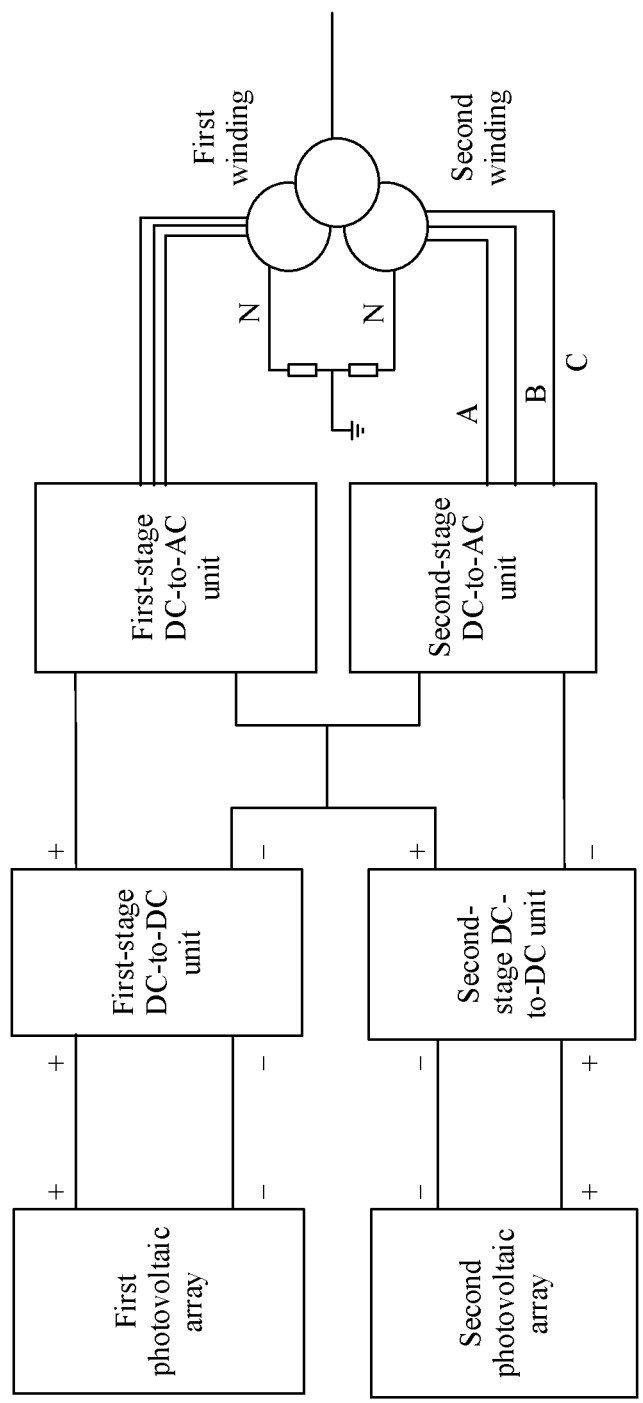
FIG. 30 is another schematic diagram of a photovoltaic power generation system according to an embodiment of this application.

FIG. 30 is another schematic diagram of the photovoltaic power generation system according to an embodiment of this application. In some embodiments, when the output terminals of the first-stage DC-to-AC unit and the second-stage DC-to-AC unit are respectively coupled to different windings of a same transformer, a neutral point of a winding corresponding to the output terminal of the first-stage DC-to-AC unit and a neutral point of a winding corresponding to the output terminal of the second-stage DC-to-AC unit are coupled by using two series resistors or current-limiting devices, and a middle point between the two series resistors or the two current-limiting devices is coupled to ground. As shown in FIG. 30, N wires of the first winding and the second winding are coupled by using the two series resistors or current-limiting devices, and the middle point between the two series resistors or the two current-limiting devices is coupled to ground. When the system is normally connected to the grid for working, the first node, the second node, and the ground are equipotential. For the embodiment corresponding to FIG. 28, the positive output electrode of the second photovoltaic array, the positive output electrode of the first photovoltaic array, and the ground may be equipotential, thereby preventing the photovoltaic array from generating a PID phenomenon. For the example in FIG. 29b, the negative output electrode of the second photovoltaic array, the negative output electrode of the first photovoltaic array, and the ground may be equipotential, thereby preventing the photovoltaic array from generating a PID phenomenon.

In some embodiments, in the photovoltaic power generation system, the photovoltaic power generation system further includes an isolation unit. The isolation unit is also referred to as an AC-to-DC isolation unit, and may be arranged inside the first-stage DC-to-AC unit. An input terminal of the isolation unit is coupled to the internal phase wire at the output terminal of the first-stage DC-to-AC unit to obtain energy. A first output terminal of the isolation unit is coupled to ground, and a second output terminal of the isolation unit is coupled to the positive input terminal and/or negative input terminal of the first-stage DC-to-AC unit. The isolation unit may be configured to adjust an output voltage to ground of the first power supply and/or the second power supply, to eliminate a PID phenomenon. The isolation unit may alternatively be arranged inside the second-stage DC-to-AC unit. An input terminal of the isolation unit may be coupled to an internal phase wire at the output terminal of the second-stage DC-to-AC unit, a first output terminal of the isolation unit is coupled to ground, and a second output terminal of the isolation unit is coupled to the positive input terminal and/or negative input terminal of the second-stage DC-to-AC unit, to adjust an output voltage to ground of the first power supply and/or the second power supply, to eliminate a PID phenomenon. This is specifically similar to the embodiment corresponding to FIG. 13, and details are not described herein again.

In some embodiments, in the photovoltaic power generation system, the first photovoltaic array and the second photovoltaic array each may be a photovoltaic array formed by serially connecting an output terminal of a photovoltaic cell panel to an optimizer or a shutdown device, and then connecting in series or in parallel combinations, and a communication signal is coupled to a direct current cable connected to an output terminal of the optimizer or the shutdown device. The first-stage DC-to-DC unit and/or the second-stage DC-to-DC unit and/or the first-stage DC-to-AC unit and/or the second-stage DC-to-AC unit may communicate with the optimizer or the shutdown device by using the communication signal, and control the optimizer or the shutdown device to implement fast shutdown of the optimizer or the shutdown device.

In some embodiments, a communication signal is coupled to a direct current cable between the first-stage DC-to-AC unit, the second-stage DC-to-AC unit, the first-stage DC-to-DC unit, and the second-stage DC-to-DC unit. The first-stage DC-to-AC unit and/or the second-stage DC-to-AC unit control/controls the first-stage DC-to-DC unit and/or the second-stage DC-to-DC unit by using the communication signal, to implement fast shutdown of the input terminal of the first-stage DC-to-DC unit and/or the input terminal of the second-stage DC-to-DC unit.

In some embodiments, the photovoltaic power generation system further includes at least one energy storage unit. At least two direct current cables connected to the first-stage DC-to-DC unit, the second-stage DC-to-DC unit, the first-stage DC-to-AC unit, and the second-stage DC-to-AC unit are coupled in parallel to the energy storage unit. This is specifically similar to the energy storage unit in Embodiment 3, and details are not described herein again.

In the embodiment that includes the energy storage unit, the energy storage unit may be an energy storage device, or may include a direct current conversion unit and the energy storage device, or may be another apparatus capable of storing energy. This is similar to the description of the energy storage unit in Embodiment 1, and details are not described herein again. A communication signal is coupled to a direct current cable connected between the energy storage unit and the DC-to-DC unit, and the energy storage unit may communicate with the DC-to-DC unit. A communication signal is coupled to a direct current cable connected between the energy storage unit and the DC-to-AC unit, and the energy storage unit may communicate with the DC-to-AC unit. A situation of the communication signal and a principle for implementing communication are similar to the description of the communication signal in Embodiment 1, and details are not described herein again.

Figure 31:
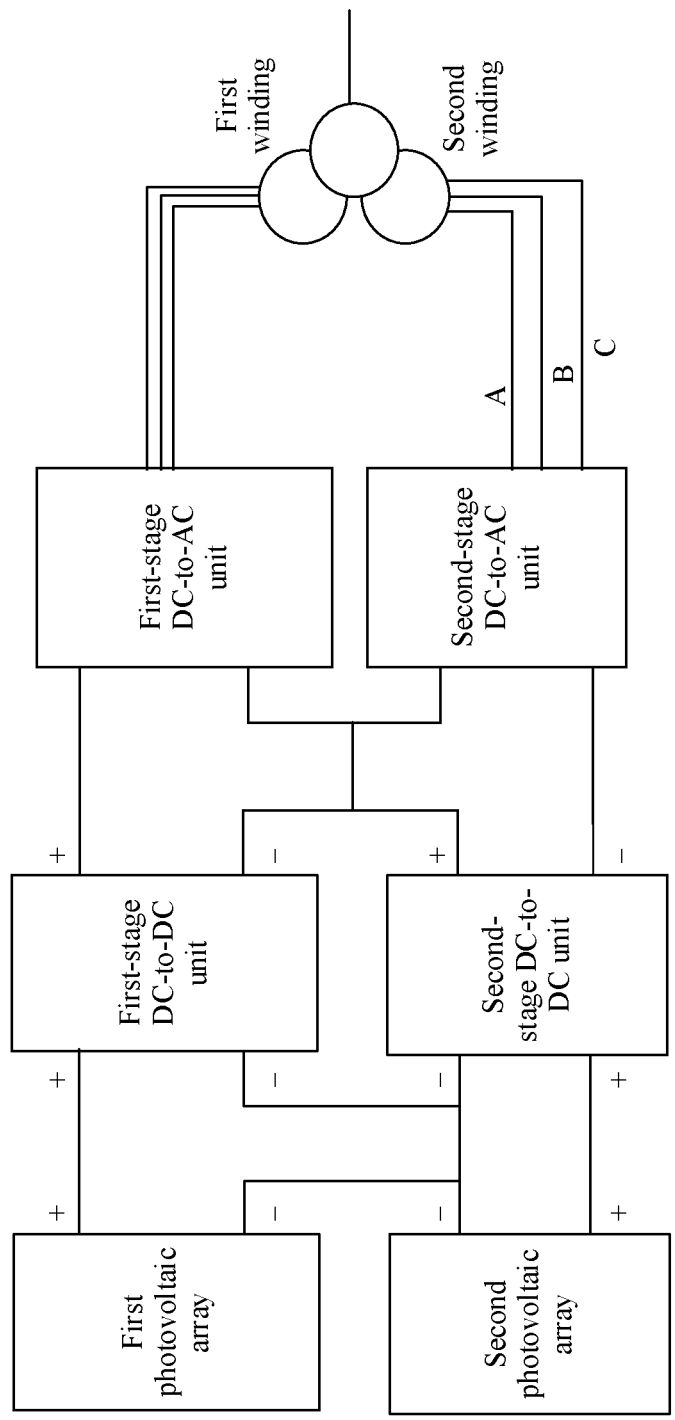
FIG. 31 is another schematic diagram of a photovoltaic power generation system according to an embodiment of this application.

FIG. 31 is another schematic diagram of the photovoltaic power generation system according to an embodiment of this application. In some embodiments, a negative output terminal of the first photovoltaic array and a negative output terminal of the second photovoltaic array are coupled as a first coupling point. The negative input terminal of the first-stage DC-to-DC unit and the negative input terminal of the second-stage DC-to-DC unit are coupled as a second coupling point. The first coupling point and the second coupling point are connected by using one cable. In this implementation, one cable may be connected to the first coupling point and the second coupling point, to reduce cables and reduce costs. In some other embodiments, the first coupling point and the second coupling point may be separately grounded, to implement power flow. This can further reduce a quantity of cables and reduce system costs. Similarly, in the photovoltaic power generation system shown in FIG. 28, the positive output terminals of the first photovoltaic array and the second photovoltaic array are coupled, the positive input terminals of the first DC-to-DC unit and the second DC-to-DC unit are coupled, and then the two coupling points are grounded by using one cable, or both terminals are grounded, to implement power flow.

Figure 32A:
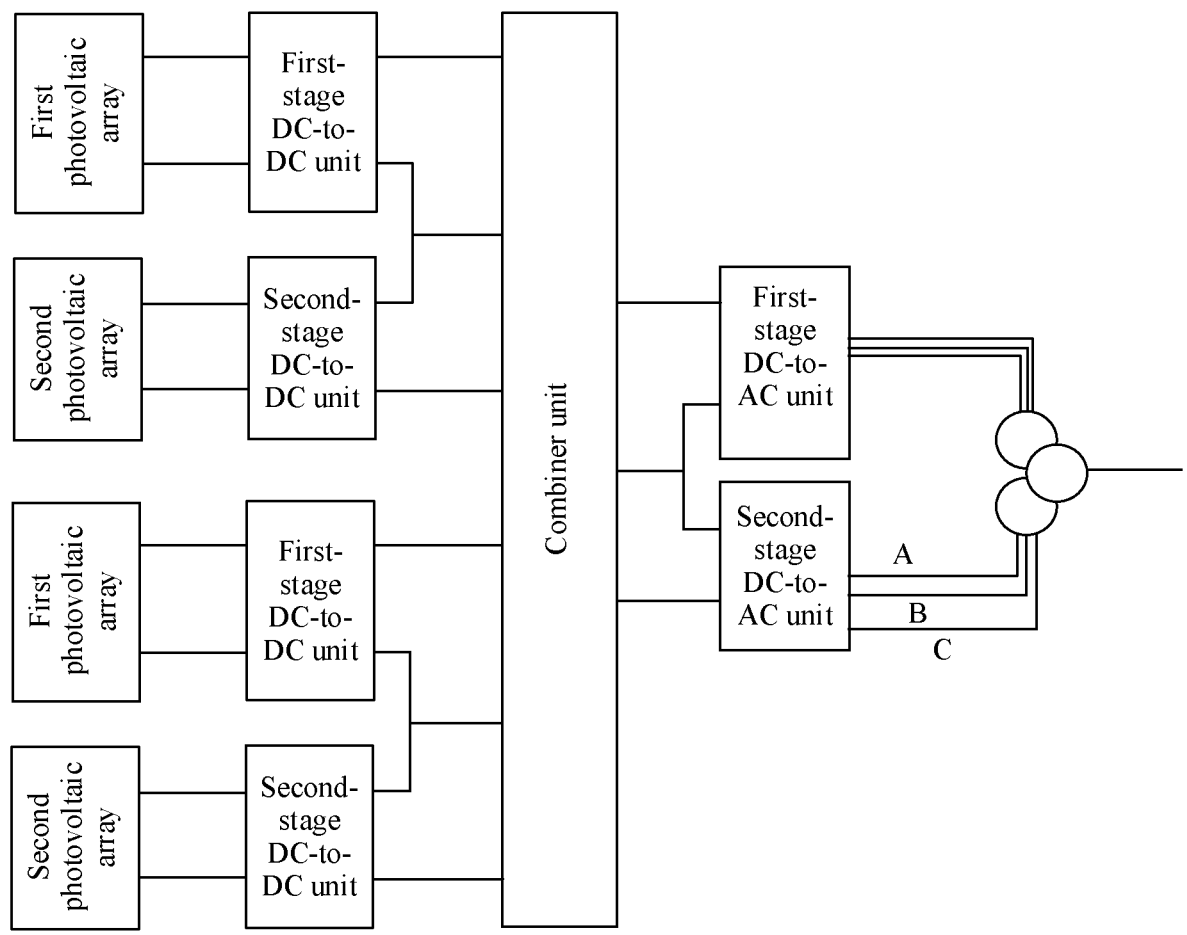
FIG. 32a is another schematic diagram of a photovoltaic power generation system according to an embodiment of this application.
Figure 32B:
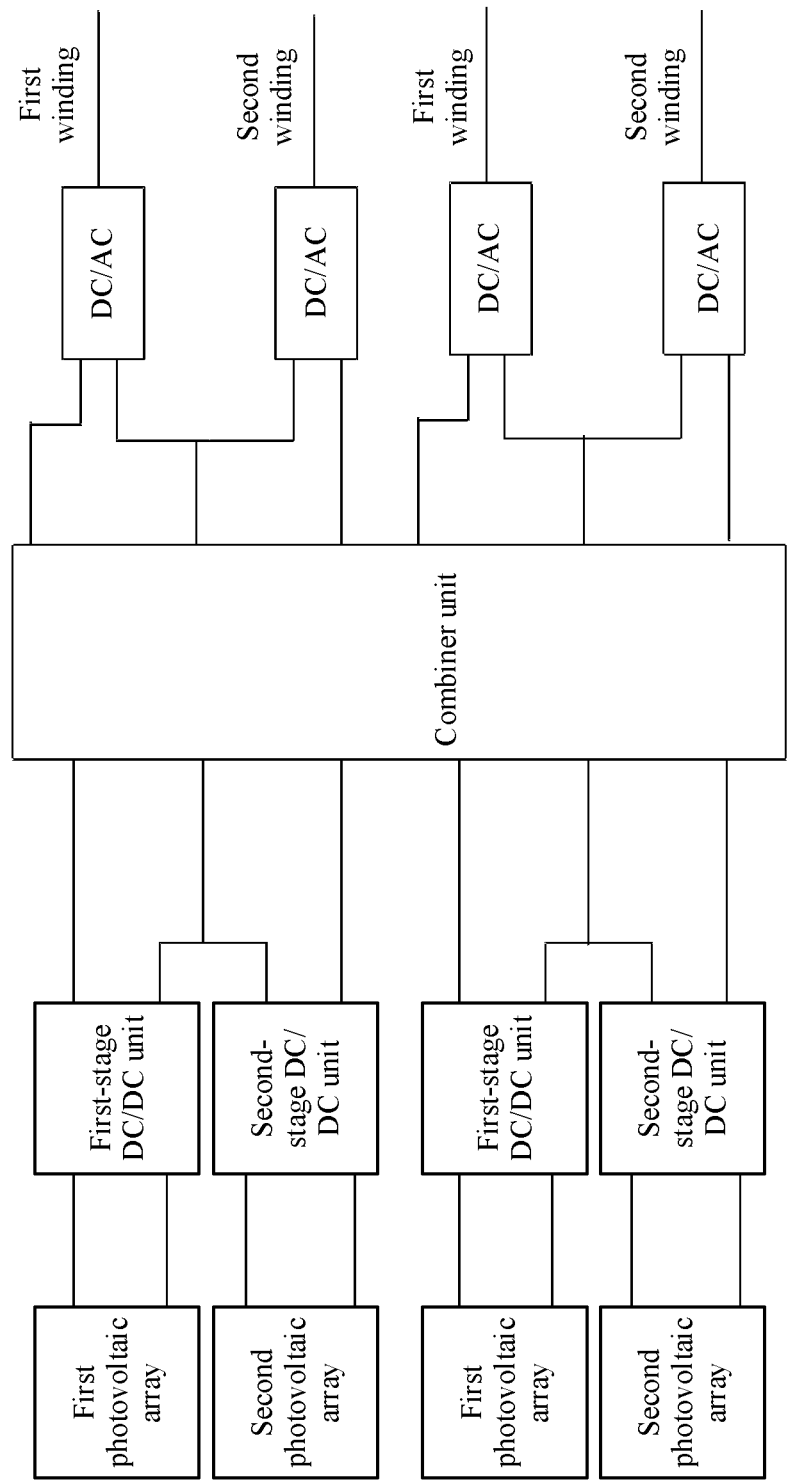
FIG. 32b is another schematic diagram of a photovoltaic power generation system according to an embodiment of this application.

FIG. 32a is another schematic diagram of the photovoltaic power generation system according to an embodiment of this application. In some embodiments, the photovoltaic power generation system further includes a combiner unit. The combiner unit includes at least three input terminals, which are respectively connected to the positive output terminal of the first-stage DC-to-DC unit, the first node, and the negative output terminal of the second-stage DC-to-DC unit. In actual application, the combiner unit may further include more input terminals to connect more first-stage DC-to-DC units and more second-stage DC-to-DC units. It may be understood that the first-stage DC-to-DC unit is coupled to the first photovoltaic array, and the second-stage DC-to-DC unit is coupled to the second photovoltaic array. An output terminal of the combiner unit is connected to the positive input terminal of the first-stage DC-to-AC unit, the second node, and the negative input terminal of the second-stage DC-to-AC unit. In this embodiment of this application, the combiner unit is coupled between the DC-to-DC unit and the DC-to-AC unit, so that the photovoltaic power generation system can be coupled to more first photovoltaic arrays and more second photovoltaic arrays, thereby facilitating expansion of a scale of the photovoltaic power generation system. In another possible embodiment, the combiner unit may be provided with three busbars, including a first busbar, a second busbar, and a third busbar. The first busbar is coupled to the positive output terminal of the first-stage DC-to-DC unit, the second busbar is coupled to the first node, and the third busbar is coupled to the negative output terminal of the second-stage DC-to-DC unit. In another aspect, the first busbar is coupled to the positive input terminal of the first-stage DC-to-AC unit, the second busbar is coupled to the second node, and the third busbar is coupled to the negative input terminal of the second-stage DC-to-AC unit. FIG. 32b is another schematic diagram of the photovoltaic power generation system according to an embodiment of this application. As shown in FIG. 32b, when the photovoltaic power generation system includes a plurality of first-stage DC-to-AC units and second-stage DC-to-AC units, the photovoltaic power generation system may alternatively couple the plurality of first-stage DC-to-AC units and second-stage DC-to-AC units to the foregoing three busbars. Combination is performed by using the combiner unit. This is not limited in this embodiment of this application.

Figure 33:
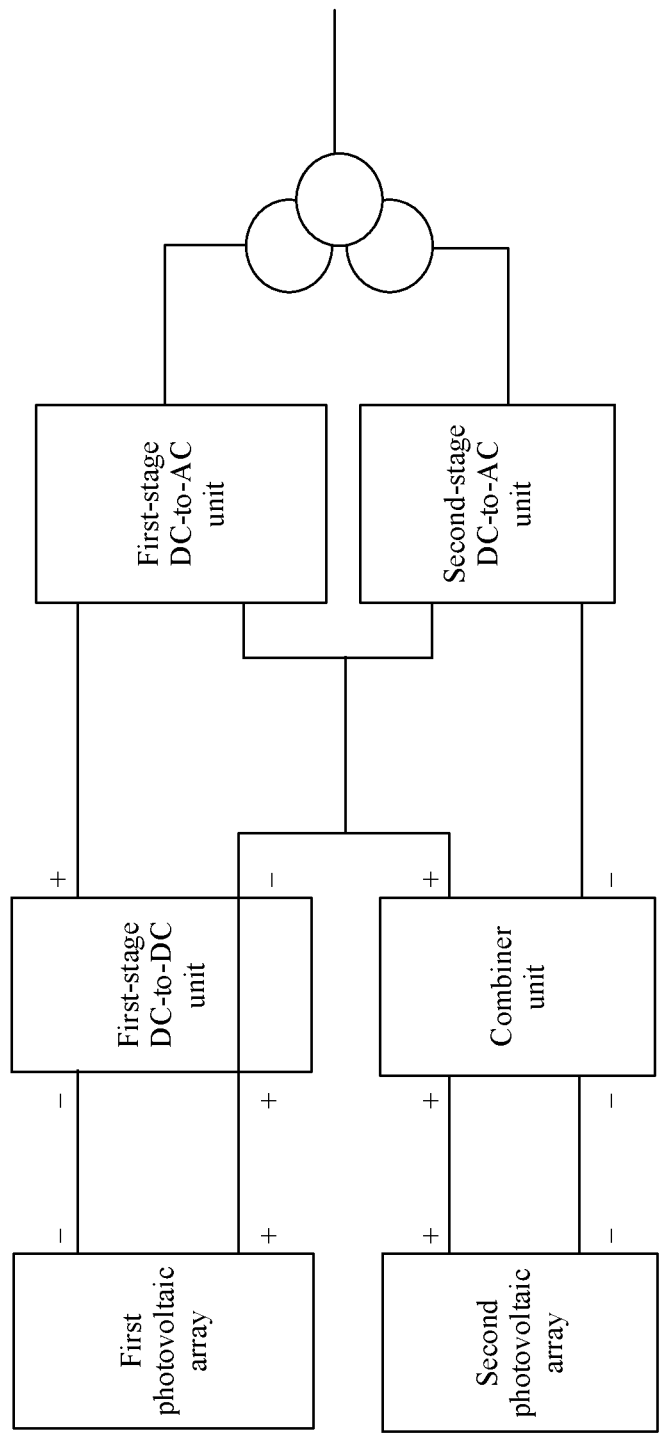
FIG. 33 is another schematic diagram of a photovoltaic power generation system according to an embodiment of this application.

FIG. 33 is another schematic diagram of the photovoltaic power generation system according to an embodiment of this application. In some embodiments, the second-stage DC-to-DC unit may be replaced by a combiner unit. The output of the second photovoltaic array is implemented by using the combiner unit. In addition, when the first node and the second node are not connected, and when the system is normally connected to the grid for working, the input voltages of the first-stage DC-to-AC unit and the second-stage DC-to-AC unit are determined based on the output voltages and powers of the first-stage DC-to-AC unit and the second-stage DC-to-AC unit. In this case, the first-stage DC-to-DC unit controls its output voltage and current, that is, a voltage and a current output by the second photovoltaic array may be adjusted, to implement MPPT tracking of the second photovoltaic array.

Figure 34:
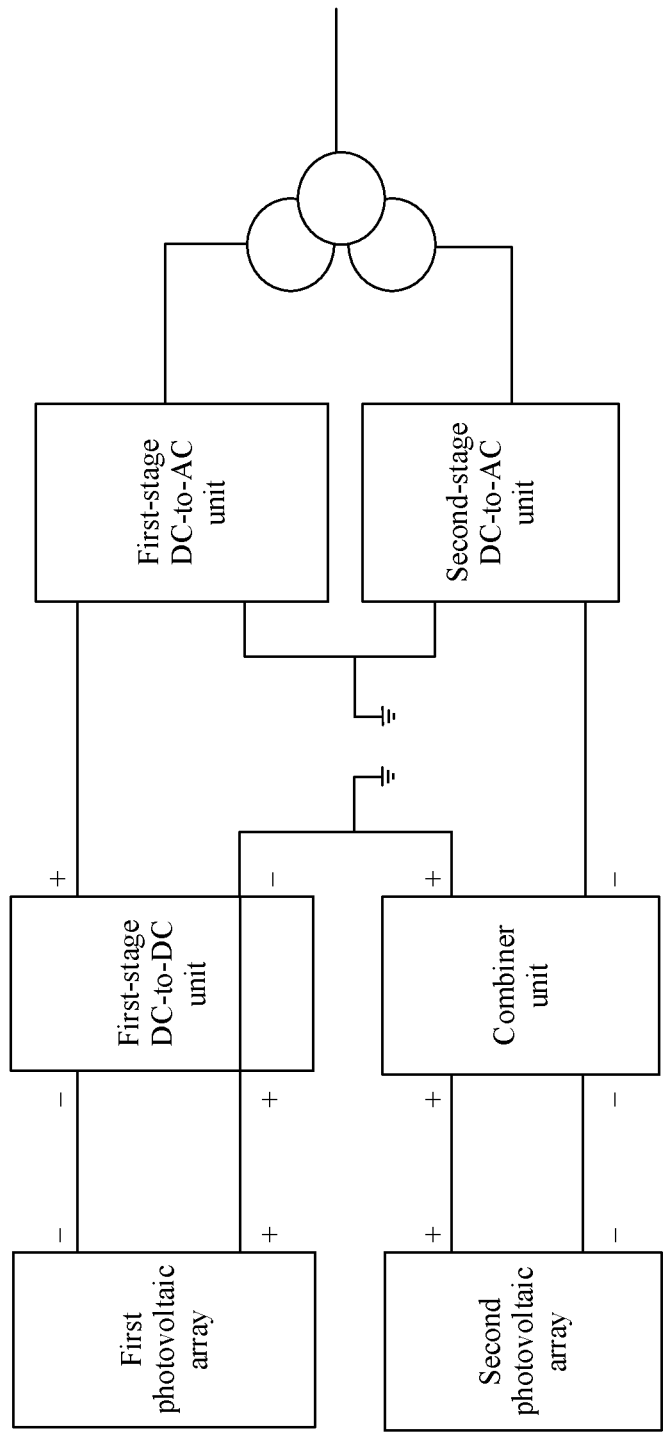
FIG. 34 is another schematic diagram of a photovoltaic power generation system according to an embodiment of this application.

FIG. 34 is another schematic diagram of the photovoltaic power generation system according to an embodiment of this application. In some embodiments, the second-stage DC-to-DC unit may be replaced by a combiner unit, and the first node and the second node are separately coupled to ground. The output of the second photovoltaic array is combined by using the combiner unit, and then is coupled in series to the output terminal of the first-stage DC-to-DC unit after the combination. The coupling node is the first node, and the first node and the second node are grounded and coupled to implement power connection.

Figure 35A:
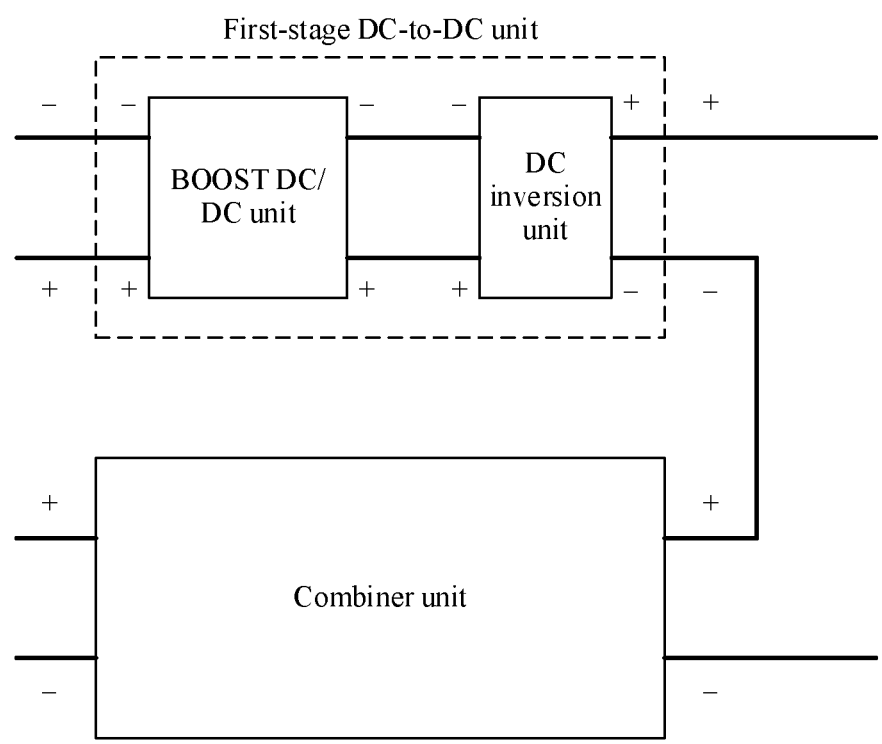
FIG. 35a is another schematic diagram of a photovoltaic power generation system according to an embodiment of this application.

FIG. 35a is a schematic diagram of another embodiment of the power system according to an embodiment of this application, corresponding to FIG. 33 and FIG. 34. As shown in FIG. 35a, in some embodiments, the first-stage DC-to-DC unit is specifically a BOOST DC/DC unit which is cascaded to the DC flip unit. In this embodiment of this application, a negative input electrode and a negative output electrode of the BOOST DC/DC unit are directly connected. A negative input electrode and a positive output electrode of the DC flip unit are directly connected.

Figure 35B:
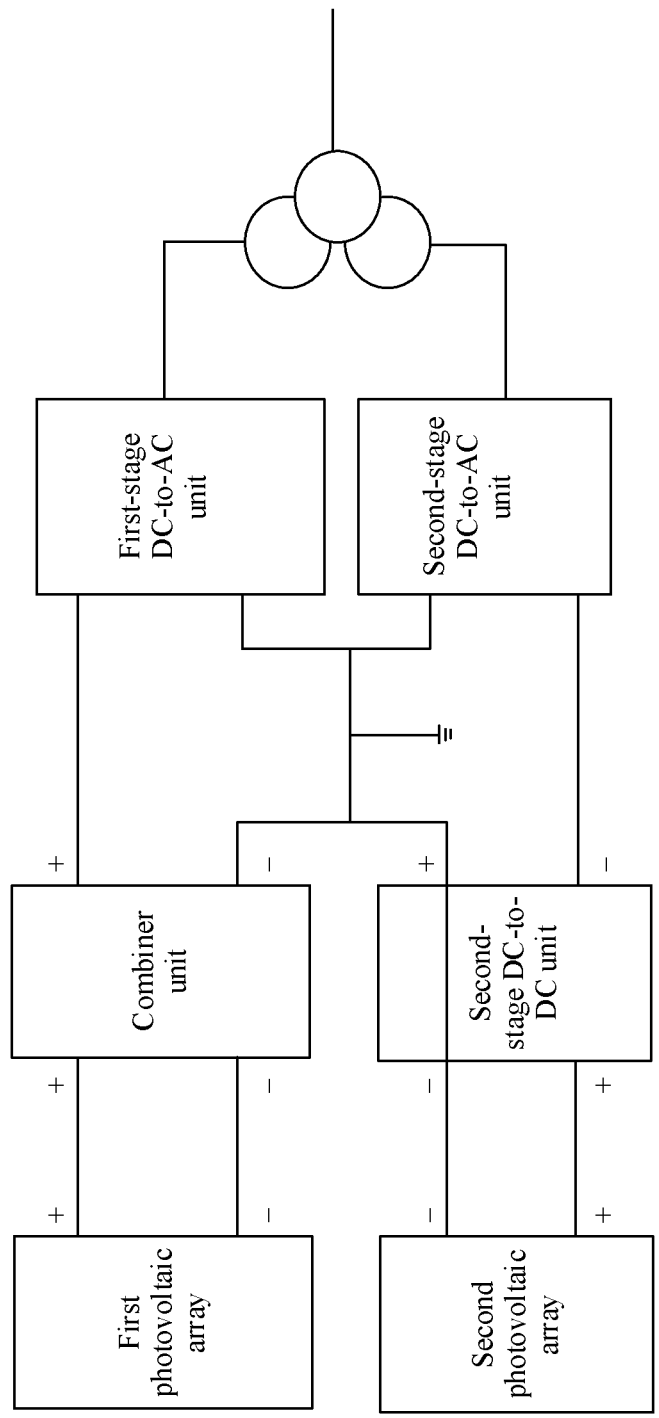
FIG. 35b is another schematic diagram of a photovoltaic power generation system according to an embodiment of this application.

FIG. 35b is another schematic diagram of the photovoltaic power generation system according to an embodiment of this application. In some embodiments, similarly, the first-stage DC-to-DC unit may also be replaced by a combiner unit. A principle is similar to that of replacing the second-stage DC-to-DC unit with the combiner unit. Details are not described herein again. In this embodiment of this application, the first node and the second node may be coupled and then grounded. In some embodiments, the combiner unit and the second-stage DC-to-DC unit may be used as a same whole. This is not limited in this embodiment of this application.

Figure 36A:
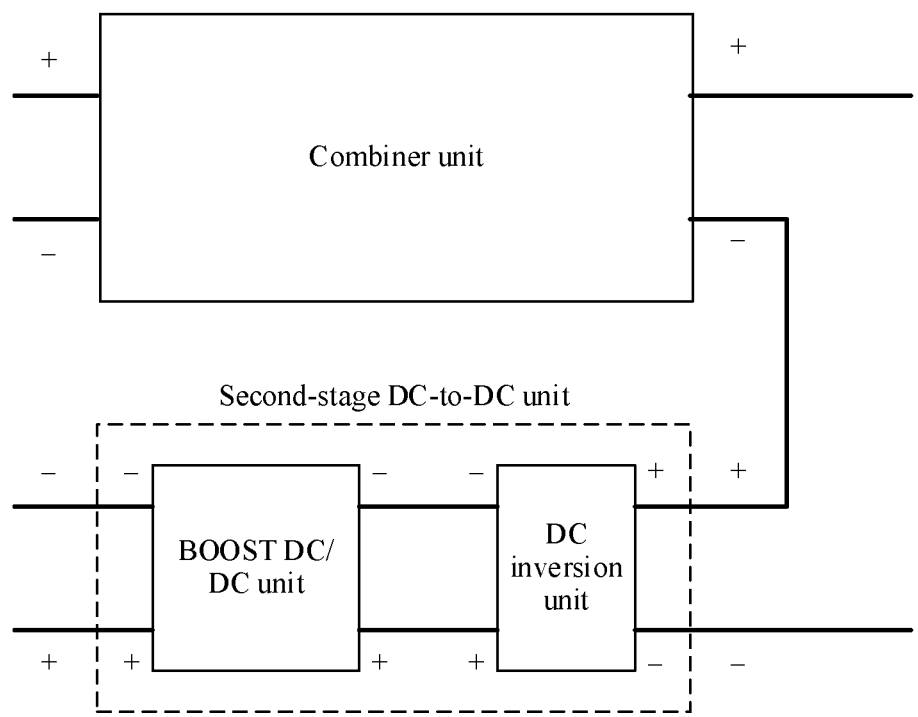
FIG. 36a is another schematic diagram of a photovoltaic power generation system according to an embodiment of this application.

FIG. 36a is a schematic diagram of another embodiment of the power system according to an embodiment of this application, corresponding to FIG. 35b. As shown in FIG. 36a, in some embodiments, the second-stage DC-to-DC unit is specifically a BOOST DC/DC unit which is cascaded to the DC flip unit. In this embodiment of this application, a negative input electrode and a negative output electrode of the BOOST DC/DC unit are directly connected. A negative input electrode and a positive output electrode of the DC flip unit are directly connected.

Figure 36B:
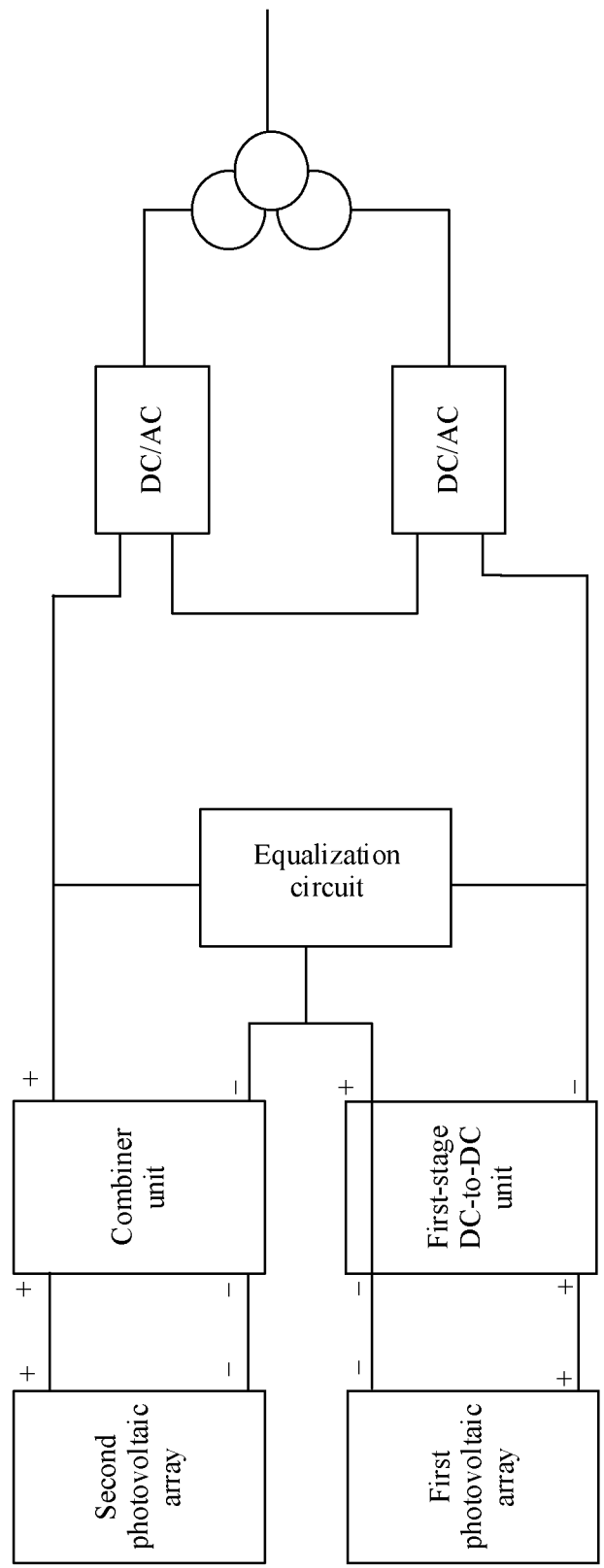
FIG. 36b is another schematic diagram of a photovoltaic power generation system according to an embodiment of this application.

FIG. 36b is another schematic diagram of the photovoltaic power generation system according to an embodiment of this application. In this embodiment, the second-stage DC-to-DC unit may be replaced by a combiner unit. In addition, the photovoltaic power generation system is provided with an equalization circuit. When output powers and/or output voltages of the first photovoltaic array and the second photovoltaic array are asymmetric, the equalization circuit is configured to balance the output powers and/or voltages of the first photovoltaic array and the second photovoltaic array, to maximize application of the output powers of the first photovoltaic array and the second photovoltaic array. The equalization circuit includes a first interface, a second interface, and a third interface. The first interface is coupled to the first node (a coupling point between the negative output terminal of the combiner unit and the positive output terminal of the first-stage DC-to-DC unit). The second interface is coupled to the positive output terminal of the combiner unit. The third interface is coupled to the negative output terminal of the first-stage DC-to-DC unit. A working principle of the equalization circuit is as follows: The equalization circuit unit obtains energy through the second interface and the third interface, and compensates the energy to the first photovoltaic array or the first-stage DC-to-DC unit with a low output power and/or voltage. Alternatively, the equalization circuit obtains energy from the second photovoltaic array through the first interface and the second interface, and compensates the energy to the first-stage DC-to-DC unit through the first interface and the third interface. Alternatively, the equalization circuit unit obtains energy from the first-stage DC-to-DC unit through the first interface and the third interface, and compensates the energy to the second photovoltaic array through the first interface and the second interface. In some embodiments, the equalization circuit unit may further include a fourth interface.

The fourth interface is coupled to the second node. This is specifically similar to the third equalization circuit unit in the embodiment corresponding to FIG. 23, and details are not described herein again.

Figure 37:
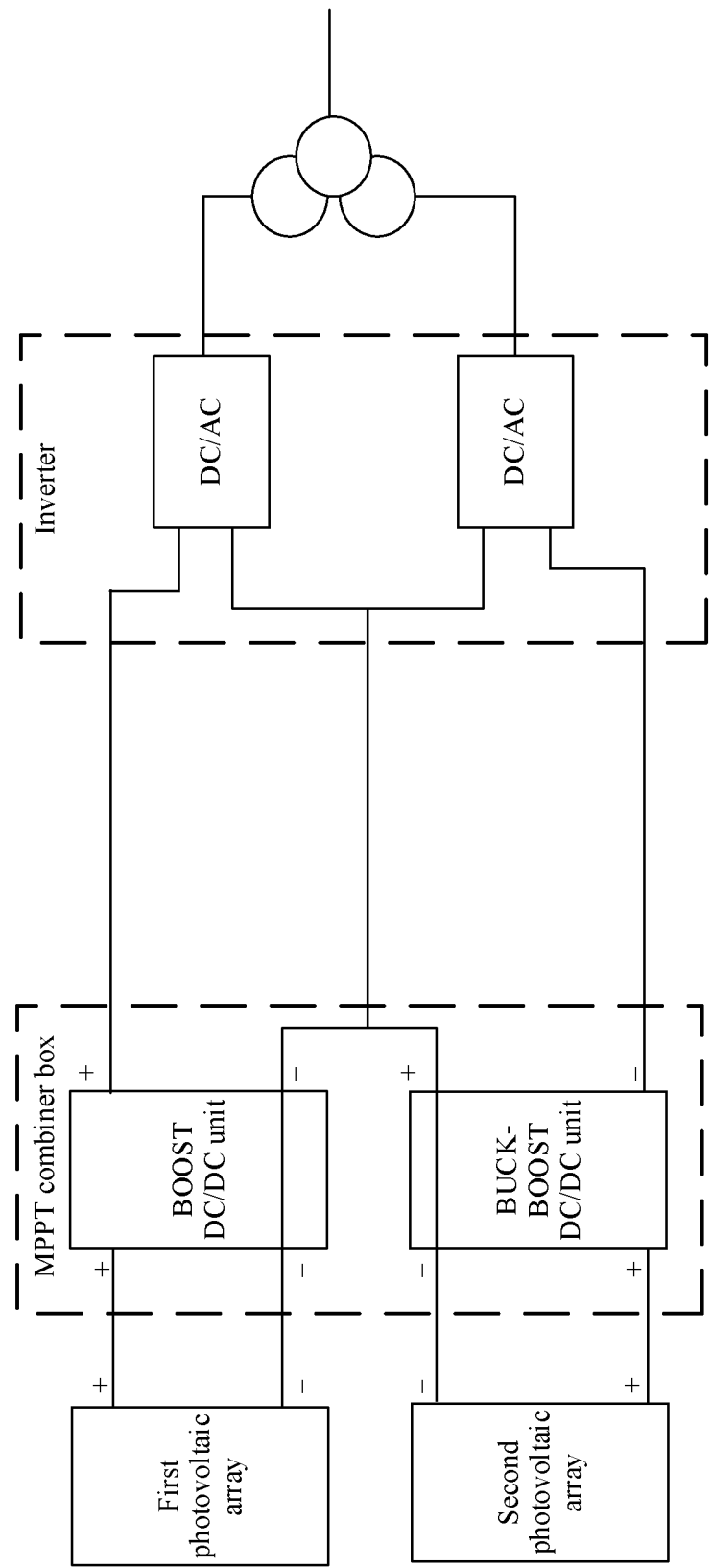
FIG. 37 is another schematic diagram of a photovoltaic power generation system according to an embodiment of this application.

FIG. 37 is another schematic diagram of the photovoltaic power generation system according to an embodiment of this application. In some embodiments, the first-stage DC-to-DC unit is specifically a BOOST DC/DC unit, the second-stage DC-to-DC unit is specifically a BUCK-BOOST DC/DC unit, and the BOOST DC/DC unit and the BUCK-BOOST DC/DC unit form an MPPT combiner box. In this embodiment of this application, a negative input electrode and a negative output electrode of the BOOST DC/DC unit are directly connected. A positive input electrode of the BOOST DC/DC unit is connected to the positive output electrode of the first photovoltaic array, and the negative input electrode of the BOOST DC/DC unit is connected to the negative output electrode of the first photovoltaic array. A negative input electrode and a positive output electrode of the BUCK-BOOST DC/DC unit are directly connected. A positive input electrode of the BUCK-BOOST DC/DC unit is connected to the positive output electrode of the second photovoltaic array, and the negative input electrode of the BUCK-BOOST DC/DC unit is connected to the negative output electrode of the second photovoltaic array. In some embodiments, the photovoltaic power generation system includes a plurality of first-stage DC-to-DC units and a plurality of second-stage DC-to-DC units. Negative output terminals of all first-stage DC-to-DC units are connected to positive output terminals of all second-stage DC-to-DC units to form a third output terminal of the MPPT combiner box. Positive output electrodes of all first-stage DC-to-DC units form a first output terminal of the MPPT combiner box. Negative output electrodes of all second-stage DC-to-DC units form a second output terminal of the MPPT combiner box.

In FIG. 37, the first-stage DC-to-AC unit and the second-stage DC-to-AC unit form an inverter. When the photovoltaic power generation system includes a plurality of inverters, negative input electrodes of all first-stage DC-to-AC units are connected to positive input electrodes of all second-stage DC-to-AC units to form a third input terminal of the inverter, positive input electrodes of all first-stage DC-to-AC units form a first input terminal of the inverter, negative input electrodes of all second-stage DC-to-AC units are connected to form a second input terminal of the inverter, output terminals of all first-stage DC-to-AC units form a first output terminal of the inverter, and output terminals of all second-stage DC-to-AC units form a second output terminal of the inverter.

In FIG. 37, the first output terminal of the MPPT combiner box is coupled to the first input terminal of the inverter. The second output terminal of the MPPT combiner box is coupled to the second input terminal of the inverter. The third output terminal of the MPPT combiner box is coupled to the third input terminal of the inverter. The first output terminal and the second output terminal of the inverter are respectively connected to the first winding and the second winding of the double-split transformer. To suppress generation of a PID phenomenon of the photovoltaic cell panel, a same implementation as the foregoing implementation example may be used, for example, arranging an isolation unit and a voltage source. For the coupling manner of the output terminal of the DC-to-DC unit, the coupling manner of the input terminal of the DC-to-AC unit, and the coupling manner of the output terminal of the DC-to-DC unit and the input terminal of the DC-to-AC unit, a same implementation as the foregoing implementation example may be used, and details are not described herein again.

Embodiment 5

Figure 38:
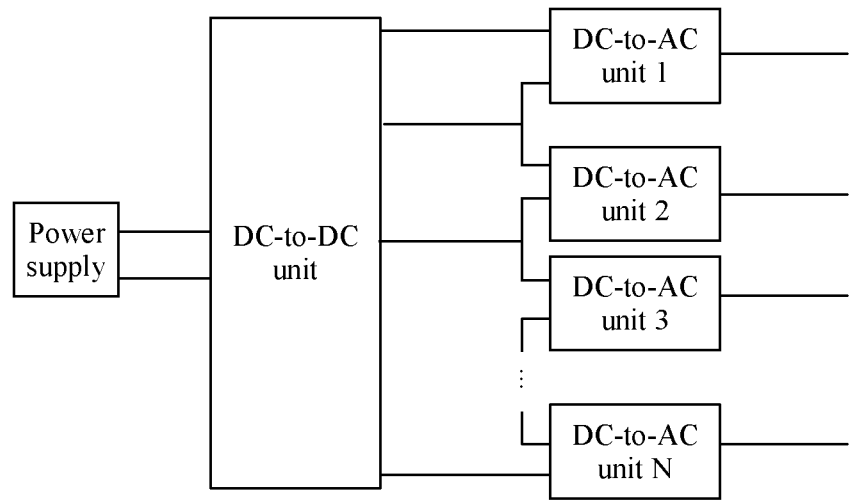
FIG. 38 is a schematic diagram of Embodiment 5 of a power system according to an embodiment of this application.

FIG. 38 is a schematic diagram of Embodiment 5 of a power system according to an embodiment of this application. The power system includes a power supply, a DC-to-DC unit, and N DC-to-AC units. An output terminal of the power supply is coupled to an input terminal of the DC-to-DC unit, and the power supply may be photovoltaic arrays, an energy storage power supply, a wind power generation direct current source, or the like. This is similar to the power supply in Embodiment 3, and details are not described herein again. An output terminal of the DC-to-DC unit includes a positive output terminal, a negative output terminal, and a third output terminal. The positive output terminal of the DC-to-DC unit is coupled to a positive input terminal of a first DC-to-AC unit. The negative output terminal of the DC-to-DC unit is coupled to a negative input terminal of an $N^{th}$ DC-to-AC unit. The third output terminal of at least one DC-to-DC unit is coupled to at least one first node. The first node is formed by serially coupling a negative input terminal of an $n^{th}$ DC-to-AC unit and a positive input terminal of an $(n+1)^{th}$ DC-to-AC unit, where n is an integer greater than 0 and less than N. That is, a negative input terminal of a DC-to-AC unit 1 is coupled in series to a positive input terminal of a DC-to-AC unit 2 to form a first node, a negative input terminal of the DC-to-AC unit 2 is coupled in series to a positive input terminal of a DC-to-AC unit 3 to form a first node, . . . , and so on. This is similar to the DC-to-AC unit in Embodiment 3, and details are not described herein again.

In this embodiment of this application, the DC-to-DC unit may be an apparatus that can convert a direct current into a direct current, for example, a DC/DC converter. The input terminal of the DC-to-DC unit may be connected to one power supply, or may be connected to a plurality of power supplies. This is not limited in this embodiment of this application. A manner of coupling the input terminal of the DC-to-DC unit and the power supply is generally that a positive output terminal of the power supply is coupled to a positive input terminal of the DC-to-DC unit, and a negative output terminal of the power supply is coupled to a negative input terminal of the DC-to-DC unit. Details are not described again in this embodiment of this application.

In this embodiment of this application, input terminals of the DC-to-AC units are cascaded, to reduce a current between the DC-to-DC unit and the DC-to-AC unit, and resolve cost and loss problems of a cable from the DC-to-DC unit to the DC-to-AC unit. When the DC-to-DC unit is connected to a plurality of power supplies, an output voltage may be increased, to reduce the current between the DC-to-DC unit and the DC-to-AC unit, and resolve cost and loss problems of the cable from the DC-to-DC unit to the DC-to-AC unit.

In this embodiment of this application, the third output terminal of the at least one DC-to-DC unit is coupled to the at least one first node. For example, in some embodiments, one third output terminal is coupled to one first node, and another third output terminal is not coupled to another first node. In some other embodiments, two third output terminals are respectively coupled to two first nodes, and another third output terminal is not coupled to another first node. In some other embodiments, a quantity of third output terminals is equal to a quantity of first nodes, and each third output terminal is coupled to a corresponding first node. In some other embodiments, a quantity of third output terminals is different from a quantity of first nodes, each third output terminal is coupled to a corresponding first node, and a remaining third output terminal or a remaining first node is not coupled. In actual application, another coupling manner may alternatively be used. This is not limited in this embodiment of this application. In this embodiment of this application, a quantity of cables connected between the DC-to-DC unit and the DC-to-AC unit is reduced in a manner of the third output terminal and the first node, to reduce costs of the power system.

In this embodiment of this application, outputs of output terminals of DC-to-AC units are isolated. For example, an output terminal of the DC-to-AC unit 1 is isolated from an output terminal of the DC-to-AC unit 2, and an output terminal of the DC-to-AC unit 2 is isolated from an output terminal of the DC-to-AC unit 3. In actual application, an output terminal of each DC-to-AC unit is coupled to different windings, and each winding may output a three-phase voltage or a single-phase voltage. This is not limited in this embodiment of this application. In this embodiment of this application, the cascaded input and isolated output of the DC-to-AC unit reduce a specification of a power conversion device. Therefore, problems of insufficient specifications (generally up to 1700 V for an insulated gate bipolar transistor, IGBT) and high costs of power conversion devices in the current industry are resolved. In addition, a circuit breaker with a low specification may be used to reduce costs.

In some embodiments, the DC-to-AC unit 1, the DC-to-AC unit 2, . . . , and the DC-to-AC unit M may be considered as one combination of DC-to-AC units. Therefore, one power system includes at least one power supply, one DC-to-DC unit, and one combination of DC-to-AC units. When there are a plurality of power supplies and/or a plurality of DC-to-DC units and/or a plurality of combinations of DC-to-AC units, output terminals of the plurality of power supplies that are connected in series and in parallel are connected to an input terminal of one DC-to-DC unit, or are respectively connected to input terminals of a plurality of different DC-to-DC units. Same-type output terminals of a plurality of DC-to-DC units are coupled in parallel, and same-type input terminals of at least two combinations of DC-to-AC units are connected in parallel. At least one parallel-connected third output terminal is coupled to at least one parallel-connected first node. In this embodiment of this application, same-type output terminals of a plurality of combinations of DC-to-AC units may be coupled in parallel, or outputs of the same-type output terminals may be isolated. This is similar to the description corresponding to FIG. 5c in the foregoing embodiment, and details are not described herein again.

In some embodiments, a communication signal is coupled to a direct current cable connected between the power supply and the DC-to-DC unit. A communication signal is also coupled to a direct current cable connected between the DC-to-DC unit and the DC-to-AC unit. Preferably, the communication signal may be a PLC signal. This is similar to the description of the communication signal in Embodiment 1, and details are not described herein again. In actual application, the power system may use a power supply, a DC-to-DC unit, and a DC-to-AC unit that can recognize a communication signal, or may modify a power supply, a DC-to-DC unit, and a DC-to-AC unit so that the power supply, the DC-to-DC unit, and the DC-to-AC unit can recognize a communication signal. This is not limited in this embodiment of this application.

In some embodiments, the power supply is a photovoltaic array formed by connecting an output of a photovoltaic cell panel to an optimizer or a shutdown device, and then connecting in series or in parallel combinations. When a communication signal is coupled to a direct current cable connected between the power supply, the DC-to-DC unit, and the DC-to-AC unit, the communication signal also passes through the optimizer or the shutdown device, and the power supply, the DC-to-DC unit, or the DC-to-AC unit may control, by using the communication signal, shutdown of the optimizer or the shutdown device, to implement fast shutdown. That is, the power supply, the DC-to-DC unit, or the DC-to-AC unit may send a communication signal that carries a shutdown instruction to the optimizer or the shutdown device. After receiving the communication signal that carries the shutdown instruction, the optimizer or the shutdown device executes the shutdown instruction, to implement fast shutdown. A situation of the communication signal is similar to the description of the communication signal in Embodiment 1, and details are not described herein again.

In some embodiments, the power system further includes at least one energy storage unit. The energy storage unit is coupled in parallel to at least two direct current cables connected between the DC-to-DC unit and the DC-to-AC unit. In this embodiment of this application, the direct current cable connected between the DC-to-DC unit and the DC-to-AC unit may be a direct current cable for coupling the positive output terminal of the DC-to-DC unit and a positive input terminal of the DC-to-AC unit 1, may be a direct current cable for coupling the negative output terminal of the DC-to-DC unit and a negative input terminal of the DC-to-AC unit N, or may be a direct current cable for coupling the third output terminal and the first node. For example, the energy storage unit is coupled in parallel between the direct current cable for coupling the positive output terminal of the DC-to-DC unit and the positive input terminal of the DC-to-AC unit 1 and the direct current cable for coupling the negative output terminal of the DC-to-DC unit and the negative input terminal of the DC-to-AC unit N. Alternatively, the energy storage unit is coupled in parallel among three direct current cables for coupling the third output terminal and the first node. It may be understood that a quantity of energy storage units included in one power system is not limited, that is, a plurality of energy storage units may be coupled in parallel at the same time. This is not limited in this embodiment of this application.

In the embodiment that includes the energy storage unit, the energy storage unit may be an energy storage device, or may include a direct current conversion unit and an energy storage device, or may be another apparatus capable of storing energy. This is similar to the description of the energy storage unit in Embodiment 1, and details are not described herein again. A communication signal is coupled to a direct current cable connected between the energy storage unit and the DC-to-DC unit, and the energy storage unit may communicate with the DC-to-DC unit. A communication signal is coupled to a direct current cable connected between the energy storage unit and the DC-to-AC unit, and the energy storage unit may communicate with the DC-to-AC unit. A situation of the communication signal and a principle for implementing communication are similar to the description of the communication signal in Embodiment 1, and details are not described herein again.

Embodiment 6

Figure 39:
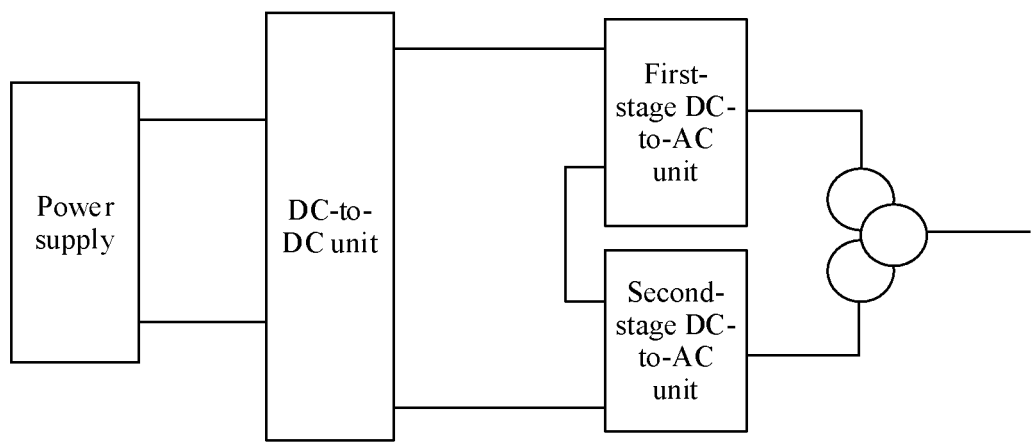
FIG. 39 is a schematic diagram of Embodiment 6 of a power system according to an embodiment of this application.

FIG. 39 is a schematic diagram of Embodiment 6 of a power system according to an embodiment of this application. The power system includes a power supply, a DC-to-DC unit, a first-stage DC-to-AC unit, and a second-stage DC-to-AC unit. An output terminal of the power supply is coupled to an input terminal of the DC-to-DC unit. The power supply may be photovoltaic arrays, an energy storage power supply, a wind power generation direct current source, or the like. The DC-to-DC unit may be an apparatus that can convert a direct current into an alternating current, for example, an inverter. This is similar to the description in Embodiment 5, and details are not described herein again. A positive output terminal of the DC-to-DC unit is coupled to a positive input terminal of the first-stage DC-to-AC unit. A negative output terminal of the DC-to-DC unit is coupled to a negative input terminal of the second-stage DC-to-AC unit. A negative input terminal of the first-stage DC-to-AC unit is coupled to a positive input terminal of the second-stage DC-to-AC unit.

In this embodiment of this application, input terminals of the DC-to-AC units are cascaded, to reduce a current between the DC-to-DC unit and the DC-to-AC unit, and resolve cost and loss problems of a cable from the DC-to-DC unit to the DC-to-AC unit. When the DC-to-DC unit is connected to a plurality of power supplies, an output voltage may be increased, to reduce the current between the DC-to-DC unit and the DC-to-AC unit, and resolve cost and loss problems of the cable from the DC-to-DC unit to the DC-to-AC unit.

In this embodiment of this application, outputs of output terminals of the first-stage DC-to-AC unit and the second-stage DC-to-AC unit are isolated, and are connected to different windings. This is similar to the case in which the output of the DC-to-AC unit is isolated in Embodiment 1, and details are not described herein again. In this embodiment of this application, the cascaded input and isolated output of the DC-to-AC unit reduce a specification of a power conversion device. Specifications of power conversion devices in the current industry are insufficient (generally up to 1700 V for an IGBT). However, a 1500 V circuit breaker may be used in the power system provided in this embodiment of this application to reduce costs. The technical problem of insufficient specifications of the power conversion devices in the current industry is resolved.

A third output terminal of the DC-to-DC unit may also be referred to as a middle point of an output terminal potential or referred to as a first node. The negative input terminal of the first-stage DC-to-AC unit is coupled to the positive input terminal of the second-stage DC-to-AC unit, and a coupling node after coupling is a second node.

Figure 40:
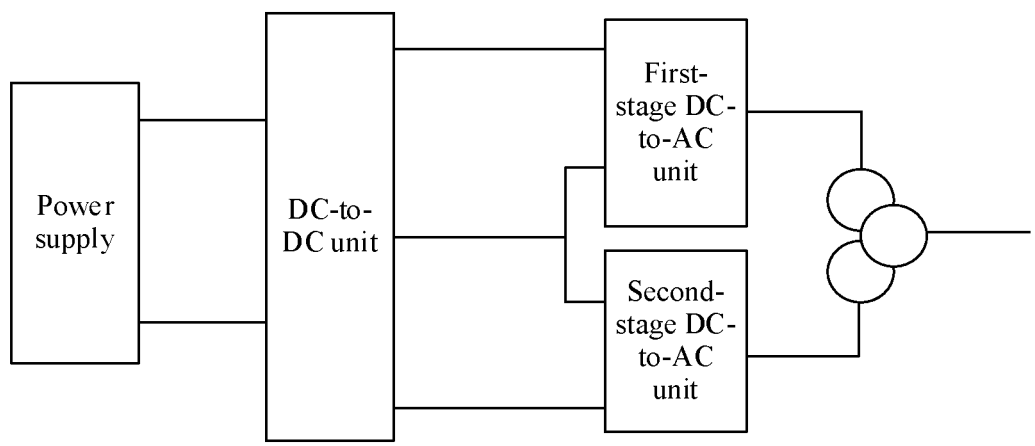
FIG. 40 is a schematic diagram of an embodiment of a power system according to an embodiment of this application.

FIG. 40 is a schematic diagram of an embodiment of the power system according to an embodiment of this application. As shown in FIG. 40, in some embodiments, the positive output terminal of the DC-to-DC unit is coupled to the positive input terminal of the first-stage DC-to-AC unit by using a first conducting wire. The negative output terminal of the DC-to-DC unit is coupled to the negative input terminal of the second-stage DC-to-AC unit by using a second conducting wire. The first node and the second node are coupled by using a third conducting wire. It may be understood that, in this embodiment of this application, the first conducting wire, the second conducting wire, and the third conducting wire are all direct current cables connected between the DC-to-DC unit and the DC-to-AC unit (the first-stage DC-to-AC unit and the second-stage DC-to-AC unit). A material and a wire diameter specification of the cable may be configured based on an actual situation. This is not limited in this embodiment of this application.

In some embodiments, the first conducting wire, the second conducting wire, and the third conducting wire form a distributed double (DC) bus. The first conducting wire and the second conducting wire form a positive bus. The second conducting wire and the third conducting wire form a negative bus. The third conducting wire is a neutral wire (Middle Cable) of the distributed double bus. The first conducting wire, the second conducting wire, and the third conducting wire are direct current conducting wires. In a 3D technology (three direct-Cable), a direct current bus is constructed by using three cables, a positive bus is constructed by using the first conducting wire and the second conducting wire, and a negative bus is constructed by using the second conducting wire and the third conducting wire.

In addition, because the first node is the middle point of the output terminal potential of the DC-to-DC unit, and the second node is a middle point of cascading the first-stage DC-to-AC unit and the second-stage DC-to-AC unit, a current value of the third conducting wire may be less than or equal to a current value of the first conducting wire. When the current value of the third conducting wire is less than or equal to the current value of the first conducting wire, a wire diameter specification of the third conducting wire may be reduced, to reduce costs of the third conducting wire. In another possible case, similarly, a current value of the third conducting wire is less than or equal to a current value of the second conducting wire. Therefore, when the current value of the third conducting wire is less than or equal to the current value of the second conducting wire, a wire diameter specification of the third conducting wire may be reduced, to reduce cable costs of the third conducting wire. Certainly, the current value of the third conducting wire may alternatively be less than the current value of the first conducting wire and less than the current value of the second conducting wire. This may also reduce the wire diameter specification of the third conducting wire, and reduce the cable costs of the third conducting wire.

Figure 41:
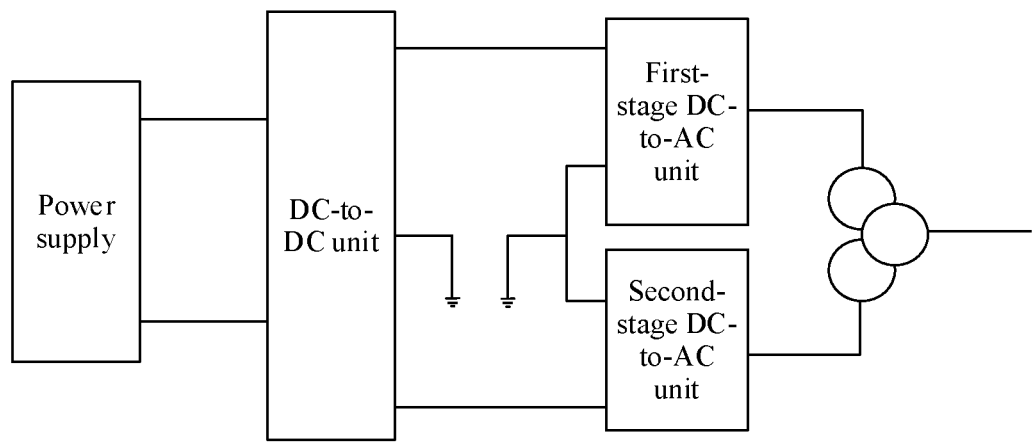
FIG. 41 is a schematic diagram of an embodiment of a power system according to an embodiment of this application.

FIG. 41 is a schematic diagram of an embodiment of the power system according to an embodiment of this application. As shown in FIG. 41, in some embodiments, both the first node and the second node are coupled to ground. In this embodiment of this application, both the first node and the second node are coupled to ground, so that when output powers or output voltages of the DC-to-DC units are asymmetric, or input powers or input voltages of the first-stage DC-to-AC unit and the second DC-to-AC unit are asymmetric, a current loop is provided to achieve voltage equalization, thereby ensuring normal operation of the system. In addition, no cable connection is required between the first node and the second node, and therefore costs of one cable and construction costs can be reduced.

Figure 42:
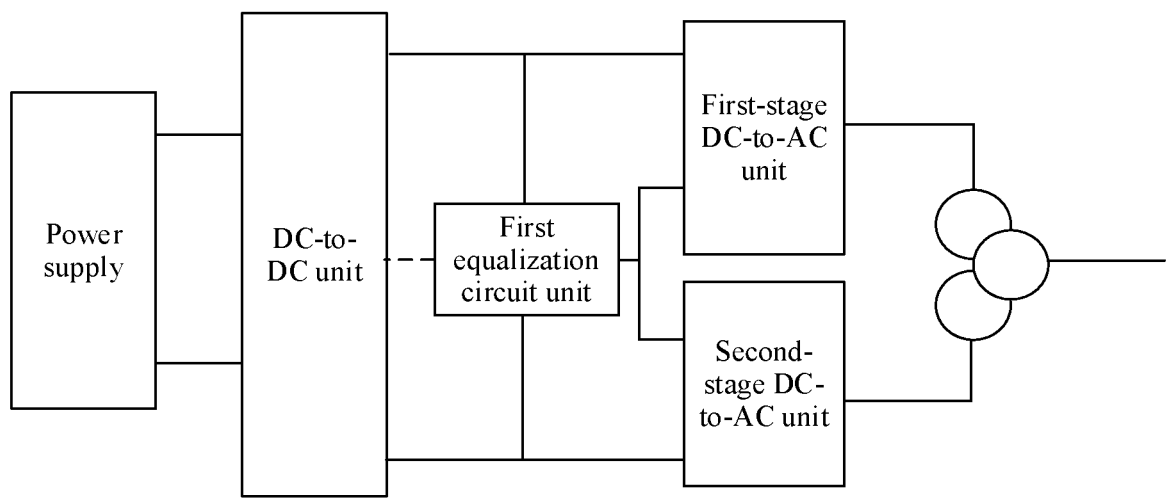
FIG. 42 is a schematic diagram of a power system that includes a first equalization circuit unit according to an embodiment of this application.

FIG. 42 is a schematic diagram of the power system that includes a first equalization circuit unit according to an embodiment of this application. In some embodiments, the power system further includes a first equalization circuit unit. The first equalization circuit unit is configured with a first interface, a second interface, and a third interface. The first interface is coupled to the second node. The second interface is coupled to the positive input terminal of the first-stage DC-to-AC unit. The third interface is coupled to the negative input terminal of the second-stage DC-to-AC unit. The first equalization circuit unit may balance input voltages and/or powers and/or currents of the first-stage DC-to-AC unit and the second-stage DC-to-AC unit. A working principle of the first equalization circuit unit is as follows: The first equalization circuit unit obtains energy from an input terminal of the first-stage DC-to-AC unit through the first interface and the second interface, and compensates the energy to the second-stage DC-to-AC unit through the first interface and the third interface. Alternatively, the first equalization circuit unit obtains energy from an input terminal of the second-stage DC-to-AC unit through the first interface and the third interface, and compensates the energy to the first-stage DC-to-AC unit through the first interface and the second interface.

In a possible embodiment, the first equalization circuit unit may include four interfaces, that is, the first equalization circuit unit is further configured with a fourth interface. The fourth interface is coupled to the first node. This is similar to the embodiment corresponding to FIG. 21b, and details are not described herein again.

Figure 43:
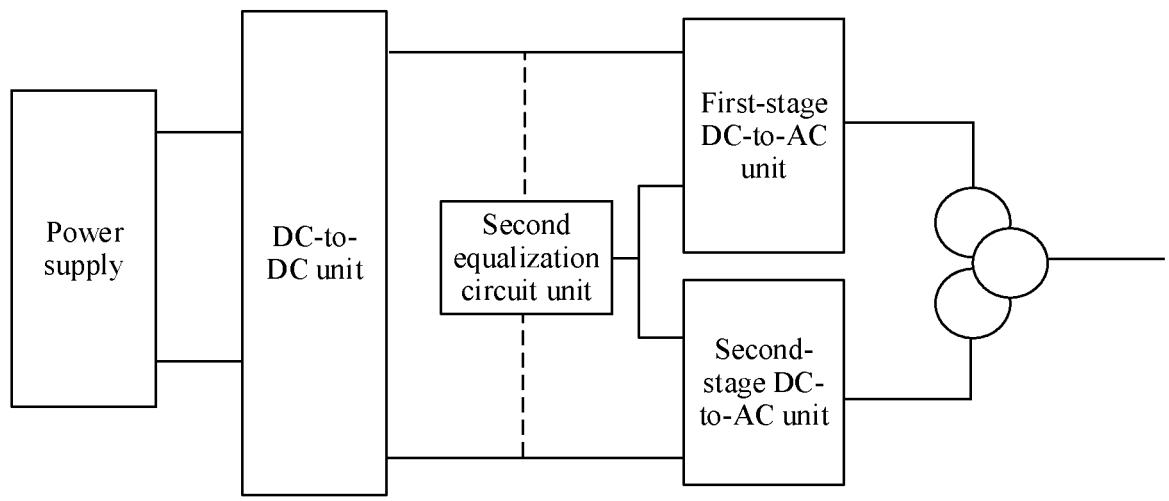
FIG. 43 is a schematic diagram of a power system that includes a second equalization circuit unit according to an embodiment of this application.

FIG. 43 is a schematic diagram of the power system that includes a second equalization circuit unit according to an embodiment of this application. The second equalization circuit unit is configured with a fifth interface and a sixth interface. The fifth interface is coupled to the second node. In some embodiments, the sixth interface is coupled to the positive input terminal of the first-stage DC-to-AC unit. This is similar to the embodiment corresponding to FIG. 22a, and details are not described herein again. In some embodiments, the sixth interface is coupled to the negative input terminal of the second-stage DC-to-AC unit. This is similar to the embodiment corresponding to FIG. 22b, and details are not described herein again.

Figure 44:
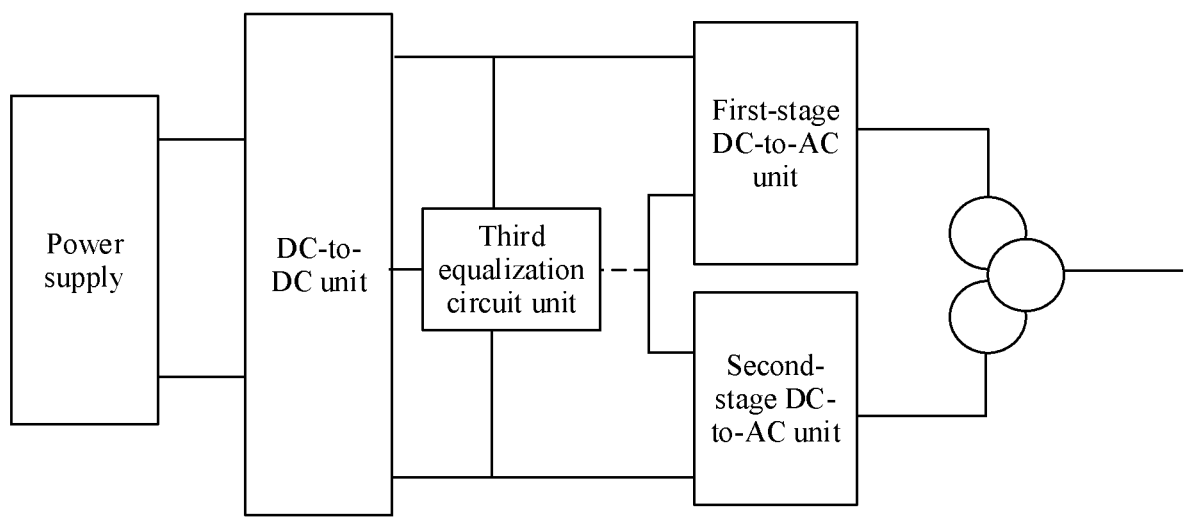
FIG. 44 is a schematic diagram of a power system that includes a third equalization circuit unit according to an embodiment of this application.

FIG. 44 is a schematic diagram of the power system that includes a third equalization circuit unit according to an embodiment of this application. The third equalization circuit unit is configured with a seventh interface, an eighth interface, and a ninth interface. The seventh interface is coupled to the first node. The eighth interface is coupled to the positive output terminal of the DC-to-DC unit. The ninth interface is coupled to the negative output terminal of the DC-to-DC unit. In some embodiments, the third equalization circuit unit is further configured with a tenth interface. The tenth interface is coupled to the second node. A principle of the third equalization circuit unit is similar to that in the embodiment corresponding to FIG. 23, and details are not described herein again.

Figure 45:
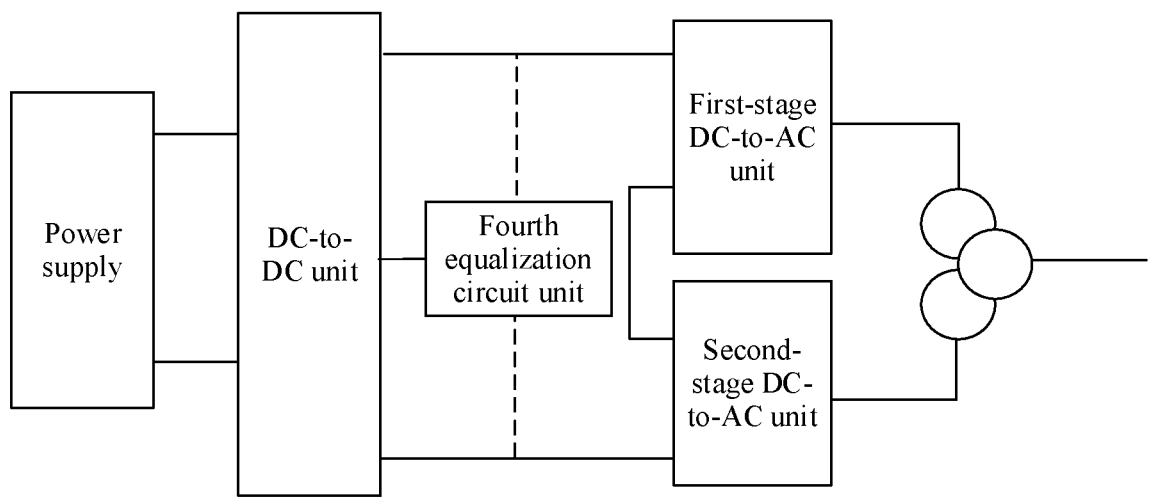
FIG. 45 is a schematic diagram of a power system that includes a fourth equalization circuit unit according to an embodiment of this application.

FIG. 45 is a schematic diagram of the power system that includes a fourth equalization circuit unit according to an embodiment of this application. The fourth equalization circuit unit is configured with an eleventh interface and a twelfth interface. The eleventh interface is coupled to the first node. In some embodiments, the twelfth interface is coupled to a positive input terminal of the DC-to-DC unit. A principle of the fourth equalization circuit unit is similar to that in the embodiment corresponding to FIG. 24a, and details are not described herein again. In some embodiments, the twelfth interface is coupled to a negative input terminal of the DC-to-DC unit. A principle of the fourth equalization circuit unit is similar to that in the embodiment corresponding to FIG. 24b, and details are not described herein again.

In some embodiments, the output terminals of the first-stage DC-to-AC unit and the second-stage DC-to-AC unit are respectively coupled to different transformers. Alternatively, the output terminals of the first-stage DC-to-AC unit and the second-stage DC-to-AC unit are respectively coupled to different windings of a same transformer, to implement isolated output.

In some embodiments, there are a plurality of power supplies and/or a plurality of DC-to-DC units and/or a plurality of DC-to-AC units. The power system specifically includes at least one power supply, at least one DC-to-DC unit, and at least one pair of DC-to-AC conversion units. A pair of DC-to-AC conversion units includes a first-stage DC-to-AC unit and a second-stage DC-to-AC unit. When at least one power supply, at least one DC-to-DC unit, and at least one pair of DC-to-AC conversion units are coupled, each DC-to-DC unit is coupled to at least one power supply. Alternatively, same-type input terminals of each DC-to-DC unit are coupled in parallel and then coupled to each power supply. Each pair of DC-to-AC conversion units is coupled to at least one pair of DC-to-DC units. Alternatively, same-type input terminals of each pair of DC-to-AC conversion units are coupled in parallel and then coupled to each DC-to-DC unit. This is similar to the description of parallel connection of a plurality of units in Embodiment 5, and details are not described herein again.

In some embodiments, an insulation monitoring device is coupled between the output terminal of the first-stage DC-to-AC unit and a ground point. In some other embodiments, an IMD is coupled between the output terminal of the second-stage DC-to-AC unit and a ground point. In some other embodiments, a first IMD is coupled between the output terminal of the first-stage DC-to-AC unit and a ground point, and a second IMD is coupled between the output terminal of the second-stage DC-to-AC unit and a ground point. The IMD can detect insulation impedance to ground of the power system. When the insulation impedance to ground is less than a preset value, preferably, in this embodiment of this application, a coupling connection between the first-stage DC-to-AC unit and/or the second-stage DC-to-AC unit and a transformer winding may be broken, so that the entire system stops working, thereby further ensuring safety of system operation. This is similar to the embodiment corresponding to FIG. 26, and details are not described herein again.

In this embodiment of this application, a communication signal is coupled to a direct current cable connected between the power supply, the DC-to-DC unit, the first-stage DC-to-AC unit, and the second-stage DC-to-AC unit, to implement communication between the power supply, the DC-to-DC unit, the first-stage DC-to-AC unit, and the second-stage DC-to-AC unit. The communication signal is preferably a PLC signal, which is similar to the description of the communication signal in the foregoing embodiment, and details are not described herein again.

In this embodiment of this application, a communication signal is coupled to an alternating current cable connected to the output terminal of the first-stage DC-to-AC unit, and the alternating current cable may be further coupled to another device. The first-stage DC-to-AC unit may communicate with the another device on the alternating current cable by using the communication signal. When a plurality of combinations of DC-to-AC units are connected in parallel, and outputs of a plurality of first-stage DC-to-AC units are connected in parallel, parallel-connected output terminals of the plurality of first-stage DC-to-AC units may communicate, by using a communication signal on a connected alternating current cable, with another device coupled to the alternating current cable. The another device described above may be an alternating current device that uses an alternating current. Similarly, a communication situation of the output terminal of the second-stage DC-to-AC unit is similar to that of the first-stage DC-to-AC unit, and details are not described herein again. The communication signal is preferably a PLC signal, which is similar to the description of the communication signal in the foregoing embodiment, and details are not described herein again.

In some embodiments, the power system provided in this embodiment of this application may be further configured with a leakage current sensor. The output terminal of the power supply is coupled to a leakage current sensor; and/or the input terminal of the DC-to-DC unit is coupled to a leakage current sensor; and/or the positive input terminal of the first-stage DC-to-AC unit and the negative input terminal of the first-stage DC-to-AC unit are coupled to a leakage current sensor; and/or the positive input terminal of the second-stage DC-to-AC unit and the negative input terminal of the second-stage DC-to-AC unit are coupled to a leakage current sensor; and/or an internal output phase wire of the first-stage DC-to-AC unit is coupled to a leakage current sensor; and/or an internal output phase wire of the second-stage DC-to-AC unit is coupled to a leakage current sensor. When the leakage current sensor detects that a leakage current value is greater than a preset threshold, the power supply and/or the first-stage DC-to-AC unit and/or the second-stage DC-to-AC unit and/or the DC-to-DC unit report/reports an alarm and/or the power system stops working. This is similar to the embodiment corresponding to FIG. 27, and details are not described herein again.

In some embodiments, at least one switch is connected in series to an internal output phase wire connected to the output terminal of the first-stage DC-to-AC unit, to implement fast shutdown of an output of the first-stage DC-to-AC unit. The switch may be a relay, a circuit breaker, or a contactor, or may be another type of switch. This is not limited in this embodiment of this application. Similarly, a switch may also be connected in series to an internal output phase wire connected to the output terminal of the second-stage DC-to-AC unit. This is similar to the case in which a switch is connected in series to the output phase wire of the first-stage DC-to-AC unit. Details are not described herein again.

In this embodiment of this application, when the power supply is a photovoltaic array, the power system may be referred to as a photovoltaic power generation system. For another type of power system, for example, a wind power generation system, an energy storage system, or a hybrid power generation system, refer to the photovoltaic power generation system for implementation. Details are not described for another type of power system in this embodiment of this application. The following describes the photovoltaic power generation system in detail.

In the photovoltaic power generation system, only one of the first node and the second node needs to be coupled to ground, that is, the first node is coupled to ground or the second node is coupled to ground. In some embodiments, both the first node and the second node may alternatively be coupled to ground. The first node and/or the second node are/is coupled to ground, so that when the output powers or output voltages of the first-stage DC-to-DC unit and the second DC-to-DC unit are asymmetric, or the input powers or input voltages of the first-stage DC-to-AC unit and the second DC-to-AC unit are asymmetric, a current loop can be provided to achieve voltage equalization, thereby ensuring normal operation of the system, and reducing costs of one cable and construction costs.

In this embodiment of this application, in the photovoltaic power generation system, a PID phenomenon may be eliminated by coupling a voltage source. In some embodiments, a voltage source is coupled between a ground point and a neutral point of a transformer winding corresponding to the output terminal of the second-stage DC-to-AC unit, to adjust a potential to ground of the neutral point. Alternatively, a voltage source may be coupled between a ground point and a neutral point of a transformer winding corresponding to the output terminal of the first-stage DC-to-AC unit, to adjust a voltage. This is similar to the description in Embodiment 4, and details are not described herein again.

In some embodiments, in the photovoltaic power generation system, a voltage source may be coupled between a ground point and an external phase wire at the output side of the first-stage DC-to-AC unit and/or the second-stage DC-to-AC unit, to adjust a potential to ground of the corresponding output phase wire and eliminate a PID phenomenon. This is similar to the principle in the embodiment corresponding to FIG. 12b, and details are not described herein again.

In some embodiments, in the photovoltaic power generation system, a voltage source may be coupled between a ground point and an internal phase wire at the output terminal of the first-stage DC-to-AC unit and/or the second-stage DC-to-AC unit, to adjust a potential to ground of the corresponding output phase wire and eliminate a PID phenomenon. This is similar to the principle in the embodiment corresponding to FIG. 12c, and details are not described herein again.

In some embodiments, in the photovoltaic power generation system, the photovoltaic power generation system further includes an isolation unit. The isolation unit is also referred to as an AC-to-DC isolation unit, and may be arranged inside the first-stage DC-to-AC unit. An input terminal of the isolation unit is coupled to the internal phase wire at the output terminal of the first-stage DC-to-AC unit. A first output terminal of the isolation unit is coupled to ground, and a second output terminal of the isolation unit is coupled to the positive input terminal and/or the negative input terminal of the first-stage DC-to-AC unit. The isolation unit may alternatively be arranged inside the second-stage DC-to-AC unit. This is specifically similar to the embodiment corresponding to FIG. 13, and details are not described herein again.

In some embodiments, in the photovoltaic power generation system, the photovoltaic array may be a photovoltaic array formed by serially connecting an output terminal of the photovoltaic cell panel to an optimizer or a shutdown device and then connecting in series or in parallel combinations, and a communication signal is coupled to a direct current cable connected to an output terminal of the optimizer or the shutdown device. The DC-to-DC unit and/or the first-stage DC-to-AC unit and/or the second-stage DC-to-AC unit may communicate with the optimizer or the shutdown device by using the communication signal, and control the optimizer or the shutdown device to implement fast shutdown of the optimizer or the shutdown device.

In some embodiments, a communication signal is coupled to a direct current cable between the first-stage DC-to-AC unit, the second-stage DC-to-AC unit, and the DC-to-DC unit. The first-stage DC-to-AC unit and/or the second-stage DC-to-AC unit control/controls the DC-to-DC unit by using the communication signal, to implement fast shutdown of the input terminal of the DC-to-DC unit.

In some embodiments, the photovoltaic power generation system further includes at least one energy storage unit. At least two direct current cables connected to the DC-to-DC unit, the first-stage DC-to-AC unit, and the second-stage DC-to-AC unit are coupled in parallel to the energy storage unit. This is specifically similar to the energy storage unit in Embodiment 5, and details are not described herein again.

In the embodiment that includes the energy storage unit, the energy storage unit may be an energy storage device, or may include a direct current conversion unit and an energy storage device, or may be another apparatus capable of storing energy. This is similar to the description of the energy storage unit in Embodiment 1, and details are not described herein again. A communication signal is coupled to a direct current cable connected between the energy storage unit and the DC-to-DC unit, and the energy storage unit may communicate with the DC-to-DC unit. A communication signal is coupled to a direct current cable connected between the energy storage unit and the DC-to-AC unit, and the energy storage unit may communicate with the DC-to-AC unit. A situation of the communication signal and a principle for implementing communication are similar to the description of the communication signal in Embodiment 1, and details are not described herein again.

Figure 46:
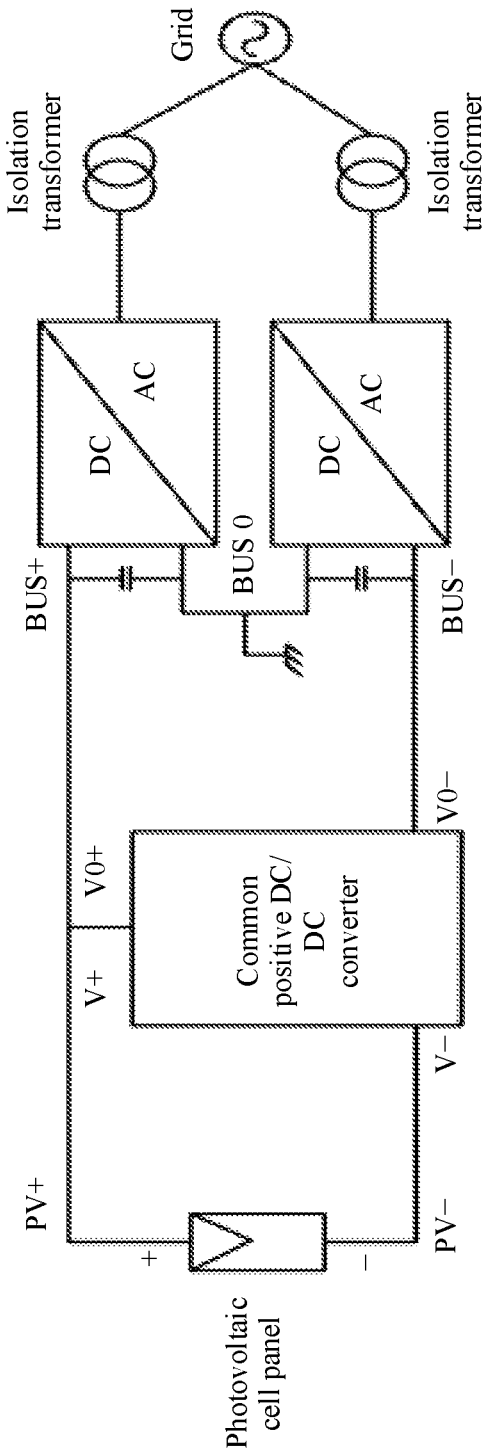
FIG. 46 is a schematic diagram of another embodiment of a photovoltaic power generation system according to an embodiment of this application.

FIG. 46 is a schematic diagram of another embodiment of the photovoltaic power generation system according to an embodiment of this application. The power supply is specifically formed by series-parallel connection of photovoltaic cell panels. The DC-to-DC unit is specifically a common positive DC/DC converter. When the system is connected to a grid for working, a potential of BUS 0 is equal to a potential of the ground. In this case, a potential of PV+ to ground is consistent with a potential of BUS+ to a middle point (a potential of a positive terminal BUS+ of a bus to the middle point BUS 0 of the bus). As long as a voltage of the positive terminal BUS+ of the bus to the middle point BUS 0 of the bus is greater than or equal to a voltage of PV+ to PV−, a voltage to ground of the photovoltaic cell panel is greater than or equal to 0 V, and a PID phenomenon is eliminated. Alternatively, to further stabilize the potential of BUS 0, BUS 0 may be coupled to ground to ensure that the potential of BUS 0 is consistent with the potential of the ground when the system normally works. The DC-to-DC converter is a boost converter. A boost function can implement that the voltage of BUS+ to BUS 0 is greater than or equal to the voltage of PV+ to PV−, and the voltage to ground of the photovoltaic cell panel is greater than or equal to 0 V. In addition, if a BUS 0 point is grounded, sampling of voltages of Vo+ and Vo− to ground is implemented in the DC-to-DC converter; and if the used voltage exceeds a preset value, the DC-to-DC converter stops working. Alternatively, if the BUS 0 point is coupled to the DC-to-DC converter, sampling of voltages of Vo+ and Vo− to the BUS 0 point is implemented; and if the used voltage exceeds a preset value, the DC-to-DC converter stops working.

Figure 47:
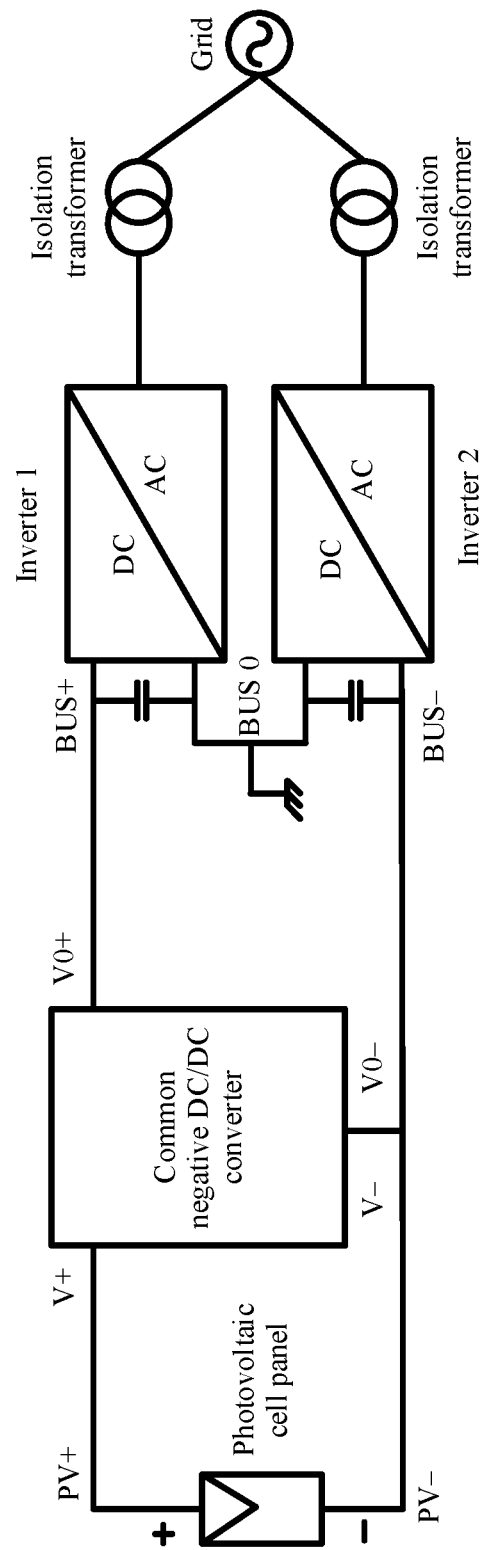
FIG. 47 is a schematic diagram of another embodiment of a photovoltaic power generation system according to an embodiment of this application.

Similarly, to meet the requirement that the voltage to ground of the photovoltaic cell panel needs to be less than 0 V to eliminate a PID phenomenon, the DC-to-DC unit to be used may be a common negative DC-to-DC converter, as shown in FIG. 47. FIG. 47 is a schematic diagram of another embodiment of the photovoltaic power generation system according to an embodiment of this application. When the system is connected to a grid for working, a potential of BUS 0 is equal to a potential of the ground. In this case, a potential to ground of PV− is consistent with a potential of BUS− to a middle point (a potential of a negative terminal BUS− of a bus to the middle point BUS 0 of the bus). As long as an absolute value of a voltage of BUS− to the middle point BUS 0 of the bus is greater than or equal to a voltage of PV+ to PV−, a voltage to ground of the photovoltaic cell panel is less than or equal to 0 V, and a PID phenomenon is eliminated. Alternatively, to further stabilize the potential of BUS 0, BUS 0 may be coupled to ground to ensure that the potential of BUS 0 is consistent with the potential of the ground when the system normally works. The DC-to-DC converter is a boost converter. A boost function can implement that the absolute value of the voltage of BUS− to the middle point BUS 0 of the bus is greater than or equal to the voltage of PV+ to PV−, and the voltage to ground of the photovoltaic cell panel is less than or equal to 0 V. A PID phenomenon is eliminated.

Figure 48A:
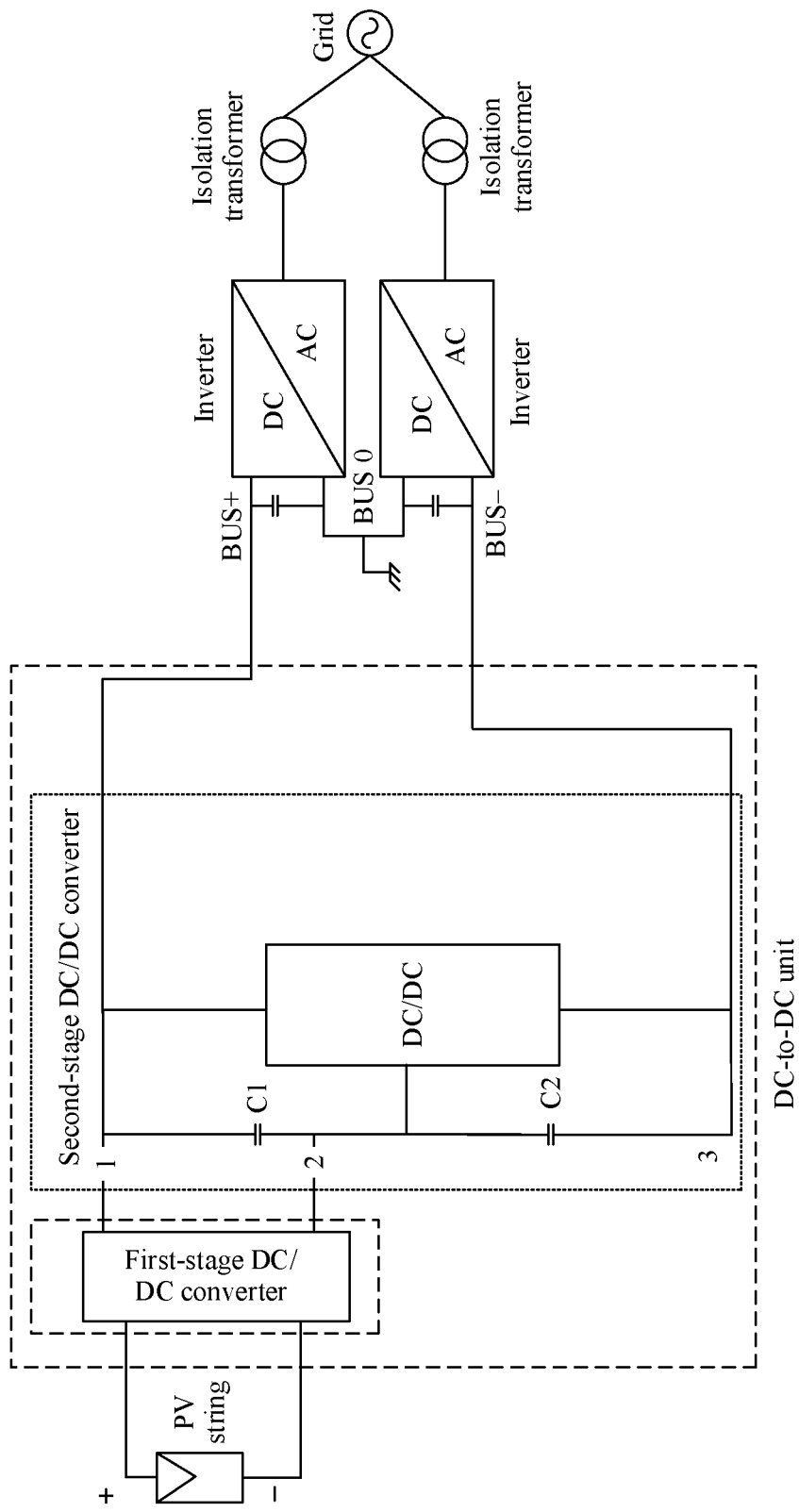
FIG. 48a is a schematic diagram 1 of another embodiment of a photovoltaic power generation system according to an embodiment of this application.

FIG. 48a is a schematic diagram 1 of another embodiment of the photovoltaic power generation system according to an embodiment of this application. The DC-to-DC unit may include a first-stage DC-to-DC converter and a second-stage DC-to-DC converter. The first-stage DC-to-DC converter may implement a boost/buck/buck-boost function. The second-stage DC-to-DC converter transfers a part of energy on C1 to C2 by controlling a DC/DC module inside the second-stage DC-to-DC converter, so that an average voltage of C1 is equal to an average voltage of C2. When the system is connected to a grid for working, a potential of BUS 0 is equal to potentials of the ground and the second node. In this case, a potential of a string PV− is higher than or equal to the potential of the second node, and a voltage to ground of the string PV− is greater than or equal to 0 V. This eliminates a PID phenomenon. Alternatively, to further stabilize the potential of the second node, BUS 0 may be coupled to the second node, or BUS 0 and/or the second node may be coupled to ground, to ensure that the potential of the second node and the potential of the ground are consistent when the system normally works.

Figure 48B:
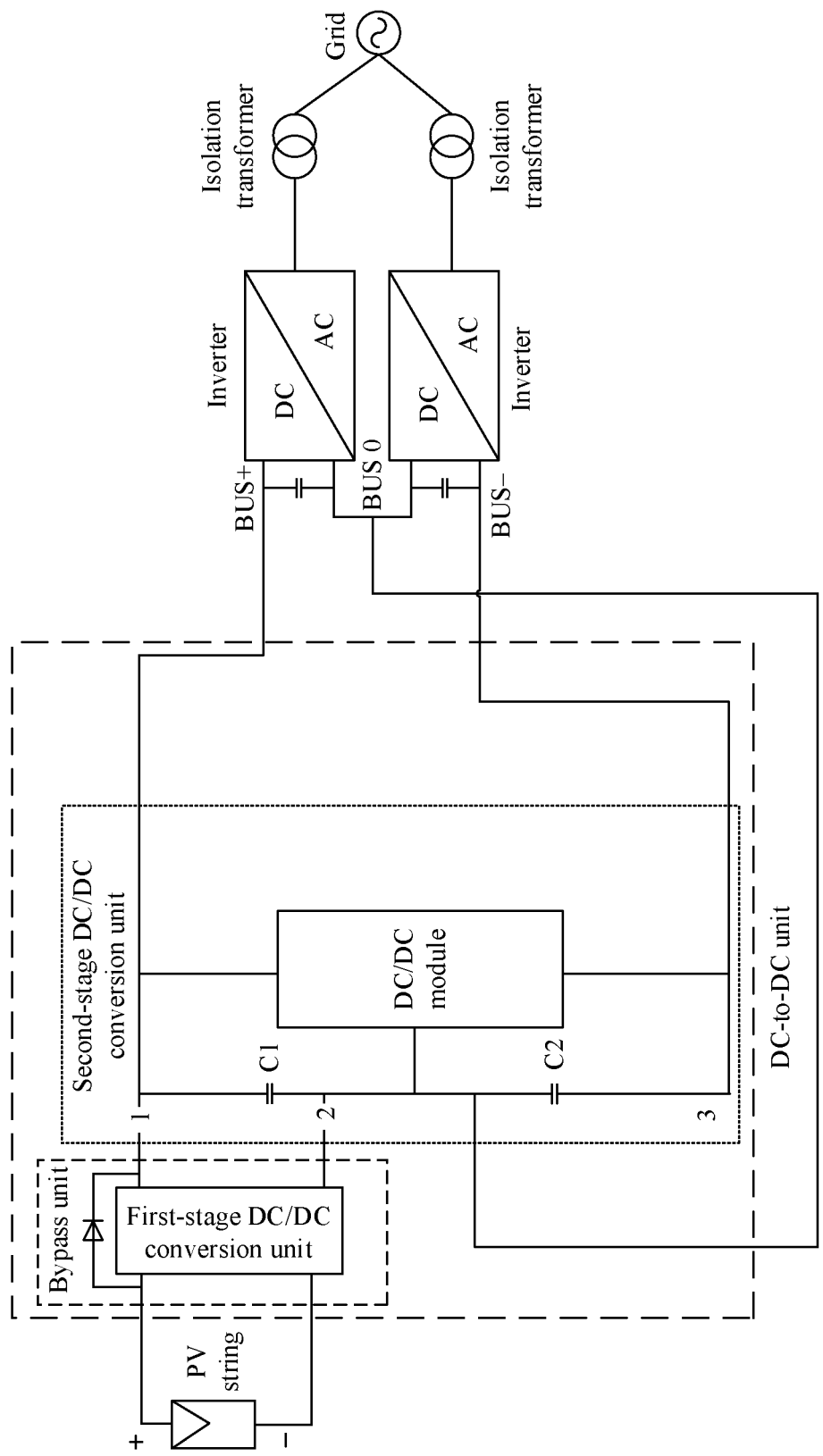
FIG. 48b is a schematic diagram 2 of another embodiment of a photovoltaic power generation system according to an embodiment of this application.
Figure 48C:
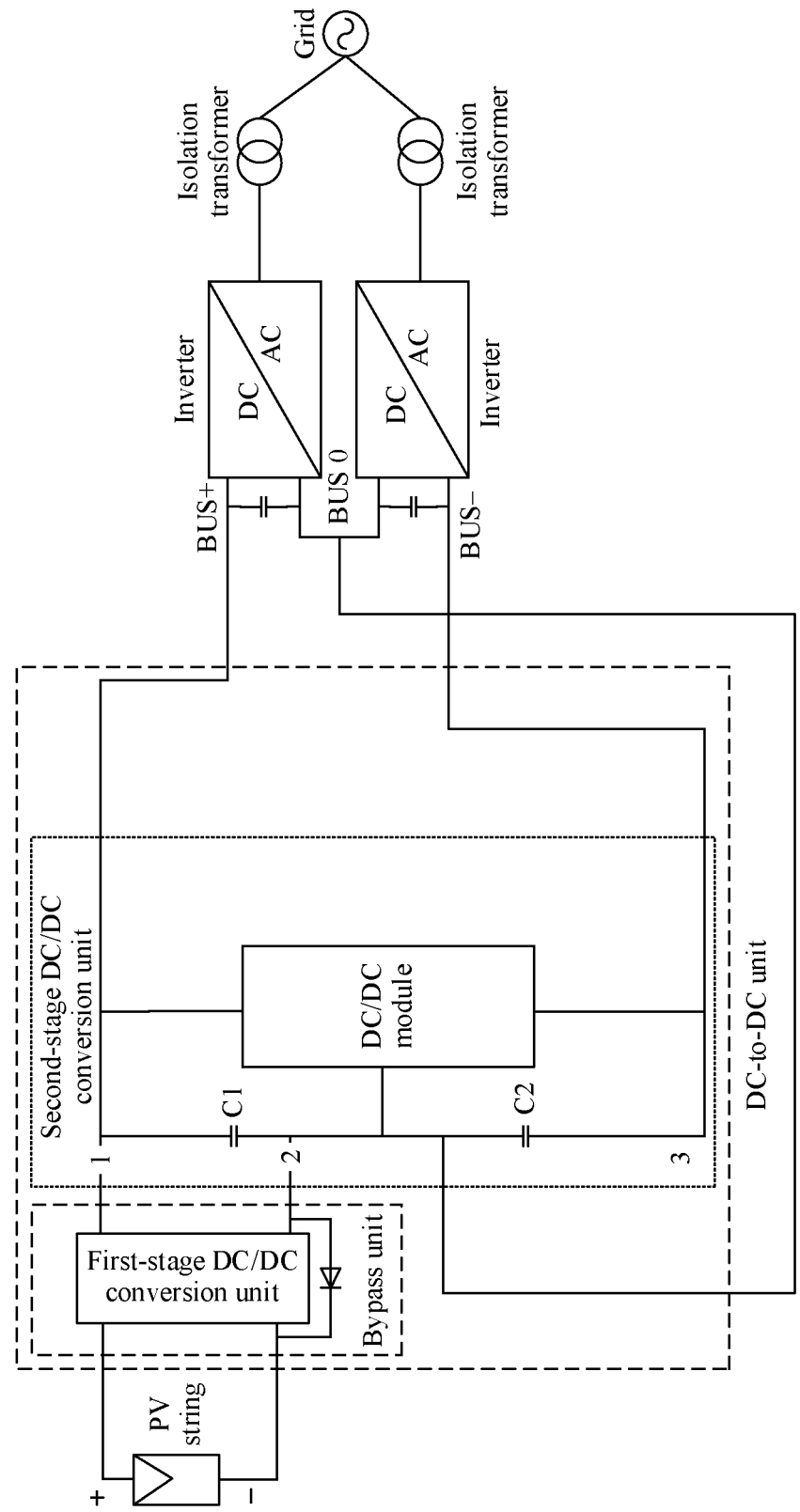
FIG. 48c is a schematic diagram 3 of another embodiment of a photovoltaic power generation system according to an embodiment of this application.

As shown in FIG. 48b and FIG. 48c, if the node 2 and BUS 0 (the second node) are coupled, when an input voltage and/or an input current and/or an input power of the first-stage DC-to-DC unit exceed/exceeds a first preset value, the first-stage DC-to-DC unit works in a bypass mode; and/or when a voltage and/or a power output by the first-stage DC-to-DC unit exceed/exceeds a second preset value, a second-stage DC-to-DC unit stops working (an output of the first-stage DC-to-DC unit directly reaches the DC-to-AC unit); and/or at least one of the first-stage DC-to-AC unit and the second-stage DC-to-AC unit works. In this embodiment of this application, when the input voltage and/or the input power and/or the output voltage and/or the output power of the first-stage DC-to-DC unit are/is excessively high, a proper unit and/or a proper working mode are/is selected. This can ensure normal working of the system in real time or avoid unnecessary waste, and improve conversion efficiency of the entire system.

The foregoing first-stage DC-to-DC unit works in the bypass mode, including two cases, as shown in FIG. 48b and FIG. 48c. FIG. 48b is a schematic diagram 2 of another embodiment of the photovoltaic power generation system according to an embodiment of this application. As shown in FIG. 48b, the first-stage DC-to-DC unit works in the bypass mode, and the bypass mode is that a bypass unit is coupled in parallel between the positive input terminal and the positive output terminal of the first-stage DC-to-DC unit. In this case, a power flows into an input side of the second-stage DC-to-DC unit through the bypass unit, and the first-stage DC-to-DC unit stops working. The bypass unit may be a diode, a switch, a relay, a semiconductor switch tube, or the like. When the bypass unit is the diode, an anode of the diode is coupled to the positive input terminal, and a cathode of the diode is coupled to the positive output terminal. FIG. 48c is a schematic diagram 3 of another embodiment of the photovoltaic power generation system according to an embodiment of this application. As shown in FIG. 48c, the bypass mode is that a bypass unit is coupled in parallel between a negative input terminal and a negative output terminal of the first-stage DC-to-DC unit. In this case, a power flows into an input side of the second-stage DC-to-DC unit through the bypass unit, and the first-stage DC-to- DC unit stops working. The bypass unit may be a diode, a switch, a relay, a semiconductor switch tube, or the like. When the bypass unit is the diode, an anode of the diode is coupled to the negative output terminal, and a cathode of the diode is coupled to the negative input terminal.

In some embodiments, in the examples shown in FIG. 48a, FIG. 48b, and FIG. 48c, there are a plurality of first-stage DC-to-DC units, and output terminals of the plurality of first-stage DC-to-DC units are coupled in parallel, and then coupled to the second-stage DC-to-DC unit.

Figure 49:
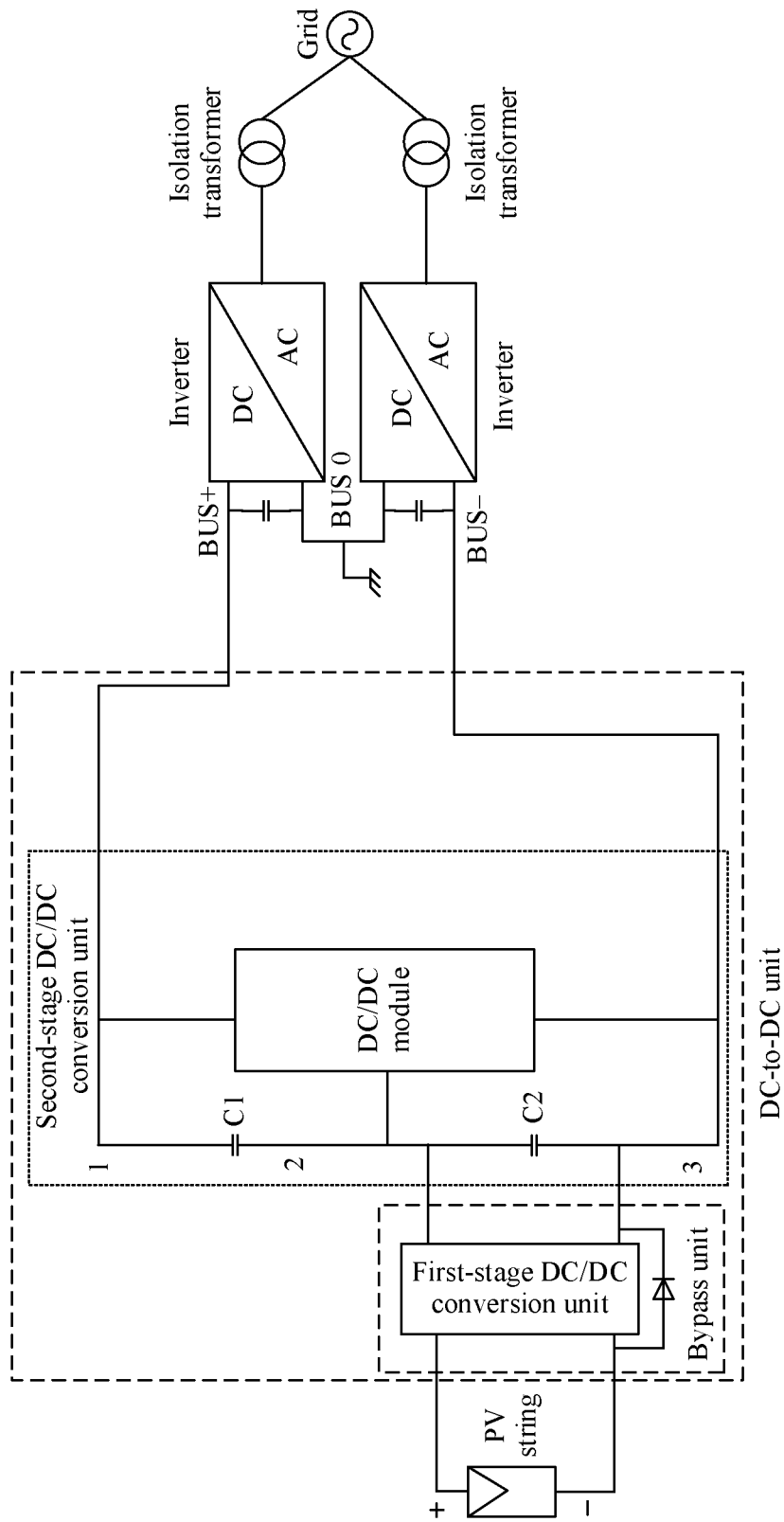
FIG. 49 is a schematic diagram of another embodiment of a photovoltaic power generation system according to an embodiment of this application.

Similarly, to meet a requirement that a PID phenomenon can be eliminated only when the voltage to ground of the photovoltaic cell panel is less than 0 V, the DC-to-DC unit shown in FIG. 49 may be used. FIG. 49 is a schematic diagram of another embodiment of the photovoltaic power generation system according to an embodiment of this application. A principle of the photovoltaic power generation system is similar to that in FIG. 48a, FIG. 48b, and FIG. 48c, and details are not described herein again.

Embodiment 7

Figure 50:
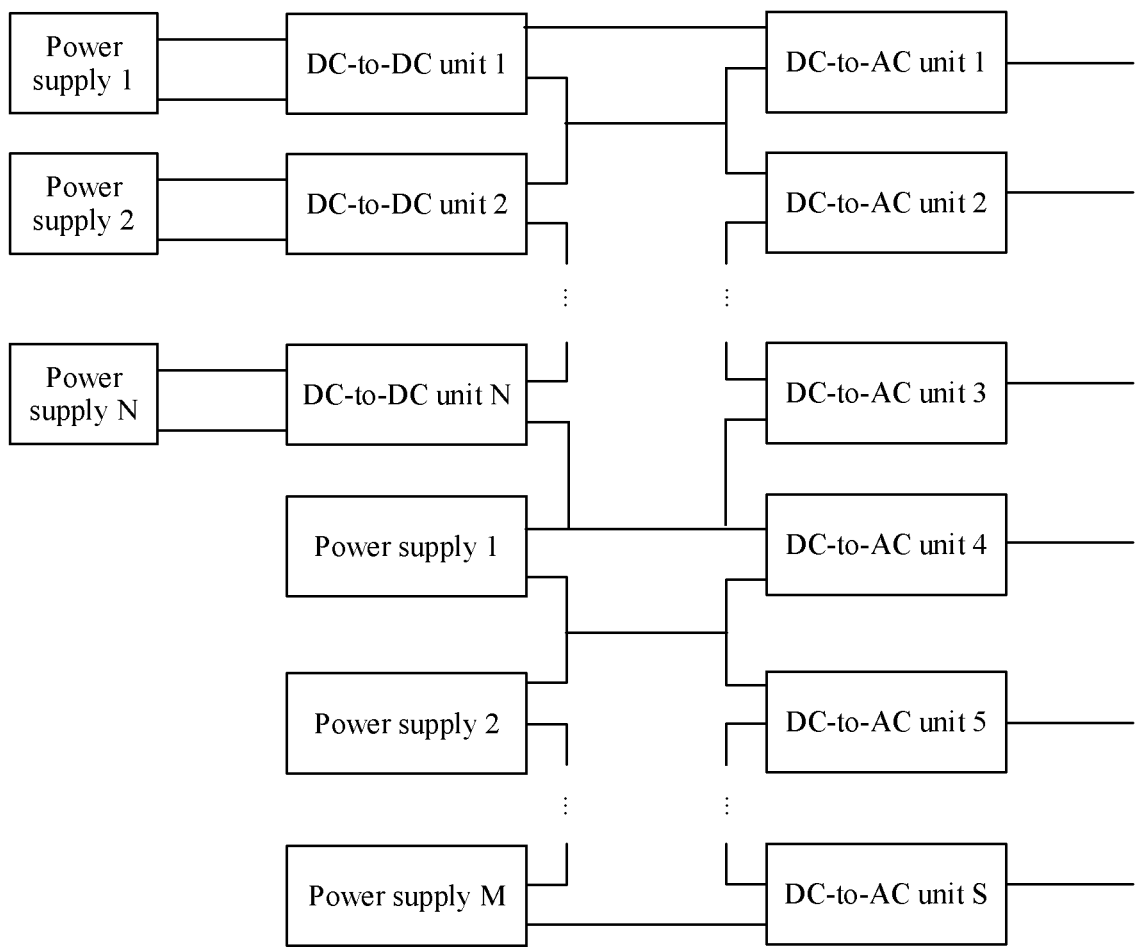
FIG. 50 is a schematic diagram of an embodiment of a power system according to an embodiment of this application.

FIG. 50 is a schematic diagram of an embodiment of a power system according to an embodiment of this application. The power system includes N first power supplies, M second power supplies, N DC-to-DC units, and S DC-to-AC units. An output terminal of the first power supply is coupled to an input terminal of the DC-to-DC unit. A positive terminal formed by serially connecting output terminals of the N DC-to-DC units and output terminals of the M second power supplies is coupled to a positive terminal formed by serially connecting input terminals of the S DC-to-AC units. A negative terminal formed by serially connecting output terminals of the N DC-to-DC units and output terminals of the M second power supplies is coupled to a negative terminal formed by serially connecting input terminals of the S DC-to-AC units. The output terminals of the N DC-to-DC units and the output terminals of the M second power supplies are coupled in series, and series coupling points form a first node. The input terminals of the S DC-to-AC units are coupled in series, and series coupling points form a second node. At least one first node and at least one second node are coupled by using at least one cable. An output terminal of the DC-to-AC unit is isolated.

In this embodiment of this application, the positive terminal formed by serially connecting the output terminals of the N DC-to-DC units and the output terminals of the M second power supplies is a port that does not participate in series connection, and may be a positive terminal of the DC-to-DC unit or a positive terminal of the second power supply. The negative terminal formed by serially connecting the output terminals of the N DC-to-DC units and the output terminals of the M second power supplies is another port that does not participate in series connection, and may be a negative terminal of the DC-to-DC unit or a negative terminal of the second power supply. The first node formed by serially connecting the output terminals of the N DC-to-DC units and the output terminals of the M second power supplies is a coupling node formed through series coupling, and may be a coupling node formed by serially connecting the DC-to-DC units, a coupling node formed by serially connecting the second power supplies, or a coupling node formed by serially connecting the DC-to-DC units and the second power supplies.

In this embodiment of this application, the positive terminal formed by serially connecting the input terminals of the S DC-to-AC units may be an input port that does not participate in series connection. For example, FIG. 50 shows a positive input terminal of a DC-to-AC unit 1. The negative terminal formed by serially connecting the input terminals of the S DC-to-AC units may be an input port that does not participate in series connection. For example, FIG. 50 shows a negative input terminal of a DC-to-AC unit S. The second node formed by serially connecting the input terminals of the S DC-to-AC units is a coupling node formed through series connection. In FIG. 50, a node formed by coupling input terminals of the DC-to-AC unit 1 and the DC-to-AC unit 2 is a second node, a node formed by coupling input terminals of a DC-to-AC unit 3 and a DC-to-AC unit 4 is also a second node, and in addition, there are other second nodes, which are not enumerated herein.

In this embodiment of this application, the first power supply and the second power supply may be a photovoltaic array, energy storage power supplies, wind power generation direct current sources, or the like, which are similar to the power supplies in Embodiment 3. Details are not described herein again. The DC-to-DC unit may be an apparatus that can convert a direct current into a direct current, for example, a DC/DC converter. The DC-to-DC unit is similar to the DC-to-DC unit in Embodiment 3, and details are not described herein again. The DC-to-AC unit may be an apparatus that can convert a direct current into an alternating current, for example, an inverter. The DC-to-AC unit is similar to the DC-to-AC unit in Embodiment 3, and details are not described herein again.

In this embodiment of this application, the output terminal of the second power supply is cascaded, the output terminal of the DC-to-DC unit is cascaded, and the input terminal of the DC-to-AC unit is cascaded, to increase an output voltage, reduce a current between the DC-to-DC unit and the DC-to-AC unit, and resolve cost and loss problems of a cable from the DC-to-DC unit to the DC-to-AC unit. When the DC-to-DC unit is connected to a plurality of power supplies, the output voltage may be increased, to reduce the current between the DC-to-DC unit and the DC-to-AC unit, and resolve cost and loss problems of the cable from the DC-to-DC unit to the DC-to-AC unit.

In this embodiment of this application, at least one first node and at least one second node are coupled. For example, in some embodiments, one first node is coupled to one second node, and another first node is not coupled to another second node. In some other embodiments, two first nodes are respectively coupled to two second nodes, and another first node is not coupled to another second node. In some other embodiments, a quantity of first nodes is equal to a quantity of second nodes, and each first node is coupled to a corresponding second node. In some other embodiments, a quantity of first nodes is different from a quantity of second nodes, each first node is coupled to a corresponding second node, and a remaining first node or a remaining second node is not coupled. In actual application, another coupling manner may alternatively be used. This is not limited in this embodiment of this application. In this embodiment of this application, a quantity of cables connected between the second power supply, the DC-to-DC unit, and the DC-to-AC unit is reduced in a manner of the first node and the second node, to reduce costs of the power system.

In this embodiment of this application, outputs of output terminals of DC-to-AC units are isolated. This is similar to the descriptions in Embodiments 1, 3, and 5, and details are not described herein again.

In some embodiments, at least two groups of corresponding first nodes are connected in parallel, and at least two groups of corresponding second nodes are connected in parallel. At least one parallel-connected first node is coupled to at least one parallel-connected second node. At least one parallel-connected third node is connected in parallel to at least one parallel-connected second node. It may be understood that when there are a plurality of groups of first power supplies, a plurality of groups of second power supplies, a plurality of groups of DC-to-DC units, and a plurality of groups of DC-to-AC units, the foregoing connection manner may be used.

In some embodiments, outputs of same-type output terminals of a plurality of groups of DC-to-AC units are connected in parallel, or isolated. This is similar to the description in Embodiment 3, and details are not described herein again.

In some embodiments, a communication signal is coupled to a direct current cable connected between any two of the first power supply, the second power supply, the DC-to-DC unit, and the DC-to-AC unit, so that any two of the first power supply, the second power supply, the DC-to-DC unit, and the DC-to-AC unit may communicate by using the communication signal. Preferably, the communication signal may be a PLC signal. This is similar to the description in Embodiment 3, and details are not described herein again.

In some embodiments, the power supply is a photovoltaic array formed by connecting an output of a photovoltaic cell panel to an optimizer or a shutdown device, and then connecting in series or in parallel combinations. When a communication signal is coupled to the direct current cable connected between the power supply, the DC-to-DC unit, and the DC-to-AC unit, the communication signal also passes through the optimizer or the shutdown device, and the power supply, the DC-to-DC unit, or the DC-to-AC unit may control, by using the communication signal, shutdown of the optimizer or the shutdown device, to implement fast shutdown. That is, the power supply, the DC-to-DC unit, or the DC-to-AC unit may send a communication signal that carries a shutdown instruction to the optimizer or the shutdown device. After receiving the communication signal that carries the shutdown instruction, the optimizer or the shutdown device executes the shutdown instruction, to implement fast shutdown. A situation of the communication signal is similar to the description of the communication signal in Embodiment 1, and details are not described herein again.

In some embodiments, a communication signal is coupled to a direct current cable connected between the DC-to-DC unit and the DC-to-AC unit, and the DC-to-AC unit may control the DC-to-DC unit by using the communication signal, to implement fast shutdown of an input of the DC-to-DC unit. For example, the DC-to-AC unit sends a communication signal that carries a shutdown instruction, and the communication signal reaches the DC-to-DC unit through the corresponding direct current cable, so that the DC-to-DC unit executes the shutdown instruction after receiving the communication signal, thereby implementing fast shutdown of the input of the DC-to-DC unit.

In some embodiments, the power system further includes at least one energy storage unit. The energy storage unit is coupled in parallel to at least two direct current cables connected between the second power supply, the DC-to-DC unit, and the DC-to-AC unit. The direct current cables may be direct current cables for coupling the first node and the second node. For example, the energy storage unit is coupled in parallel between a direct current cable for coupling a positive output terminal of a DC-to-DC unit 1 and the positive input terminal of the DC-to-AC unit 1 and a direct current cable for coupling a negative output terminal of a DC-to-DC unit 2 and a negative input terminal of the DC-to-AC unit 2. Alternatively, the energy storage unit is coupled in parallel among three direct current cables for coupling the first node and the second node. It may be understood that a quantity of energy storage units included in one power system is not limited, that is, a plurality of energy storage units may be coupled in parallel at the same time. This is not limited in this embodiment of this application.

In the embodiment that includes the energy storage unit, the energy storage unit may be an energy storage device, or may include a direct current conversion unit and an energy storage device, or may be another apparatus capable of storing energy. This is similar to the description of the energy storage unit in Embodiment 1, and details are not described herein again. A communication signal is coupled to a direct current cable connected between the energy storage unit and the DC-to-DC unit, and the energy storage unit may communicate with the DC-to-DC unit. A communication signal is coupled to a direct current cable connected between the energy storage unit and the DC-to-AC unit, and the energy storage unit may communicate with the DC-to-AC unit. A situation of the communication signal and a principle for implementing communication are similar to the description of the communication signal in Embodiment 1, and details are not described herein again.

Embodiment 8

Figure 51A:
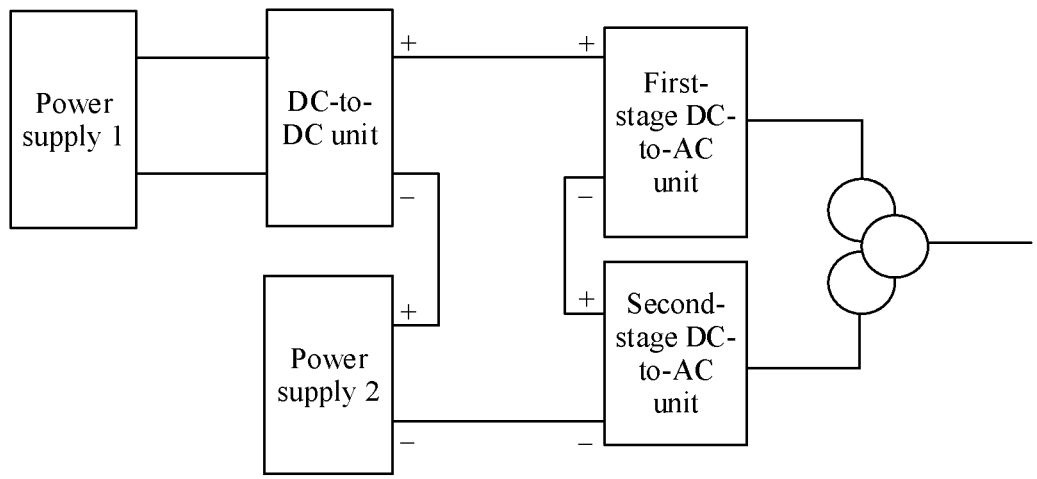
FIG. 51a is a schematic diagram 1 of a power system according to an embodiment of this application.
Figure 51B:
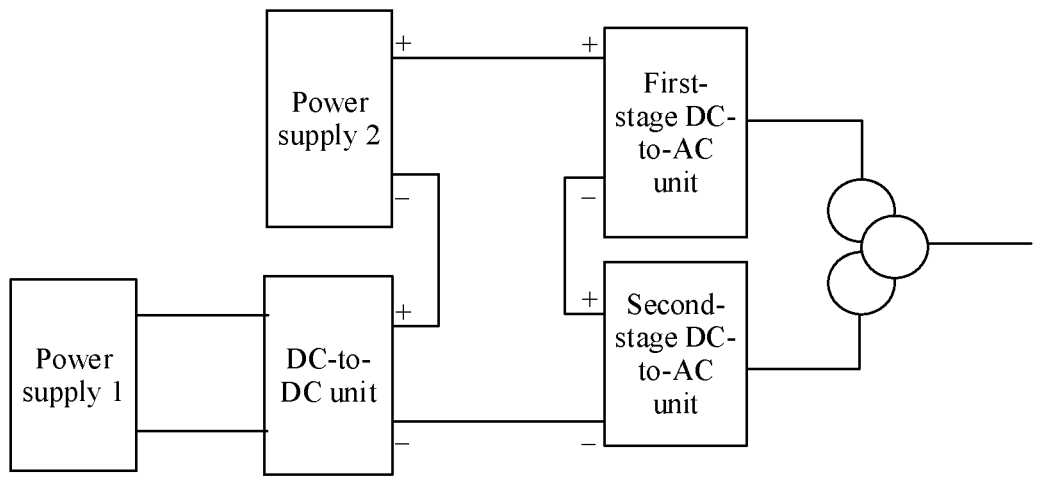
FIG. 51b is a schematic diagram 2 of a power system according to an embodiment of this application.

FIG. 51a is a schematic diagram 1 of a power system according to an embodiment of this application. FIG. 51b is a schematic diagram 2 of a power system according to an embodiment of this application. The power system includes a power supply 1, a power supply 2, a DC-to-DC unit, a first-stage DC-to-AC unit, and a second-stage DC-to-AC unit. An output terminal of the power supply 1 is coupled to an input terminal of the DC-to-DC unit. The DC-to-DC unit is coupled in series to an output terminal of the power supply 2, and a coupling point is a first node. A negative input terminal of the first-stage DC-to-AC unit is coupled to a positive input terminal of the second-stage DC-to-AC unit, and a coupling point is a second node. A positive output terminal formed after the DC-to-DC unit is coupled in series to the output terminal of the second power supply is a first port (for example, a positive output terminal of the DC-to-DC unit in FIG. 51a or a positive output terminal of the power supply 2 in FIG. 51b), and the first port is coupled to a positive input terminal of the first-stage DC-to-AC unit. A negative output terminal formed after the DC-to-DC unit is coupled in series to the output terminal of the second power supply is a second port (for example, a negative output terminal of the power supply 2 in FIG. 51a or a negative output terminal of the DC-to-DC unit in FIG. 51b), and the second port is coupled to a negative input terminal of the second-stage DC-to-AC unit. Outputs of output terminals of the first-stage DC-to-AC unit and the second-stage DC-to-AC unit are isolated.

Specifically, in a possible case, as shown in FIG. 51a, the positive output terminal of the DC-to-DC unit is coupled to the positive input terminal of the first-stage DC-to-AC unit, the negative output terminal of the DC-to-DC unit is coupled to the positive output terminal of the power supply 2 to form the first node, the negative output terminal of the power supply 2 is coupled to the negative input terminal of the second-stage DC-to-AC unit, and the negative input terminal of the first-stage DC-to-AC unit is coupled to the positive input terminal of the second-stage DC-to-AC unit to form the second node. In another possible case, as shown in FIG.

51*b*, the output terminal of the power supply 1 is coupled to the input terminal of the DC-to-DC unit, the negative output terminal of the DC-to-DC unit is coupled to the negative input terminal of the second-stage DC-to-AC unit, the positive output terminal of the DC-to-DC unit is coupled to the negative output terminal of the power supply 2, the positive output terminal of the power supply 2 is coupled to the negative input terminal of the first-stage DC-to-AC unit, and the negative input terminal of the first-stage DC-to-AC unit is coupled to the positive input terminal of the second-stage DC-to-AC unit. The following embodiment describes the case in FIG. 51*a*. The same rule is applied to the case in FIG. 51*b*, and details are not described again.

In this embodiment of this application, a cascading manner is used to increase an output voltage, to reduce a current between the power supply 2, the DC-to-DC unit, and the DC-to-AC unit, and resolve cost and loss problems of a cable from the DC-to-DC unit to the DC-to-AC unit.

Figure 52:
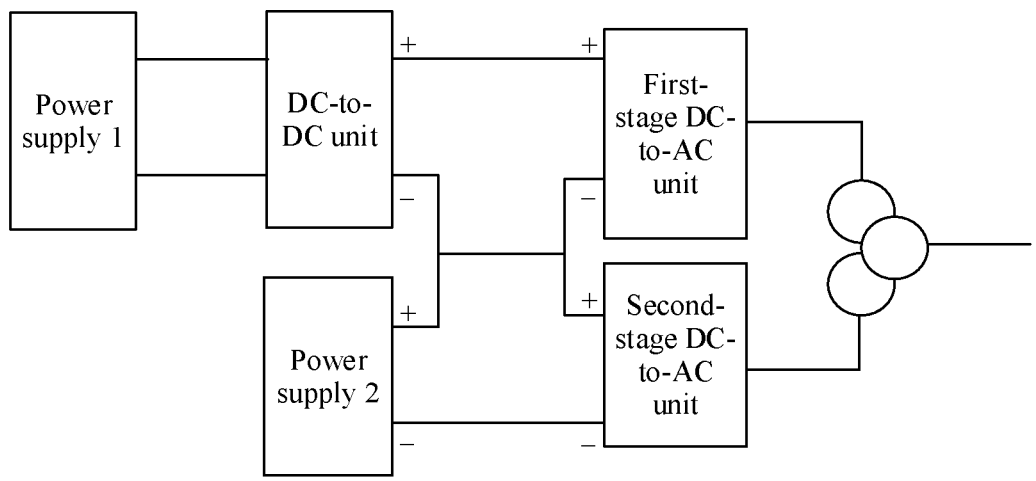
FIG. 52 is a schematic diagram of an embodiment of a power system according to an embodiment of this application.

FIG. 52 is a schematic diagram of an embodiment of the power system according to an embodiment of this application. In some embodiments, the first node is coupled to the second node, and four output ports of the DC-to-DC unit and the power supply 2 may be cascaded to the DC-to-AC unit by using three cables, thereby reducing a quantity of cables and reducing costs. In addition, if a current value of a cable between the first node and the second node is less than current values of the other two cables, a cable with a low wire diameter specification may be used between the first node and the second node, thereby further reducing cable costs. This is similar to the description of FIG. 19 in Embodiment 4, and details are not described herein again.

In some embodiments, the first port is coupled to the positive input terminal of the first-stage DC-to-AC unit by using a first conducting wire. The second port is coupled to the negative input terminal of the second-stage DC-to-AC unit by using a second conducting wire. The first node and the second node are coupled by using a third conducting wire. The first conducting wire, the second conducting wire, and the third conducting wire form a distributed double (DC) bus. The first conducting wire and the second conducting wire form a positive bus. The second conducting wire and the third conducting wire form a negative bus. The third conducting wire is a neutral wire (Middle Cable) of the distributed double bus. The first conducting wire, the second conducting wire, and the third conducting wire are direct current conducting wires. In a 3D technology (three direct-Cable), a direct current bus is constructed by using three cables, a positive bus is constructed by using the first conducting wire and the second conducting wire, and a negative bus is constructed by using the second conducting wire and the third conducting wire.

In some embodiments, both the first node and the second node are coupled to ground. In this embodiment of this application, both the first node and the second node are coupled to ground, so that when output powers or output voltages of the DC-to-DC unit and the power supply 2 are asymmetric, or input powers or input voltages of the first-stage DC-to-AC unit and the second DC-to-AC unit are asymmetric, a current loop is provided to achieve voltage equalization, thereby ensuring normal operation of the system. In addition, no cable connection is required between the first node and the second node, and therefore costs of one cable and construction costs can be reduced.

In some embodiments, the first node is coupled to the second node. When an input voltage and/or an input current and/or an input power of the DC-to-DC unit are/is less than a preset value, or an output voltage and/or an output current and/or an output power of the second power supply are/is less than a preset value, the corresponding DC-to-DC unit or the second power supply stops working. For example, when the input voltage of the DC-to-DC unit is less than the preset value, the DC-to-DC unit stops working. In another example, when the output voltage of the second power supply is less than the preset value, the second power supply stops working. At least one of the first-stage DC-to-AC unit and the second-stage DC-to-AC unit works. In this embodiment of this application, when the input voltage and/or the input current and/or the input power of the DC-to-DC unit are/is excessively low, or the output voltage and/or the output current and/or the output power of the second power supply are/is excessively low, the corresponding DC-to-DC unit or the second power supply stops working, and an appropriate unit is selected to work. This can avoid unnecessary waste and improve conversion efficiency and utilization of the entire system.

When the first node and the second node are not coupled, the voltage may be adjusted by using an equalization circuit unit.

Figure 53:
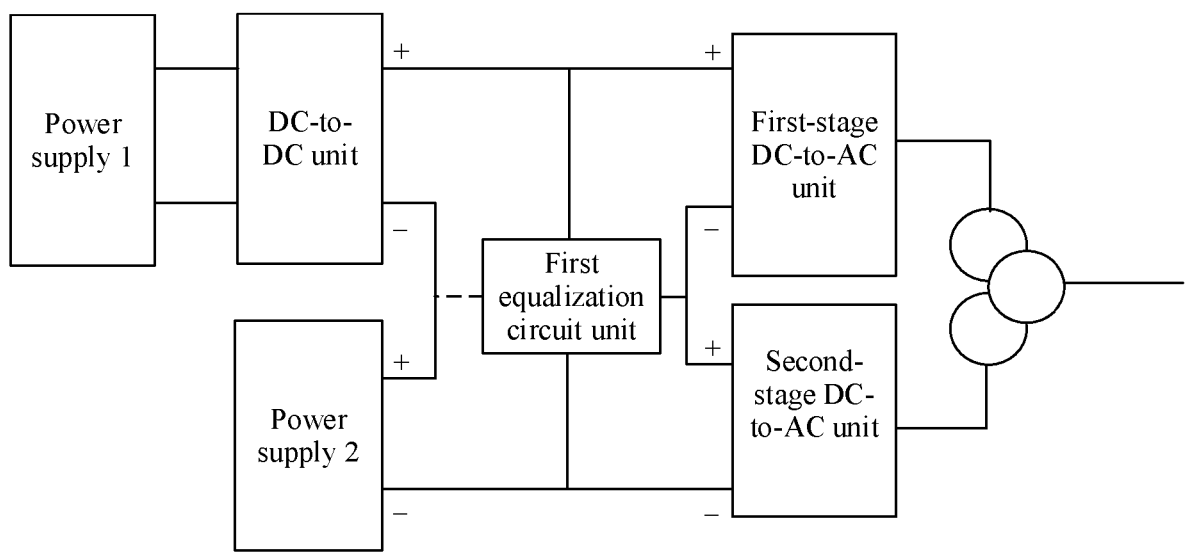
FIG. 53 is a schematic diagram of a power system that includes a first equalization circuit unit according to an embodiment of this application.

FIG. 53 is a schematic diagram of the power system that includes a first equalization circuit unit according to an embodiment of this application. In some embodiments, the power system further includes the first equalization circuit unit. The first equalization circuit unit is configured with a first interface, a second interface, and a third interface. The first interface is coupled to the second node. The second interface is coupled to the positive input terminal of the first-stage DC-to-AC unit. The third interface is coupled to the negative input terminal of the second-stage DC-to-AC unit. In some embodiments, the first equalization circuit unit is further configured with a fourth interface. The fourth interface is coupled to the first node. This is similar to the embodiment corresponding to FIG. 21*b*, and details are not described herein again.

Figure 54:
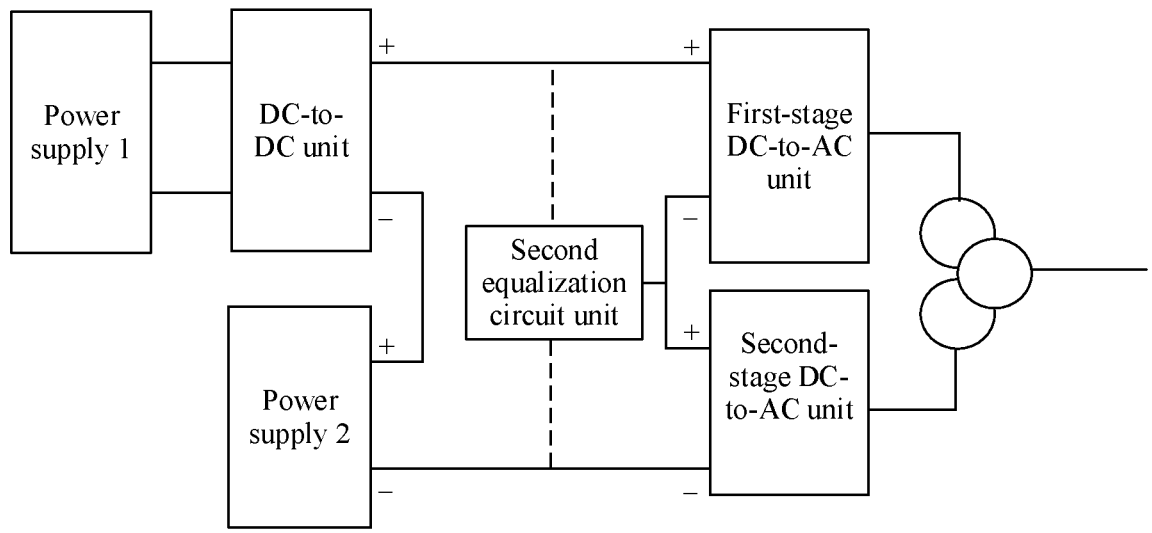
FIG. 54 is a schematic diagram of a power system that includes a second equalization circuit unit according to an embodiment of this application.

FIG. 54 is a schematic diagram of the power system that includes a second equalization circuit unit according to an embodiment of this application. In some embodiments, the power system includes the second equalization circuit unit. The second equalization circuit unit is configured with a fifth interface and a sixth interface. The fifth interface is coupled to the second node. The sixth interface is coupled to the positive input terminal of the first-stage DC-to-AC unit or the negative input terminal of the second-stage DC-to-AC unit. This is similar to the embodiments corresponding to FIG. 22*a* and FIG. 22*b*, and details are not described herein again.

Figure 55:
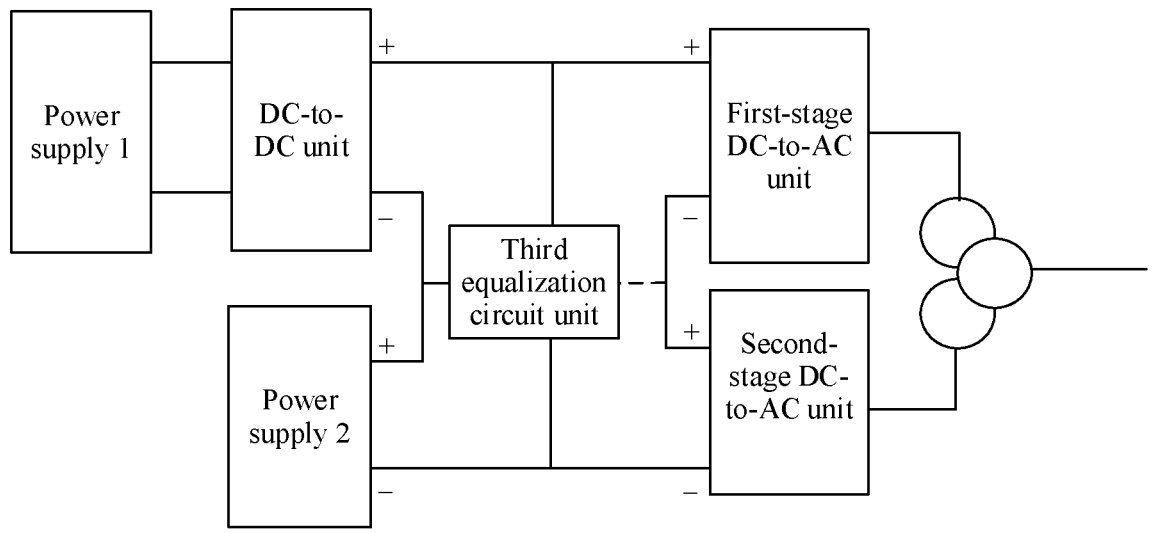
FIG. 55 is a schematic diagram of a power system that includes a third equalization circuit unit according to an embodiment of this application.

FIG. 55 is a schematic diagram of the power system that includes a third equalization circuit unit according to an embodiment of this application. In some embodiments, the power system includes the third equalization circuit unit. The third equalization circuit unit is configured with a seventh interface, an eighth interface, and a ninth interface. The seventh interface is coupled to the first node. The eighth interface is coupled to the positive output terminal of the DC-to-DC unit. The ninth interface is coupled to the negative output terminal of the power supply 2. In some embodiments, the third equalization circuit unit is further configured with a tenth interface. The tenth interface is coupled to the second node. This is similar to the embodiment corresponding to FIG. 23, and details are not described herein again.

Figure 56:
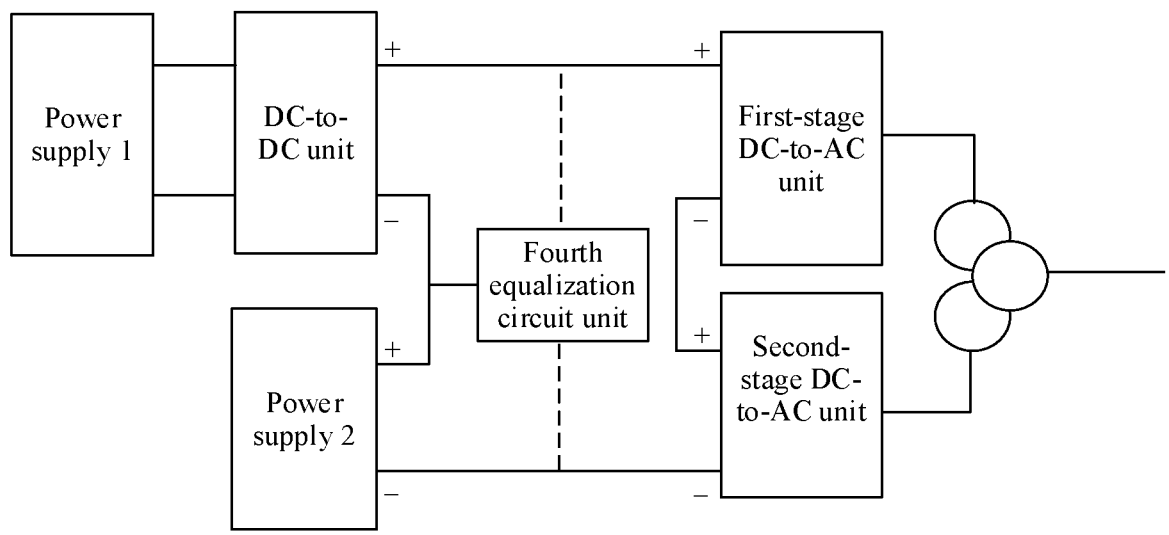
FIG. 56 is a schematic diagram of a power system that includes a fourth equalization circuit unit according to an embodiment of this application.

FIG. 56 is a schematic diagram of the power system that includes a fourth equalization circuit unit according to an embodiment of this application. In some embodiments, the power system includes the fourth equalization circuit unit.

The fourth equalization circuit unit is configured with an eleventh interface and a twelfth interface. The eleventh interface is coupled to the first node. The twelfth interface is coupled to the positive output terminal of the DC-to-DC unit or the negative output terminal of the power supply 2. This is similar to the embodiments corresponding to FIG. 24a and FIG. 24b, and details are not described herein again.

In some embodiments, the output terminals of the first-stage DC-to-AC unit and the second-stage DC-to-AC unit are respectively coupled to different transformers. Alternatively, the output terminals of the first-stage DC-to-AC unit and the second-stage DC-to-AC unit are respectively coupled to different windings of a same transformer, to implement isolated output.

In some embodiments, the power system specifically includes at least one pair of power supplies, at least one DC-to-DC unit, and at least one pair of DC-to-AC conversion units. One pair of power supplies includes a power supply 1 and a power supply 2. A pair of DC-to-AC conversion units includes a first-stage DC-to-AC unit and a second-stage DC-to-AC unit. When at least one pair of power supplies, at least one DC-to-DC unit, and at least one pair of DC-to-AC conversion units are coupled, each DC-to-DC unit is coupled to at least one power supply 1. Each pair of DC-to-AC conversion units is coupled to at least one DC-to-DC unit or coupled to the power supply 2. Alternatively, same-type input terminals of each pair of DC-to-AC conversion units are coupled in parallel, and then are coupled to one DC-to-DC unit or one power supply 2. It may be understood that, outputs of same-type output terminals of a plurality of combinations of DC-to-AC units may be coupled in parallel, or may be isolated. This is similar to the description in Embodiment 2, and details are not described herein again.

In some embodiments, an IMD is coupled between an output terminal of the first-stage DC-to-AC unit and a ground point. In some other embodiments, an IMD is coupled between an output terminal of the second-stage DC-to-AC unit and a ground point. In some other embodiments, a first IMD is coupled between an output terminal of the first-stage DC-to-AC unit and a ground point, and a second IMD is coupled between an output terminal of the second-stage DC-to-AC unit and a ground point. The IMD can detect insulation impedance to ground of the power system. When the insulation impedance to ground is less than a preset value, preferably, in this embodiment of this application, a coupling connection between the first-stage DC-to-AC unit and/or the second-stage DC-to-AC unit and a transformer winding may be broken, so that the entire system stops working, thereby further ensuring safety of system operation.

In this embodiment of this application, a communication signal is coupled to a direct current cable connected between the power supply 1, the power supply 2, the DC-to-DC unit, the first-stage DC-to-AC unit, and the second-stage DC-to-AC unit, to implement communication between the power supply 1, the power supply 2, the DC-to-DC unit, the first-stage DC-to-AC unit, and the second-stage DC-to-AC unit. The communication signal is preferably a PLC signal, which is similar to the description of the communication signal in the foregoing embodiment, and details are not described herein again.

In this embodiment of this application, a communication signal is coupled to an alternating current cable connected to an output terminal of the first-stage DC-to-AC unit, and the alternating current cable may be further coupled to another device. The first-stage DC-to-AC unit may communicate with another device on the alternating current cable by using the communication signal. When a plurality of combinations of DC-to-AC units are connected in parallel, and outputs of a plurality of first-stage DC-to-AC units are connected in parallel, the parallel-connected output terminals of the plurality of first-stage DC-to-AC units may communicate, by using a communication signal on a connected alternating current cable, with another device coupled to the alternating current cable. The another device described above may be an alternating current device that uses an alternating current. Similarly, a communication situation of the output terminal of the second-stage DC-to-AC unit is similar to that of the first-stage DC-to-AC unit, and details are not described herein again. The communication signal is preferably a PLC signal, which is similar to the description of the communication signal in the foregoing embodiment, and details are not described herein again.

In some embodiments, the power system provided in this embodiment of this application may be further configured with a leakage current sensor. The leakage current sensor may be arranged at an output terminal of the power supply 1, an output terminal of the power supply 2, an input terminal and an output terminal of the DC-to-DC unit, an input terminal and an output terminal of the first-stage DC-to-AC unit, and an input terminal and an output terminal of the second-stage DC-to-AC unit. This is similar to the embodiments corresponding to FIG. 11 and FIG. 27, and details are not described herein again.

In some embodiments, at least one switch is connected in series to an internal output phase wire connected to the output terminal of the first-stage DC-to-AC unit, to implement fast shutdown of an output of the first-stage DC-to-AC unit. The switch may be a relay, a circuit breaker, or a contactor, or may be another type of switch. This is not limited in this embodiment of this application. Similarly, a switch may also be connected in series to an internal output phase wire connected to the output terminal of the second-stage DC-to-AC unit. This is similar to the case in which a switch is connected in series to the output phase wire of the first-stage DC-to-AC unit. Details are not described herein again.

In this embodiment of this application, when the power supply 1 and the power supply 2 are a photovoltaic array, the power system may be referred to as a photovoltaic power generation system. In this embodiment of this application, the power supply 1 may be referred to as a first photovoltaic array, and the power supply 2 may be referred to as a second photovoltaic array. In actual application, another name may be used. This is not limited in this embodiment of this application. For another type of power system, for example, a wind power generation system, an energy storage system, or a hybrid power generation system, refer to the photovoltaic power generation system for implementation. Details are not described for another type of power system in this embodiment of this application. The following describes the photovoltaic power generation system in detail.

In the photovoltaic power generation system, only one of the first node and the second node needs to be coupled to ground, that is, the first node is coupled to ground or the second node is coupled to ground. In some embodiments, both the first node and the second node may alternatively be coupled to ground. The first node and/or the second node are/is coupled to ground, so that when the output powers or output voltages of the first-stage DC-to-DC unit and the second DC-to-DC unit are asymmetric, or the input powers or input voltages of the first-stage DC-to-AC unit and the second DC-to-AC unit are asymmetric, a current loop can be provided to achieve voltage equalization, thereby ensuring normal operation of the system, and reducing costs of one cable and construction costs.

Figure 57:
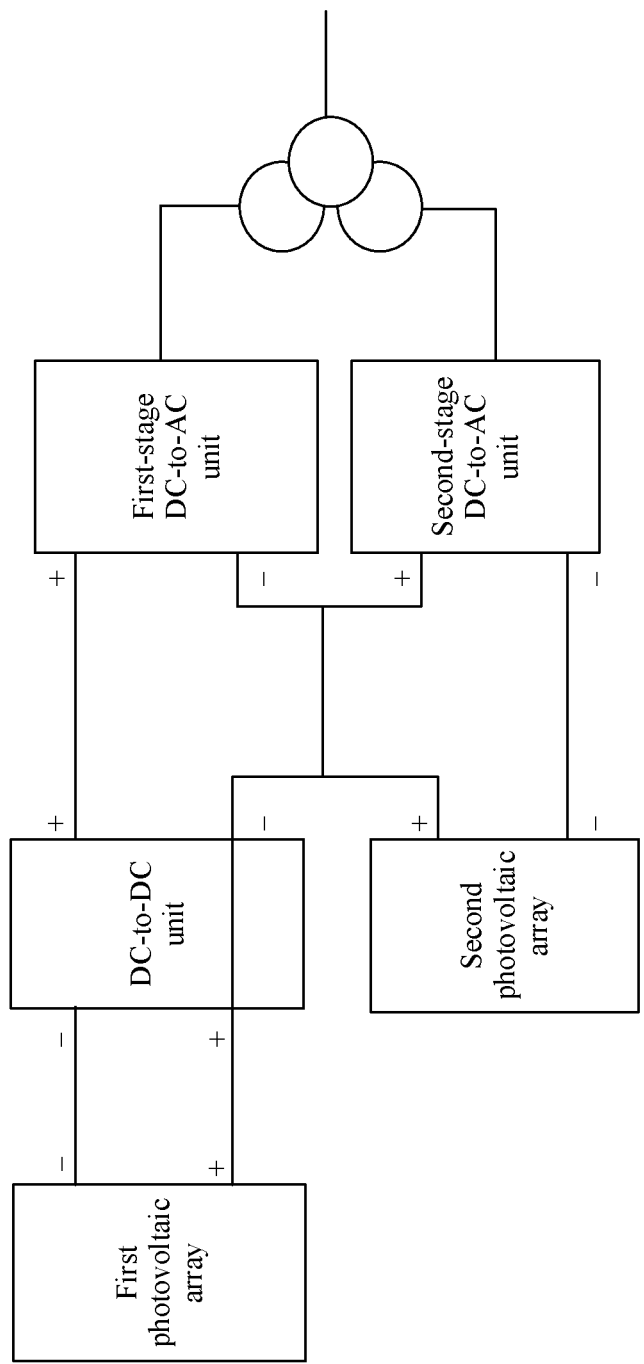
FIG. 57 is a schematic diagram of a photovoltaic power generation system according to an embodiment of this application.

FIG. 57 is a schematic diagram of the photovoltaic power generation system according to an embodiment of this application. In some embodiments, in the photovoltaic power generation system, the positive input terminal and the negative output terminal of the DC-to-DC unit are directly coupled, or connected with only a small voltage drop. This can implement that a positive output electrode of the second photovoltaic array and a positive output electrode of the first photovoltaic array are equipotential. Normally, impedance to ground of the entire system is symmetrically distributed. When the system is normally connected to a grid for working, the first node, the second node, and the ground are equipotential. In this case, output voltages to ground at PV+ of cell panels of the first photovoltaic array and the second photovoltaic array are near 0 V. This eliminates a positive bias voltage to ground at PV+ of the cell panel, and avoids a PID phenomenon of the cell panel (for a cell panel that has a positive voltage to ground at PV+ and generates a PID phenomenon). Similarly, in some other embodiments, the negative input terminal and the positive output terminal of the DC-to-DC unit are directly coupled, or connected with only a small voltage drop. This is similar to the principle in the embodiment corresponding to FIG. 27, and details are not described herein again.

In this embodiment of this application, in the photovoltaic power generation system, a PID phenomenon may alternatively be eliminated by coupling a voltage source. In some embodiments, a voltage source is coupled between a ground point and a neutral point of a transformer winding corresponding to the output terminal of the second-stage DC-to-AC unit, to adjust a potential to ground of the neutral point. In some other embodiments, a voltage source may be coupled between a ground point and a neutral point of a transformer winding corresponding to the output terminal of the first-stage DC-to-AC unit, to adjust a voltage. In some other embodiments, a voltage source may be coupled between a ground point and an external phase wire at an output side of the first-stage DC-to-AC unit and/or the second-stage DC-to-AC unit, to adjust a potential to ground of the corresponding output phase wire and eliminate a PID phenomenon. In some other embodiments, a voltage source may be coupled between a ground point and an internal phase wire at the output terminal of the first-stage DC-to-AC unit and/or the second-stage DC-to-AC unit, to adjust a potential to ground of the corresponding output phase wire and eliminate a PID phenomenon. This is similar to the principles in the embodiments in FIG. 12a, FIG. 12b, and FIG. 12c, and details are not described herein again.

In some embodiments, in the photovoltaic power generation system, a neutral point of a transformer winding corresponding to the output terminal of the first-stage DC-to-AC unit or the second-stage DC-to-AC unit is coupled to ground, or coupled to ground by using a current-limiting device, so that a voltage to ground of the neutral point is close to or equal to 0 V, to eliminate a PID phenomenon. In some embodiments, when the output terminals of the first-stage DC-to-AC unit and the second-stage DC-to-AC unit are respectively coupled to different windings of a same transformer, a neutral point of the winding corresponding to the output terminal of the first-stage DC-to-AC unit and a neutral point of the winding corresponding to the output terminal of the second-stage DC-to-AC unit are coupled by using two series resistors or current-limiting devices, and a middle point between the two series resistors or the two current-limiting devices is coupled to ground, to eliminate a PID phenomenon. The principle is similar to the principles in the embodiments corresponding to FIG. 29b and FIG. 30, and details are not described herein again.

In some embodiments, in the photovoltaic power generation system, the photovoltaic power generation system further includes an isolation unit. The isolation unit may be arranged inside the first-stage DC-to-AC unit or inside the second-stage DC-to-AC unit. This is similar to the embodiment corresponding to FIG. 13, and details are not described herein again.

In some embodiments, in the photovoltaic power generation system, the first photovoltaic array and the second photovoltaic array each may be a photovoltaic array formed by serially connecting an output terminal of the photovoltaic cell panel to an optimizer or a shutdown device and then connecting in series or in parallel combinations, and a communication signal is coupled to a direct current cable connected to an output terminal of the optimizer or the shutdown device. The DC-to-DC unit and/or the first-stage DC-to-AC unit and/or the second-stage DC-to-AC unit may communicate with the optimizer or the shutdown device by using the communication signal, and control the optimizer or the shutdown device to implement fast shutdown of the optimizer or the shutdown device.

In some embodiments, a communication signal is coupled to a direct current cable between the DC-to-AC unit, the first-stage DC-to-DC unit, and the second-stage DC-to-DC unit. The first-stage DC-to-AC unit and/or the second-stage DC-to-AC unit control/controls the DC-to-DC unit by using the communication signal, to implement fast shutdown of the input terminal of the DC-to-DC unit.

In some embodiments, the photovoltaic power generation system further includes at least one energy storage unit. At least two direct current cables connected to the second photovoltaic array, the DC-to-DC unit, the first-stage DC-to-AC unit, and the second-stage DC-to-AC unit are coupled in parallel to the energy storage unit. This is specifically similar to the energy storage unit in Embodiment 3, and details are not described herein again.

In the embodiment that includes the energy storage unit, the energy storage unit may be an energy storage device, or may include a direct current conversion unit and an energy storage device, or may be another apparatus capable of storing energy. This is similar to the description of the energy storage unit in Embodiment 1, and details are not described herein again. A communication signal is coupled to a direct current cable connected between the energy storage unit and the DC-to-DC unit, and the energy storage unit may communicate with the DC-to-DC unit. A communication signal is coupled to a direct current cable connected between the energy storage unit and the DC-to-AC unit, and the energy storage unit may communicate with the DC-to-AC unit. A situation of the communication signal and a principle for implementing communication are similar to the description of the communication signal in Embodiment 1, and details are not described herein again.

Figure 58:
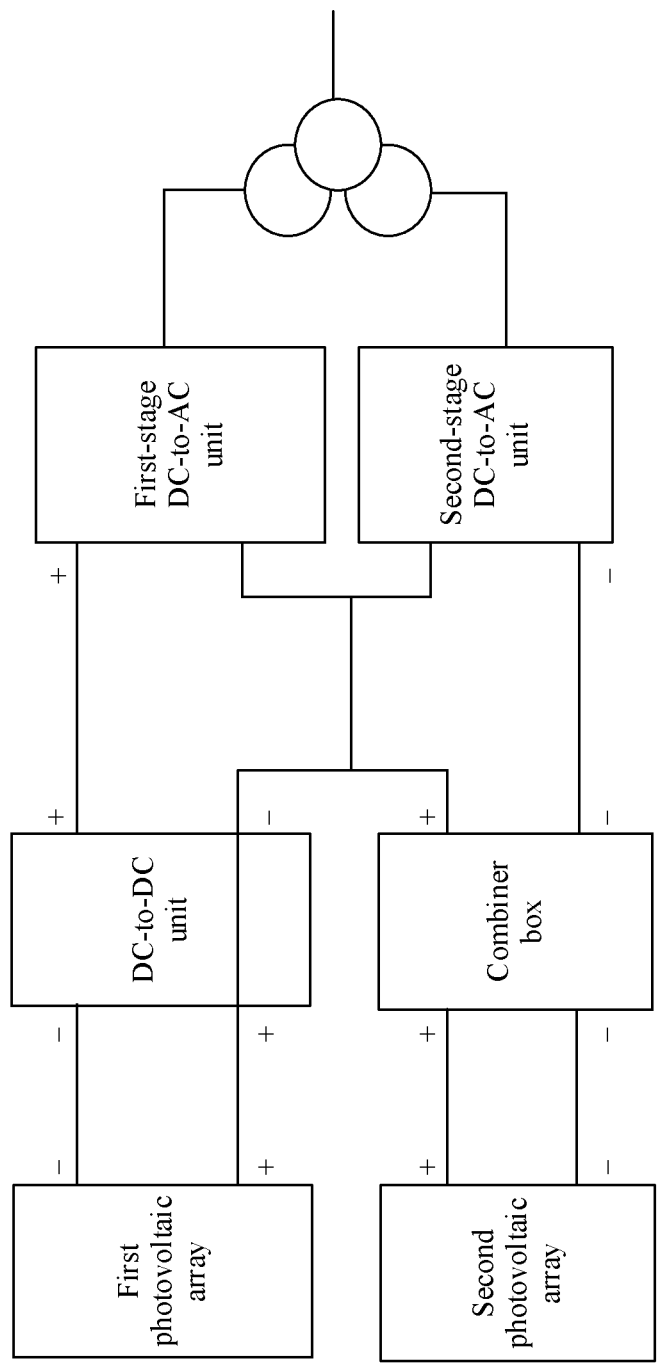
FIG. 58 is a schematic diagram of an embodiment of a photovoltaic power generation system according to an embodiment of this application.

FIG. 58 is a schematic diagram of an embodiment of the photovoltaic power generation system according to an embodiment of this application. In some embodiments, as shown in FIG. 58, an output terminal of the second photovoltaic array is coupled to a combiner box. An input terminal of the combiner box is coupled to output terminals of a plurality of second photovoltaic arrays. A positive output terminal of the combiner box is coupled in series to the negative output terminal of the DC-to-DC unit. A negative output terminal of the combiner box is coupled to the negative input terminal of the second-stage DC-to-AC unit. The input terminal of the combiner box is coupled to the output terminals of the plurality of second photovoltaic arrays. The positive output terminal of the combiner box is coupled in series to the negative output terminal of the DC-to-DC unit. The negative output terminal of the combiner box is coupled to the negative input terminal of the second-stage DC-to-AC unit. The positive output terminal of the DC-to-DC unit is coupled to the positive input terminal of the first-stage DC-to-AC unit. This is similar to the embodiment corresponding to FIG. 34, and details are not described herein again.

Figure 59:
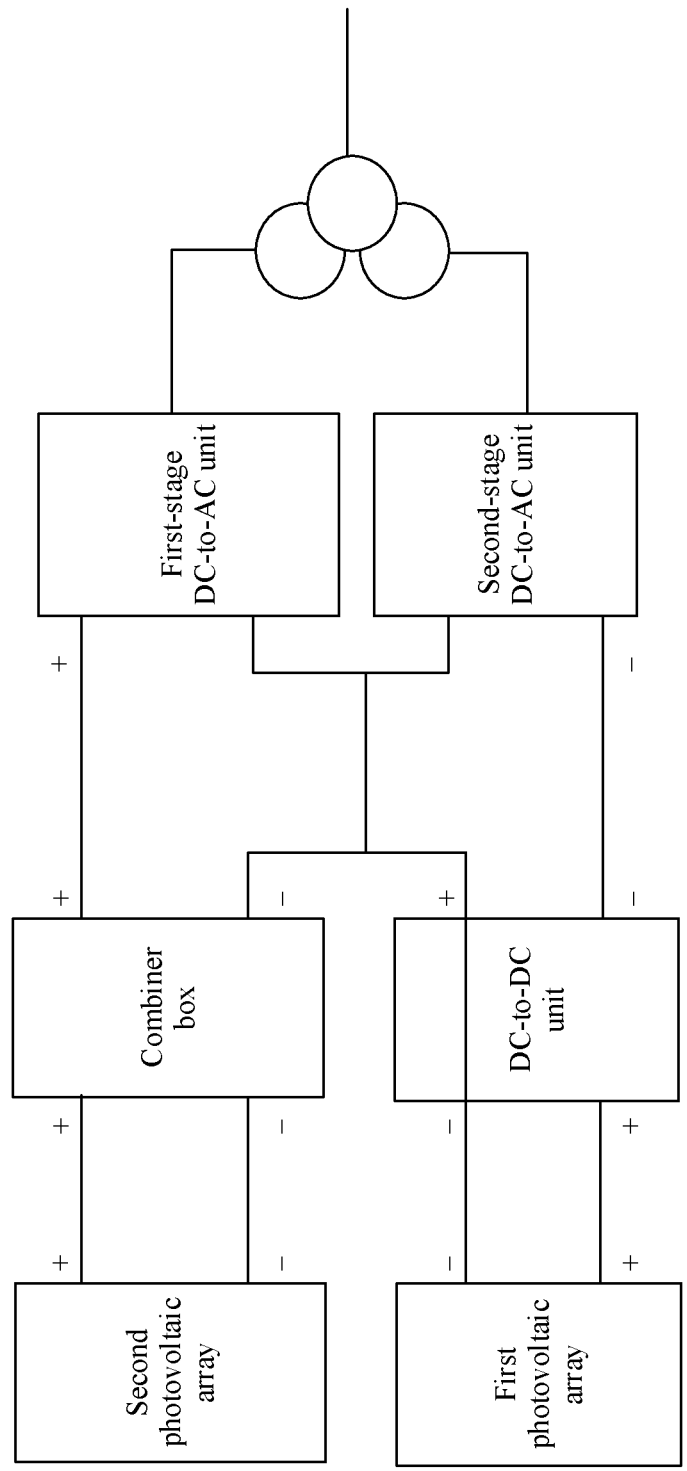
FIG. 59 is a schematic diagram of an embodiment of a photovoltaic power generation system according to an embodiment of this application.
Figure 60:
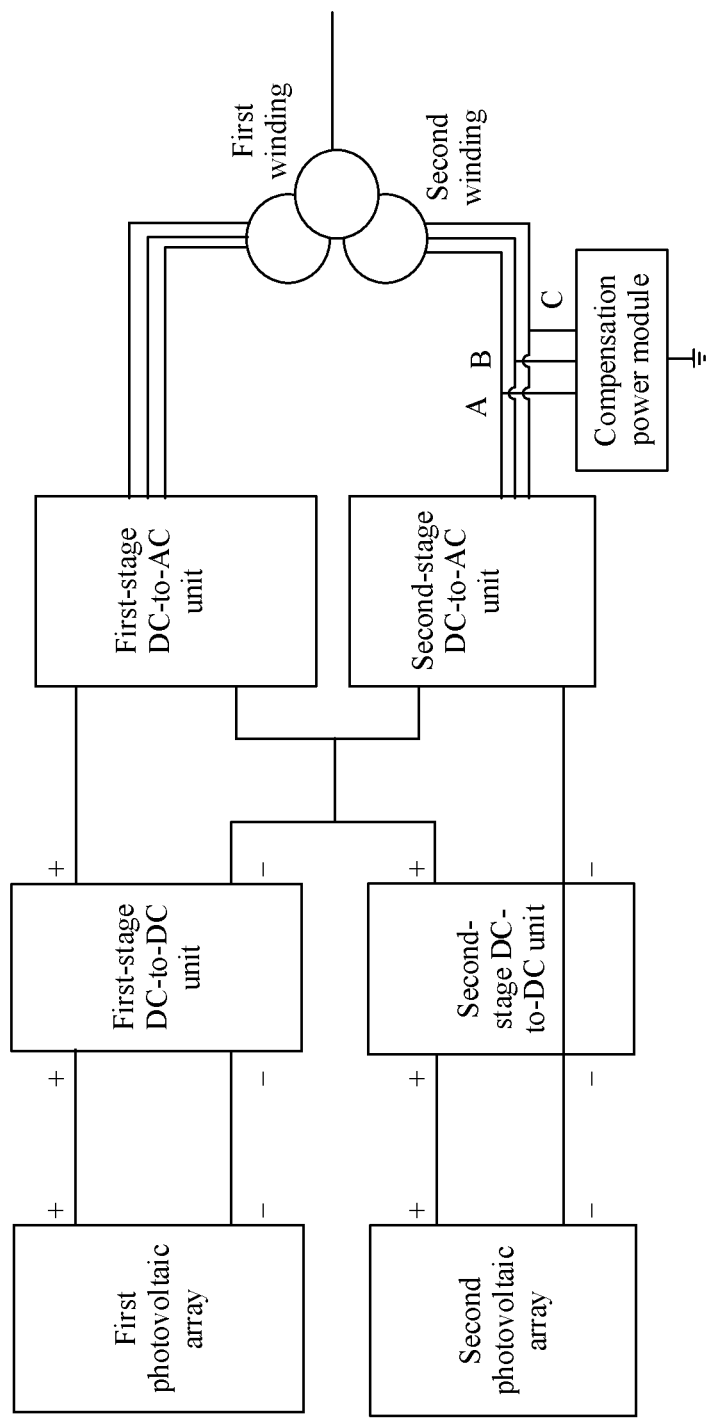
FIG. 60 is a schematic diagram of another embodiment of a photovoltaic power generation system according to an embodiment of this application.

FIG. 59 is a schematic diagram of an embodiment of the photovoltaic power generation system according to an embodiment of this application. In some embodiments, as shown in FIG. 59, an output terminal of the second photovoltaic array is coupled to a combiner box. An input terminal of the combiner box is coupled to output terminals of a plurality of second photovoltaic arrays. A negative output terminal of the combiner box is coupled in series to the positive output terminal of the DC-to-DC unit. A positive output terminal of the combiner box is coupled to the positive input terminal of the first-stage DC-to-AC unit. The negative output terminal of the DC-to-DC unit is coupled to the negative input terminal of the second-stage DC-to-AC unit. This is similar to the embodiment corresponding to FIG. 35b, and details are not described herein again. In the foregoing embodiments, the first photovoltaic array and the second photovoltaic array are usually connected in a co-PV+ or co-PV− manner. For example, FIG. 28 shows a co-PV+ connection manner of the first photovoltaic array and the second photovoltaic array. For example, the embodiment corresponding to FIG. 29b is a co-PV-connection manner of the first photovoltaic array and the second photovoltaic array. In actual application, the foregoing connection manner may not be used. For example, FIG. 60 is a schematic diagram of another embodiment of the photovoltaic power generation system according to an embodiment of this application. As shown in FIG. 60, a negative output terminal of the first photovoltaic array is coupled to the negative input terminal of the first-stage DC-to-DC unit. A positive output terminal of the second photovoltaic array is coupled to the positive input terminal of the second-stage DC-to-DC unit. In addition, the negative output terminal of the first-stage DC-to-DC unit is coupled to the positive output terminal of the second-stage DC-to-DC unit, and a coupling point is the first node. Therefore, in this embodiment of this application, the negative output terminal of the first photovoltaic array and the positive output terminal of the second photovoltaic array have a same potential, and are not connected in a co-PV+ or co-PV− connection manner, and should also be understood as one of the connection manners provided in this embodiment of this application. The compensation power module in FIG. 60 is similar to the voltage source in the embodiment corresponding to FIG. 12b, and details are not described herein again.

What is claimed is:

1. A power system, comprising:
N power modules, N DC-to-DC units, and M DC-to-AC units,
wherein an output terminal of a power module of the N power modules is coupled to an input terminal of a DC-to-DC unit of the N DC-to-DC units,
wherein a first positive output terminal of a first DC-to-DC unit of the N DC-to-DC units is coupled to a first positive input terminal of a first DC-to-AC unit of the M DC-to-AC units,
wherein an $n^{th}$ negative output terminal of an $n^{th}$ DC-to-DC unit of the N DC-to-DC units is coupled in series to an $(n+1)^{th}$ positive output terminal of an $(n+1)^{th}$ DC-to-DC unit of the N DC-to-DC units to form a first node of one or more first nodes, wherein n is an integer greater than 0 and less than N,
wherein a $N^{th}$ negative output terminal of an $N^{th}$ DC-to-DC unit of the N DC-to-DC units is coupled to an $M^{th}$ negative input terminal of an $M^{th}$ DC-to-AC unit of the M DC-to-AC units,
wherein an $m^{th}$ negative input terminal of an $m^{th}$ DC-to-AC unit of the M DC-to-AC units is coupled in series to an $(m+1)^{th}$ positive input terminal of an $(m+1)^{th}$ DC-to-AC unit of the M DC-to-AC units to form a second node of one or more second nodes, wherein m is an integer greater than 0 and less than M,
wherein at least one first node of the one or more first nodes and at least one second node of the one or more second nodes are coupled, and
wherein an output of an output terminal of a DC-to-AC unit of the M DC-to-AC units is isolated.

2. The power system according to claim 1,
wherein the power module includes at least one of: a photovoltaic array, an energy storage power supply, or a wind power generation direct current source, and
wherein the photovoltaic array is formed by connecting photovoltaic cell panels in series or in parallel combinations, or is formed by connecting an output of a photovoltaic cell panel to an optimizer or a shutdown device and then connecting in series or in parallel combinations.

3. The power system according to claim 2,
wherein the power module is the photovoltaic array, and the photovoltaic array is formed by connecting the output of the photovoltaic cell panel to the optimizer or the shutdown device, and then connecting in series or in parallel combinations,
wherein a communication signal is coupled to a direct current cable connected to the power module, the DC-to-DC unit, and the DC-to-AC unit, and
wherein the DC-to-DC unit or the DC-to-AC unit controls the optimizer or the shutdown device by using the communication signal to implement fast shutdown, or the DC-to-AC unit controls the DC-to-DC unit by using the communication signal to implement the fast shutdown of an input of the DC-to-DC unit.

4. The power system according to claim 1,
wherein same-type output terminals of at least two groups of DC-to-DC units are first connected in parallel and then connected in series to form the first node,
wherein same-type input terminals of at least two groups of DC-to-AC units are first connected in parallel and then connected in series to form the second node, and
wherein outputs of same-type output terminals of the at least two groups of DC-to-AC units are connected in parallel, or isolated.

5. The power system according to claim 1, wherein a communication signal is coupled to a direct current cable connected to any two of the power module, the DC-to-DC unit, and the DC-to-AC unit, and is used to implement communication between a power supply, the DC-to-DC unit, and the DC-to-AC unit.

6. The power system according to claim 1, further comprising at least one energy storage unit, wherein the energy storage unit is coupled in parallel to at least two direct current cables connected between the DC-to-DC unit and the DC-to-AC unit.

7. The power system according to claim 6,
wherein the energy storage unit is an energy storage device, or the energy storage unit comprises a direct current conversion unit and the energy storage device, and
wherein the energy storage device comprises a supercapacitor or a battery.

8. The power system according to claim 6,
wherein a communication signal is coupled to a direct current cable connected between the energy storage unit and the DC-to-DC unit, and the communication signal is used to implement communication between the energy storage unit and the power module, or
wherein a communication signal is coupled to a direct current cable connected between the energy storage unit and the DC-to-AC unit, and the communication signal is used to implement communication between the energy storage unit and the DC-to-AC unit.

9. A power system, comprising:
a first power supply, a second power supply, a first-stage DC-to-DC unit, a second-stage DC-to-DC unit, a first-stage DC-to-AC unit, and a second-stage DC-to-AC unit,
wherein a first output terminal of the first power supply is coupled to a first input terminal of the first-stage DC-to-DC unit,
wherein a second output terminal of the second power supply is coupled to a second input terminal of the second-stage DC-to-DC unit,
wherein a first positive output terminal of the first-stage DC-to-DC unit is coupled to a first positive input terminal of the first-stage DC-to-AC unit,
wherein a first negative output terminal of the first-stage DC-to-DC unit is coupled to a second positive output terminal of the second-stage DC-to-DC unit to form a first node,
wherein a second negative output terminal of the second-stage DC-to-DC unit is coupled to a second negative input terminal of the second-stage DC-to-AC unit,
wherein a first negative input terminal of the first-stage DC-to-AC unit is coupled to a second positive input terminal of the second-stage DC-to-AC unit to form a second node, and
wherein outputs of output terminals of the first-stage DC-to-AC unit and the second-stage DC-to-AC unit are isolated.

10. The power system according to claim 9,
wherein the first positive output terminal of the first-stage DC-to-DC unit is coupled to the first positive input terminal of the first-stage DC-to-AC unit by using a first conducting wire, the second negative output terminal of the second-stage DC-to-DC unit is coupled to the second negative output terminal of the second-stage DC-to-AC unit by using a second conducting wire, and the first node is coupled to the second node by using a third conducting wire; and
wherein a third current value of the third conducting wire is less than or equal to a first current value of the first conducting wire, or the third current value of the third conducting wire is less than or equal to a second current value of the second conducting wire.

11. A power system, comprising:
N first power supplies, M second power supplies, N DC-to-DC units, and S DC-to-AC units,
wherein a first output terminal of a first power supply of the N first power supplies is coupled to an input terminal of a DC-to-DC unit of the N DC-to-DC units,
wherein a first positive terminal formed by serially coupling output terminals of the N DC-to-DC units and output terminals of the M second power supplies is coupled to a second positive terminal formed by serially coupling input terminals of the S DC-to-AC units, or wherein a first negative terminal formed by serially coupling the output terminals of the N DC-to-DC units and the output terminals of the M second power supplies is coupled to a second negative terminal formed by serially coupling the input terminals of the S DC-to-AC units,
wherein a first node formed by series coupling points for the output terminals of the N DC-to-DC units and the output terminals of the M second power supplies is coupled to a second node formed by series coupling points for the input terminals of the S DC-to-AC units by using at least one cable, and
wherein an output terminal of a DC-to-AC unit of the S DC-to-AC units is isolated.

12. The power system according to claim 11,
wherein the first power supply or a second power supply of the M second power supplies includes at least one of a photovoltaic array, an energy storage power supply, or a wind power generation direct current source, and
wherein the photovoltaic array is formed by connecting photovoltaic cell panels in series or in parallel combinations, or is formed by connecting an output of a photovoltaic cell panel to an optimizer or a shutdown device and then connecting in series or in parallel combinations.

13. The power system according to claim 12, wherein, when at least one of the first power supply or the second power supply is the photovoltaic array formed by connecting the output of the photovoltaic cell panel to the optimizer or the shutdown device, and then connecting in series or in parallel combinations, a communication signal is coupled to a direct current cable connected between the first power supply, the second power supply, the DC-to-DC unit, and the DC-to-AC unit, and wherein at least one of the DC-to-DC unit or the DC-to-AC unit controls the optimizer or the shutdown device by using the communication signal, to implement fast shutdown.

14. The power system according to claim 11,
wherein at least two groups of corresponding first nodes are connected in parallel, and at least two groups of corresponding second nodes are connected in parallel, and
wherein at least one parallel-connected first node is coupled to at least one parallel-connected second node.

15. The power system according to claim 11, wherein any two of the first power supply, a second power supply of the M second power supplies, the DC-to-DC unit, and the DC-to-AC unit communicate with each other by using a communication signal coupled to a connected direct current cable.

16. The power system according to claim 11, wherein a communication signal is coupled to a direct current cable connected between the DC-to-DC unit and the DC-to-AC unit, and the DC-to-AC unit controls the DC-to-DC unit by using the communication signal to implement fast shutdown of an input of the DC-to-DC unit.

17. The power system according to claim 11, further comprising at least one energy storage unit,
wherein the at least one energy storage unit is coupled in parallel to at least two direct current cables connected between the DC-to-DC unit, a second power supply of the M second power supplies, and the DC-to-AC unit.

18. The power system according to claim 17,
wherein the at least one energy storage unit is an energy storage device, or the at least one energy storage unit comprises a direct current conversion unit and the energy storage device, and
wherein the energy storage device comprises a supercapacitor or a battery.

19. A power system, comprising:
a first power supply, a DC-to-DC unit, a second power supply, a first-stage DC-to-AC unit, and a second-stage DC-to-AC unit,
wherein a first output terminal of the first power supply is coupled to an input terminal of the DC-to-DC unit,
wherein the DC-to-DC unit is coupled in series to a second output terminal of the second power supply, and a first coupling point of the DC-to-DC unit and the second output terminal is a first node,
wherein a first negative input terminal of the first-stage DC-to-AC unit is coupled to a second positive input terminal of the second-stage DC-to-AC unit, and a second coupling point of the first negative input terminal and the second positive input terminal is a second node,
wherein a positive output terminal formed after the DC-to-DC unit is coupled in series to the second output terminal of the second power supply is a first port, and the first port is coupled to a first positive input terminal of the first-stage DC-to-AC unit, or wherein a negative output terminal formed after the DC-to-DC unit is coupled in series to the second output terminal of the second power supply is a second port, and the second port is coupled to a second negative input terminal of the second-stage DC-to-AC unit, and
wherein outputs of output terminals of the first-stage DC-to-AC unit and the second-stage DC-to-AC unit are isolated.

20. The power system according to claim 19,
wherein the first port is coupled to the first positive input terminal of the first-stage DC-to-AC unit by using a first conducting wire, the second port is coupled to the second negative input terminal of the second-stage DC-to-AC unit by using a second conducting wire, and the first node is coupled to the second node by using a third conducting wire, and
wherein a third current value of the third conducting wire is less than or equal to a first current value of the first conducting wire, or the third current value of the third conducting wire is less than or equal to a second current value of the second conducting wire.

* * * * *